(12) United States Patent
Nishiyama et al.

(10) Patent No.: US 12,393,003 B2
(45) Date of Patent: Aug. 19, 2025

(54) OPTICAL APPARATUS

(71) Applicant: ColorLink Japan, Ltd., Niigata (JP)

(72) Inventors: Miho Nishiyama, Chiba (JP); Yuta Watanabe, Tokyo (JP)

(73) Assignee: ColorLink Japan, Ltd., Niigata (JP)

( * ) Notice: Subject to any disclaimer, the term of this patent is extended or adjusted under 35 U.S.C. 154(b) by 488 days.

(21) Appl. No.: 17/747,996

(22) Filed: May 18, 2022

(65) Prior Publication Data

US 2022/0350121 A1 Nov. 3, 2022

Related U.S. Application Data

(63) Continuation of application No. PCT/JP2019/046018, filed on Nov. 25, 2019.

(51) Int. Cl.
| | |
|---|---|
| *G02B 17/08* | (2006.01) |
| *G02B 5/30* | (2006.01) |
| *G02B 5/32* | (2006.01) |
| *G02B 15/08* | (2006.01) |
| *G02B 27/00* | (2006.01) |

(52) U.S. Cl.
CPC ....... *G02B 17/0896* (2013.01); *G02B 5/3083* (2013.01); *G02B 5/32* (2013.01); *G02B 15/08* (2013.01); *G02B 17/0856* (2013.01); *G02B 27/0068* (2013.01)

(58) Field of Classification Search
CPC ..... G02B 17/0896; G02B 5/3083; G02B 5/32
See application file for complete search history.

(56) References Cited

U.S. PATENT DOCUMENTS

| | | | |
|---|---|---|---|
| 5,479,224 | A | 12/1995 | Yasugaki |
| 6,421,183 | B1 | 7/2002 | Ophey |
| (Continued) | | | |

FOREIGN PATENT DOCUMENTS

| | | |
|---|---|---|
| CN | 1316063 A | 10/2001 |
| CN | 107024773 A | 8/2017 |
| (Continued) | | |

OTHER PUBLICATIONS

Office Action issued for counterpart Chinese Application 201980094743.0, issued by The State Intellectual Property Office of People's Republic of China on Apr. 11, 2024.
(Continued)

*Primary Examiner* — Lucy P Chien

(57) ABSTRACT

An optical apparatus includes a display that displays an image, and an optical system that includes a filter (a reflective polarizing plate) and a lens (a half mirror surface) arranged on a downstream side and an upstream side, respectively, on an optical axis L of a display and magnifies the image by at least the lens (half mirror surface). The optical apparatus drives the lens along the optical axis L with respect to the filter by a mobile device, or changes the surface shape or the lens power of the lens having a variable surface shape or variable lens power. Thus, the optical path is folded back twice between the filter and the lens of the optical system, and the image is magnified by the lens (the half mirror surface), so that the position of the magnified virtual image can be adjusted according to the diopter of the user.

20 Claims, 55 Drawing Sheets

(56) References Cited

U.S. PATENT DOCUMENTS

| | | | |
|---|---|---|---|
| 2001/0050758 A1* | 12/2001 | Suzuki | G02B 13/16 348/E5.142 |
| 2015/0212326 A1 | 7/2015 | Kress | |
| 2016/0274336 A1 | 9/2016 | Kawamura | |
| 2017/0336637 A1 | 11/2017 | Van Heugten | |
| 2017/0358136 A1 | 12/2017 | Gollier | |
| 2018/0031947 A1 | 2/2018 | Shibuya | |
| 2018/0239146 A1 | 8/2018 | Bierhuizen | |
| 2019/0018248 A1 | 1/2019 | Nishiyama | |
| 2019/0265494 A1 | 8/2019 | Takagi | |
| 2020/0096817 A1 | 3/2020 | Richards | |
| 2022/0350121 A1 | 11/2022 | Nishiyama | |

FOREIGN PATENT DOCUMENTS

| | | |
|---|---|---|
| CN | 108227209 A | 6/2018 |
| CN | 110196492 A | 9/2019 |
| JP | H06194598 A | 7/1994 |
| JP | H06258561 A | 9/1994 |
| JP | 2000298237 A | 10/2000 |
| JP | 2001305475 A | 10/2001 |
| JP | 2016173398 A | 9/2016 |
| JP | 2016188969 A | 11/2016 |
| JP | 2016194731 A | 11/2016 |
| JP | 6414998 B2 | 10/2018 |
| JP | 2019507367 A | 3/2019 |
| JP | 2019207342 A | 12/2019 |
| JP | 7103566 B2 | 7/2022 |
| WO | 2018150773 A1 | 8/2018 |
| WO | 2019013864 A1 | 1/2019 |

OTHER PUBLICATIONS

International Preliminary Report on Patentability for International Application No. PCT/JP2019/046018, issued by the International Bureau of WIPO on May 12, 2021.

International Search Report and Written Opinion (ISA/237) of the International Search Authority for International Patent Application No. PCT/JP2021/008527, mailed by the Japan Patent Office on May 18, 2021.

Office Action issued for related Japanese Application No. 2021-566311, transmitted from the Japanese Patent Office on Aug. 9, 2022 (drafted on Aug. 3, 2022).

Office Action issued for related Chinese Application 202180004847.5, issued by the State Intellectual Property Office of People's Republic of China on May 24, 2025.

* cited by examiner

| | DIFFRACTIVE OPTICAL ELEMENT 200 | LENS 310 | FILTER 320 |
|---|---|---|---|
| MODEL 1 | GPL<br><br>FILTER A<br><br>GPL<br><br>FILTER B | HALF MIRROR<br><br>BICONVEX LENS | λ/4 PLATE<br><br>REFLECTIVE POLARIZING PLATE<br><br>POLARIZING PLATE |
| MODEL 2 | FILTER C | HALF MIRROR<br><br>BICONVEX LENS | |
| MODEL 3 | GPL<br><br>FILTER B | CONCAVE MENISCUS LENS | |

FIG. 12A

| FILTER A | λ/4 PLATE<br><br>CSF<br><br>λ/4 PLATE |
|---|---|
| FILTER B | λ/4 PLATE<br><br>ABSORPTIVE POLARIZING PLATE<br><br>λ/4 PLATE |
| FILTER C | ABSORPTIVE POLARIZING PLATE<br><br>λ/4 PLATE |

FIG. 12B

[LENS SPECIFICATION]

| SURFACE NUMBER | COMMENT | RADIUS OF CURVATURE | THICKNESS | ABBE NUMBER FOR d LINE | REFRACTIVE INDEX FOR d LINE | SURFACE ACTION |
|---|---|---|---|---|---|---|
| 0 | AIR (EYE BOX) | INFINITE | -1000.000 | | | |
| 1 | AIR | INFINITE | 15.000 | | | |
| 2 | λ/4 PLATE | INFINITE | 0.230 | 64.14 | 1.51633 | TRANSMISSION |
| 3 | REFLECTIVE POLARIZING PLATE | INFINITE | 0.026 | 64.14 | 1.51633 | TRANSMISSION |
| 4 | λ/4 PLATE | INFINITE | 0.505 | 25.00 | 1.62000 | TRANSMISSION |
| 5 | AIR | INFINITE | D (VARIABLE) | | | |
| 6 | LENS 1 | 1299.613 | 10.240 | 55.93 | 1.54492 | TRANSMISSION |
| 7* | HALF MIRROR | -88.828 | -10.240 | | | REFLECTION |
| 8 | | 1299.613 | D (VARIABLE) | | | TRANSMISSION |
| 9 | λ/4 PLATE | INFINITE | -0.505 | 25.00 | 1.62000 | TRANSMISSION |
| 10 | REFLECTIVE POLARIZING PLATE | INFINITE | 0.000 | | | REFLECTION |
| 11 | λ/4 PLATE | INFINITE | 0.505 | 25.00 | 1.62000 | TRANSMISSION |
| 12 | AIR | INFINITE | D (VARIABLE) | | | |
| 13 | LENS 1 | 1299.613 | 10.240 | 55.93 | 1.54492 | TRANSMISSION |
| 14* | | -88.828 | 0.000 | | | |
| 17 | AIR | INFINITE | 0.200 | | | |
| 18 | FILTER B | INFINITE | 1.157 | 64.14 | 1.51633 | TRANSMISSION |
| 19** | GPL 1 | INFINITE | 0.003 | 54.52 | 1.52330 | TRANSMISSION |
| 20 | FILTER A | INFINITE | 0.850 | 29.91 | 1.58547 | TRANSMISSION |
| 21** | GPL 2 | | 0.003 | 54.52 | 1.52330 | TRANSMISSION |
| 22 | DISPLAY DEVICE HOLDER (SPACE) | INFINITE | 0.820 | | | |
| 23 | DISPLAY DEVICE (COVER GLASS) | INFINITE | 0.700 | 58.57 | 1.52308 | |
| 24 | | INFINITE | 0.000 | | | |

[ASPHERIC COEFFICIENT]

| SURFACE NUMBER | K | A4 | A6 | A8 | A10 | A12 |
|---|---|---|---|---|---|---|
| 7*, 14* | 1.4183 | -1.21860E-08 | 5.96664E-09 | -3.70973E-11 | 0.00000E+00 | 0.00000E+00 |

[GPL DATA]

| SURFACE NUMBER | FOCAL LENGTH (mm)* | USED DIFFRACTION ORDER | NOTE |
|---|---|---|---|
| 19** | 105.423 | 1 | |
| 21** | -1807.010 | 1 | USED ONLY -1 ORDER OF BLUE |

*FOCAL LENGTH (mm) @ 528 nm

[VARIABLE GAP DATA]

| DIOPTER | 2 | -1 | -5 |
|---|---|---|---|
| D | 6.450 | 5.264 | 3.703 |
| FOCAL LENGTH (A) | 27.747 | 26.715 | 25.469 |
| LENS FOCAL LENGTH (B) | 152.001 | 152.001 | 152.001 |
| A/B | 0.183 | 0.176 | 0.168 |

FIG. 13A

[LENS SPECIFICATION]

| SURFACE NUMBER | COMMENT | RADIUS OF CURVATURE | THICKNESS | ABBE NUMBER FOR d LINE | REFRACTIVE INDEX FOR d LINE | SURFACE ACTION |
|---|---|---|---|---|---|---|
| 0 | AIR (EYE BOX) | INFINITE | -1000.000 | | | |
| 1 | AIR | INFINITE | 15.000 | | | |
| 2 | λ/4 PLATE | INFINITE | 0.230 | 64.14 | 1.51633 | TRANSMISSION |
| 3 | REFLECTIVE POLARIZING PLATE | INFINITE | 0.026 | 64.14 | 1.51633 | TRANSMISSION |
| 4 | λ/4 PLATE | INFINITE | 0.505 | 25.00 | 1.62000 | TRANSMISSION |
| 5 | AIR | INFINITE | D (VARIABLE) | | | |
| 6 | LENS 1 | 246.225 | 13.384 | 55.93 | 1.54492 | TRANSMISSION |
| 7* | HALF MIRROR | -88.282 | -13.384 | | | REFLECTION |
| 8 | | 246.225 | D (VARIABLE) | | | TRANSMISSION |
| 9 | λ/4 PLATE | INFINITE | -0.505 | 25.00 | 1.62000 | TRANSMISSION |
| 10 | REFLECTIVE POLARIZING PLATE | INFINITE | 0.000 | | | REFLECTION |
| 11 | λ/4 PLATE | INFINITE | 0.505 | 25.00 | 1.62000 | TRANSMISSION |
| 12 | AIR | INFINITE | D (VARIABLE) | | | |
| 13 | LENS 1 | 246.225 | 13.384 | 55.93 | 1.54492 | TRANSMISSION |
| 14* | | -88.282 | 0.000 | | | |
| 17 | AIR | INFINITE | 0.200 | | | |
| 18 | FILTER B | INFINITE | 1.157 | 64.14 | 1.51633 | TRANSMISSION |
| 19** | GPL 1 | INFINITE | 0.003 | 54.52 | 1.52330 | TRANSMISSION |
| 20 | FILTER A | INFINITE | 0.850 | 29.91 | 1.58547 | TRANSMISSION |
| 21** | GPL 2 | | 0.003 | 54.52 | 1.52330 | TRANSMISSION |
| 22 | DISPLAY DEVICE HOLDER (SPACE) | INFINITE | 0.820 | | | |
| 23 | DISPLAY DEVICE (COVER GLASS) | INFINITE | 0.700 | 58.57 | 1.52308 | |
| 24 | | INFINITE | 0.000 | | | |

[ASPHERIC COEFFICIENT]

| SURFACE NUMBER | K | A4 | A6 | A8 | A10 | A12 |
|---|---|---|---|---|---|---|
| 7*, 14* | 0.2545 | 2.62844E-08 | 4.10297E-09 | -2.39333E-11 | 0.00000E+00 | 0.00000E+00 |

[GPL DATA]

| SURFACE NUMBER | FOCAL LENGTH (mm)* | USED DIFFRACTION ORDER | NOTE |
|---|---|---|---|
| 19** | 91.891 | 1 | |
| 21** | 1584.742 | 1 | USED ONLY -1 ORDER OF BLUE |

*FOCAL LENGTH (mm) @ 528 nm

[VARIABLE GAP DATA]

| DIOPTER | 2 | -1 | -5 |
|---|---|---|---|
| D | 3.147 | 2.117 | 0.752 |
| FOCAL LENGTH (A) | 25.221 | 24.284 | 23.143 |
| LENS FOCAL LENGTH (B) | 120.191 | 120.191 | 120.191 |
| A/B | 0.210 | 0.202 | 0.193 |

FIG. 14A

[LENS SPECIFICATION]

| SURFACE NUMBER | COMMENT | RADIUS OF CURVATURE | THICKNESS | ABBE NUMBER FOR d LINE | REFRACTIVE INDEX FOR d LINE | SURFACE ACTION |
|---|---|---|---|---|---|---|
| 0 | AIR (EYE BOX) | INFINITE | -1000.000 | | | |
| 1 | AIR | INFINITE | 15.000 | | | |
| 2 | λ/4 PLATE | INFINITE | 0.230 | 64.14 | 1.51633 | TRANSMISSION |
| 3 | REFLECTIVE POLARIZING PLATE | INFINITE | 0.026 | 64.14 | 1.51633 | TRANSMISSION |
| 4 | λ/4 PLATE | INFINITE | 0.505 | 25.00 | 1.62000 | TRANSMISSION |
| 5 | AIR | INFINITE | D (VARIABLE) | | | |
| 6 | LENS 1 | 78.219 | 14.012 | 55.93 | 1.54492 | TRANSMISSION |
| 7* | HALF MIRROR | -114.261 | -14.012 | | | REFLECTION |
| 8 | | 78.219 | D (VARIABLE) | | | TRANSMISSION |
| 9 | λ/4 PLATE | INFINITE | -0.505 | 25.00 | 1.62000 | TRANSMISSION |
| 10 | REFLECTIVE POLARIZING PLATE | INFINITE | 0.000 | | | REFLECTION |
| 11 | λ/4 PLATE | INFINITE | 0.505 | 25.00 | 1.62000 | TRANSMISSION |
| 12 | AIR | INFINITE | D (VARIABLE) | | | |
| 13 | LENS 1 | 78.219 | 14.012 | 55.93 | 1.54492 | TRANSMISSION |
| 14* | | -114.261 | 0.000 | | | |
| 17 | AIR | INFINITE | 0.200 | | | |
| 18 | FILTER B | INFINITE | 1.157 | 64.14 | 1.51633 | TRANSMISSION |
| 19** | GPL 1 | INFINITE | 0.003 | 54.52 | 1.52330 | TRANSMISSION |
| 20 | FILTER A | INFINITE | 0.850 | 29.91 | 1.58547 | TRANSMISSION |
| 21** | GPL 2 | | 0.003 | 54.52 | 1.52330 | TRANSMISSION |
| 22 | DISPLAY DEVICE HOLDER (SPACE) | INFINITE | 0.820 | | | |
| 23 | DISPLAY DEVICE (COVER GLASS) | INFINITE | 0.700 | 58.57 | 1.52308 | |
| 24 | | INFINITE | 0.000 | | | |

[ASPHERIC COEFFICIENT]

| SURFACE NUMBER | K | A4 | A6 | A8 | A10 | A12 |
|---|---|---|---|---|---|---|
| 7*, 14* | 4.6628 | 1.365020E-06 | -4.050480E-09 | 2.503801E-11 | 0.000000E+00 | 0.000000E+00 |

[GPL DATA]

| SURFACE NUMBER | FOCAL LENGTH (mm)* | USED DIFFRACTION ORDER | NOTE |
|---|---|---|---|
| 19** | -70.700 | 1 | |
| 21** | -1191.840 | 1 | USED ONLY -1 ORDER OF BLUE |

*FOCAL LENGTH (mm) @ 528 nm

[VARIABLE GAP DATA]

| DIOPTER | 2 | -1 | -5 |
|---|---|---|---|
| D | 2.606 | 1.506 | 0.055 |
| FOCAL LENGTH (A) | 24.632 | 23.443 | 22.039 |
| LENS FOCAL LENGTH (B) | 86.905 | 86.905 | 86.905 |
| A/B | 0.283 | 0.270 | 0.254 |

FIG. 15A

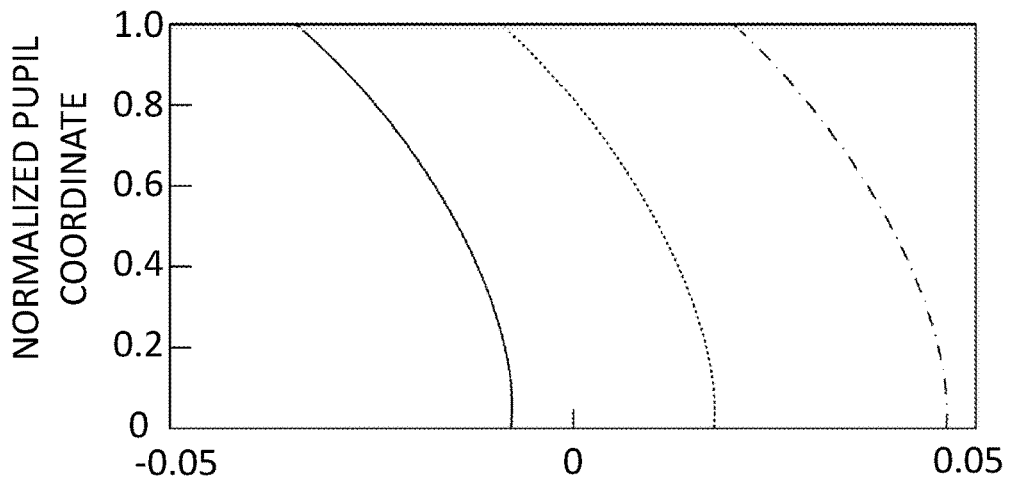
FIG. 15E  SPHERICAL ABERRATION (mm)
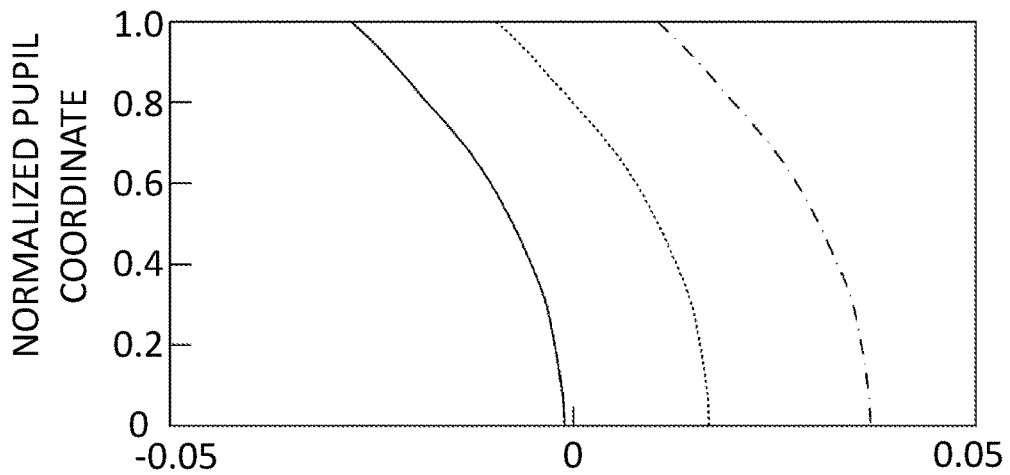
FIG. 15F  SPHERICAL ABERRATION (mm)
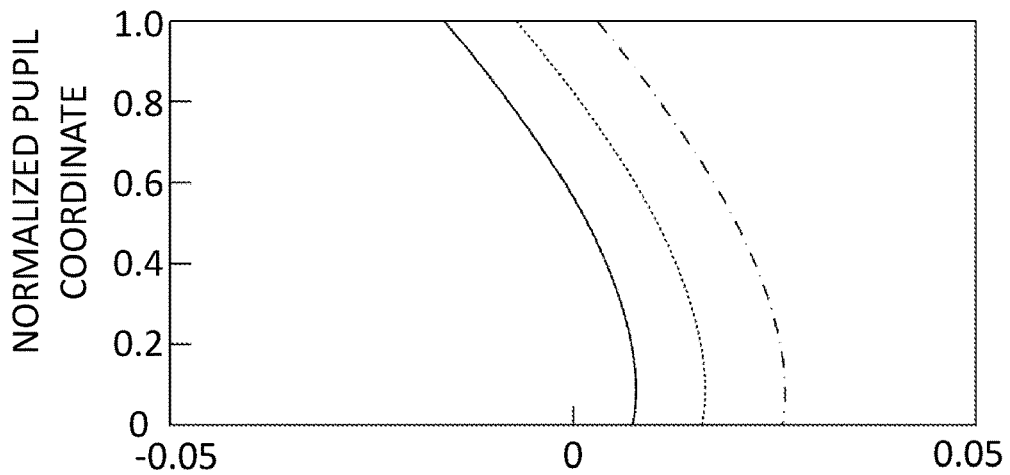
FIG. 15G  SPHERICAL ABERRATION (mm)

[LENS SPECIFICATION]

| SURFACE NUMBER | COMMENT | RADIUS OF CURVATURE | THICKNESS | ABBE NUMBER FOR d LINE | REFRACTIVE INDEX FOR d LINE | SURFACE ACTION |
|---|---|---|---|---|---|---|
| 0 | AIR (EYE BOX) | INFINITE | -1000.000 | | | |
| 1 | AIR | INFINITE | 15.000 | | | |
| 2 | λ/4 PLATE | INFINITE | 0.230 | 64.14 | 1.51633 | TRANSMISSION |
| 3 | REFLECTIVE POLARIZING PLATE | INFINITE | 0.026 | 64.14 | 1.51633 | TRANSMISSION |
| 4 | λ/4 PLATE | INFINITE | 0.505 | 25.00 | 1.62000 | TRANSMISSION |
| 5 | AIR | INFINITE | D (VARIABLE) | | | |
| 6 | LENS 1 | 60.978 | 13.141 | 55.93 | 1.54492 | TRANSMISSION |
| 7* | HALF MIRROR | -138.410 | -13.141 | | | REFLECTION |
| 8 | | 60.978 | D (VARIABLE) | | | TRANSMISSION |
| 9 | λ/4 PLATE | INFINITE | -0.505 | 25.00 | 1.62000 | TRANSMISSION |
| 10 | REFLECTIVE POLARIZING PLATE | INFINITE | 0.000 | | | REFLECTION |
| 11 | λ/4 PLATE | INFINITE | 0.505 | 25.00 | 1.62000 | TRANSMISSION |
| 12 | AIR | INFINITE | D (VARIABLE) | | | |
| 13 | LENS 1 | 60.978 | 13.141 | 55.93 | 1.54492 | TRANSMISSION |
| 14* | | -138.410 | 0.000 | | | |
| 17 | AIR | INFINITE | 0.200 | | | |
| 18 | FILTER B | INFINITE | 1.157 | 64.14 | 1.51633 | TRANSMISSION |
| 19** | GPL 1 | INFINITE | 0.003 | 54.52 | 1.52330 | TRANSMISSION |
| 20 | FILTER A | INFINITE | 0.850 | 29.91 | 1.58547 | TRANSMISSION |
| 21** | GPL 2 | | 0.003 | 54.52 | 1.52330 | TRANSMISSION |
| 22 | DISPLAY DEVICE HOLDER (SPACE) | INFINITE | 0.820 | | | |
| 23 | DISPLAY DEVICE (COVER GLASS) | INFINITE | 0.700 | 58.57 | 1.52308 | |
| 24 | | INFINITE | 0.000 | | | |

[ASPHERIC COEFFICIENT]

| SURFACE NUMBER | K | A4 | A6 | A8 | A10 | A12 |
|---|---|---|---|---|---|---|
| 7*, 14* | 4.6628 | 1.712379E-06 | -8.567887E-09 | 5.296418E-11 | 0.000000E+00 | 0.000000E+00 |

[GPL DATA]

| SURFACE NUMBER | FOCAL LENGTH (mm)* | USED DIFFRACTION ORDER | NOTE |
|---|---|---|---|
| 19** | -63.750 | 1 | |
| 21** | -960.924 | 1 | USED ONLY -1 ORDER OF BLUE |

*FOCAL LENGTH (mm) @ 528 nm

[VARIABLE GAP DATA]

| DIOPTER | 2 | -1 | -5 |
|---|---|---|---|
| D | 3.563 | 2.371 | 0.841 |
| FOCAL LENGTH (A) | 25.069 | 23.661 | 22.070 |
| LENS FOCAL LENGTH (B) | 79.027 | 79.027 | 79.027 |
| A/B | 0.317 | 0.299 | 0.279 |

FIG. 16A

[LENS SPECIFICATION]

| SURFACE NUMBER | COMMENT | RADIUS OF CURVATURE | THICKNESS | ABBE NUMBER FOR d LINE | REFRACTIVE INDEX FOR d LINE | SURFACE ACTION |
|---|---|---|---|---|---|---|
| 0 | AIR (EYE BOX) | INFINITE | -1000.000 | | | |
| 1 | AIR | INFINITE | 15.000 | | | |
| 2 | λ/4 PLATE | INFINITE | 0.230 | 64.14 | 1.51633 | TRANSMISSION |
| 3 | REFLECTIVE POLARIZING PLATE | INFINITE | 0.026 | 64.14 | 1.51633 | TRANSMISSION |
| 4 | λ/4 PLATE | INFINITE | 0.505 | 25.00 | 1.62000 | TRANSMISSION |
| 5 | | INFINITE | D (VARIABLE) | | | |
| 6 | LENS 1 | 992.876 | 1.000 | 23.78 | 1.63550 | TRANSMISSION |
| 7 | | 149.216 | 0.100 | | | |
| 8 | LENS 2 | 149.216 | 1.880 | 55.93 | 1.54492 | TRANSMISSION |
| 9* | HALF MIRROR | -113.487 | -1.880 | | | REFLECTION |
| 10 | | 149.216 | -0.100 | | | |
| 11 | LENS 1 | 149.216 | -1.000 | 23.78 | 1.63550 | TRANSMISSION |
| 12 | | 992.876 | D (VARIABLE) | | | |
| 13 | λ/4 PLATE | INFINITE | -0.505 | 25.00 | 1.62000 | TRANSMISSION |
| 14 | REFLECTIVE POLARIZING PLATE | INFINITE | 0.000 | | | REFLECTION |
| 15 | λ/4 PLATE | INFINITE | 0.505 | 25.00 | 1.62000 | TRANSMISSION |
| 16 | AIR | INFINITE | D (VARIABLE) | | | |
| 17 | LENS 1 | 992.876 | 1.000 | 23.78 | 1.63550 | TRANSMISSION |
| 18 | | 149.216 | 0.100 | | | |
| 19 | LENS 2 | 149.216 | 1.880 | 55.93 | 1.54492 | TRANSMISSION |
| 20* | | -113.487 | 0.000 | | | |
| 21 | AIR | INFINITE | 0.200 | | | |
| 22 | FILTER C | INFINITE | 0.400 | 64.14 | 1.51633 | TRANSMISSION |
| 24 | DISPLAY DEVICE (COVER GLASS) | INFINITE | 0.700 | 58.57 | 1.52308 | |
| 25 | | INFINITE | 0.000 | | | |

[ASPHERIC COEFFICIENT]

| SURFACE NUMBER | K | A4 | A6 | A8 | A10 | A12 |
|---|---|---|---|---|---|---|
| 9*, 20* | -5.0000 | -1.40454E-06 | 5.70960E-08 | -1.58779E-09 | 2.14087E-11 | -1.12520E-13 |

[VARIABLE GAP DATA]

| DIOPTER | 2 | -1 | -5 |
|---|---|---|---|
| D | 16.836 | 14.826 | 12.257 |
| FOCAL LENGTH (A) | 36.942 | 36.231 | 35.362 |
| LENS FOCAL LENGTH (B) | 206.785 | 206.785 | 206.785 |
| A/B | 0.179 | 0.175 | 0.171 |

FIG. 17A

[LENS SPECIFICATION]

| SURFACE NUMBER | COMMENT | RADIUS OF CURVATURE | THICKNESS | ABBE NUMBER FOR d LINE | REFRACTIVE INDEX FOR d LINE | SURFACE ACTION |
|---|---|---|---|---|---|---|
| 0 | AIR (EYE BOX) | INFINITE | -1000.000 | | | |
| 1 | AIR | INFINITE | 15.000 | | | |
| 2 | λ/4 PLATE | INFINITE | 0.230 | 64.14 | 1.51633 | TRANSMISSION |
| 3 | REFLECTIVE POLARIZING PLATE | INFINITE | 0.026 | 64.14 | 1.51633 | TRANSMISSION |
| 4 | λ/4 PLATE | INFINITE | 0.505 | 25.00 | 1.62000 | TRANSMISSION |
| 5 | | INFINITE | D (VARIABLE) | | | |
| 6 | LENS 1 | 229.476 | 1.000 | 23.78 | 1.63550 | TRANSMISSION |
| 7 | | 81.024 | 0.100 | | | |
| 8 | LENS 2 | 81.024 | 3.131 | 55.93 | 1.54492 | TRANSMISSION |
| 9* | HALF MIRROR | -106.105 | -3.131 | | | REFLECTION |
| 10 | | 81.024 | -0.100 | | | |
| 11 | LENS 1 | 81.024 | -1.000 | 23.78 | 1.63550 | TRANSMISSION |
| 12 | | 229.476 | D (VARIABLE) | | | |
| 13 | λ/4 PLATE | INFINITE | -0.505 | 25.00 | 1.62000 | TRANSMISSION |
| 14 | REFLECTIVE POLARIZING PLATE | INFINITE | 0.000 | | | REFLECTION |
| 15 | λ/4 PLATE | INFINITE | 0.505 | 25.00 | 1.62000 | TRANSMISSION |
| 16 | AIR | INFINITE | D (VARIABLE) | | | |
| 17 | LENS 1 | 229.476 | 1.000 | 23.78 | 1.63550 | TRANSMISSION |
| 18 | | 81.024 | 0.100 | | | |
| 19 | LENS 2 | 81.024 | 3.131 | 55.93 | 1.54492 | TRANSMISSION |
| 20* | | -106.105 | 0.000 | | | |
| 21 | AIR | INFINITE | 4.866 | | | |
| 22 | FILTER C | INFINITE | 0.400 | 64.14 | 1.51633 | TRANSMISSION |
| 24 | DISPLAY DEVICE (COVER GLASS) | INFINITE | 0.700 | 58.57 | 1.52308 | |
| 25 | | INFINITE | 0.000 | | | |

[ASPHERIC COEFFICIENT]

| SURFACE NUMBER | K | A4 | A6 | A8 | A10 | A12 |
|---|---|---|---|---|---|---|
| 9*, 20* | -4.9991 | -1.21297E-06 | 4.14858E-08 | -1.01634E-09 | 1.20178E-11 | -5.53632E-14 |

[VARIABLE GAP DATA]

| DIOPTER | 2 | -1 | -5 |
|---|---|---|---|
| D | 10.487 | 9.037 | 7.172 |
| FOCAL LENGTH (A) | 30.149 | 29.657 | 28.892 |
| LENS FOCAL LENGTH (B) | 147.726 | 147.726 | 147.726 |
| A/B | 0.204 | 0.201 | 0.196 |

*FIG. 18A*

[LENS SPECIFICATION]

| SURFACE NUMBER | COMMENT | RADIUS OF CURVATURE | THICKNESS | ABBE NUMBER FOR d LINE | REFRACTIVE INDEX FOR d LINE | SURFACE ACTION |
|---|---|---|---|---|---|---|
| 0 | AIR (EYE BOX) | INFINITE | -1000.000 | | | |
| 1 | AIR | INFINITE | 15.000 | | | |
| 2 | λ/4 PLATE | INFINITE | 0.230 | 64.14 | 1.51633 | TRANSMISSION |
| 3 | REFLECTIVE POLARIZING PLATE | INFINITE | 0.026 | 64.14 | 1.51633 | TRANSMISSION |
| 4 | λ/4 PLATE | INFINITE | 0.505 | 25.00 | 1.62000 | TRANSMISSION |
| 5 | | INFINITE | D (VARIABLE) | | | |
| 6 | LENS 1 | 99.313 | 1.000 | 23.78 | 1.63550 | TRANSMISSION |
| 7 | | 51.994 | 0.100 | | | |
| 8 | LENS 2 | 51.994 | 2.485 | 55.93 | 1.54492 | TRANSMISSION |
| 9* | HALF MIRROR | -165.278 | -2.485 | | | REFLECTION |
| 10 | | 51.994 | -0.100 | | | |
| 11 | LENS 1 | 51.994 | -1.000 | 23.78 | 1.63550 | TRANSMISSION |
| 12 | | 99.313 | D (VARIABLE) | | | |
| 13 | λ/4 PLATE | INFINITE | -0.505 | 25.00 | 1.62000 | TRANSMISSION |
| 14 | REFLECTIVE POLARIZING PLATE | INFINITE | 0.000 | | | REFLECTION |
| 15 | λ/4 PLATE | INFINITE | 0.505 | 25.00 | 1.62000 | TRANSMISSION |
| 16 | AIR | INFINITE | D (VARIABLE) | | | |
| 17 | LENS 1 | 99.313 | 1.000 | 23.78 | 1.63550 | TRANSMISSION |
| 18 | | 51.994 | 0.100 | | | |
| 19 | LENS 2 | 51.994 | 2.485 | 55.93 | 1.54492 | TRANSMISSION |
| 20* | | -165.278 | 0.000 | | | |
| 21 | AIR | INFINITE | 0.200 | | | |
| 22 | FILTER C | INFINITE | 0.400 | 64.14 | 1.51633 | TRANSMISSION |
| 24 | DISPLAY DEVICE (COVER GLASS) | INFINITE | 0.700 | 58.57 | 1.52308 | |
| 25 | | INFINITE | 0.000 | | | |

[ASPHERIC COEFFICIENT]

| SURFACE NUMBER | K | A4 | A6 | A8 | A10 | A12 |
|---|---|---|---|---|---|---|
| 9*, 20* | -2.9988 | 1.11419E-06 | -5.74870E-08 | 1.63650E-09 | -2.25532E-11 | 1.19929E-13 |

[VARIABLE GAP DATA]

| DIOPTER | 2 | -1 | -5 |
|---|---|---|---|
| D | 16.343 | 14.357 | 11.817 |
| FOCAL LENGTH (A) | 36.415 | 35.299 | 33.969 |
| LENS FOCAL LENGTH (B) | 126.067 | 126.067 | 126.067 |
| A/B | 0.289 | 0.280 | 0.269 |

FIG. 19A

[LENS SPECIFICATION]

| SURFACE NUMBER | COMMENT | RADIUS OF CURVATURE | THICKNESS | ABBE NUMBER FOR d LINE | REFRACTIVE INDEX FOR d LINE | SURFACE ACTION |
|---|---|---|---|---|---|---|
| 0 | AIR (EYE BOX) | INFINITE | -1000.000 | | | |
| 1 | AIR | INFINITE | 15.000 | | | |
| 2 | λ/4 PLATE | INFINITE | 0.230 | 64.14 | 1.516330 | TRANSMISSION |
| 3 | REFLECTIVE POLARIZING PLATE | INFINITE | 0.026 | 64.14 | 1.51633 | TRANSMISSION |
| 4 | λ/4 PLATE | INFINITE | 0.505 | 25.00 | 1.620000 | TRANSMISSION |
| 5 | | INFINITE | D (VARIABLE) | | | |
| 6 | LENS 1 | 1680.703 | 1.000 | 23.78 | 1.635500 | TRANSMISSION |
| 7 | | 162.438 | 0.100 | | | |
| 8 | LENS 2 | 162.438 | 1.783 | 55.93 | 1.544919 | TRANSMISSION |
| 9* | HALF MIRROR | -111.099 | -1.783 | | | REFLECTION |
| 10 | | 162.438 | -0.100 | | | |
| 11 | LENS 1 | 162.438 | -1.000 | 23.78 | 1.635500 | TRANSMISSION |
| 12 | | 1680.703 | D (VARIABLE) | | | |
| 13 | λ/4 PLATE | INFINITE | -0.505 | 25.00 | 1.620000 | TRANSMISSION |
| 14 | REFLECTIVE POLARIZING PLATE | INFINITE | 0.000 | | | REFLECTION |
| 15 | λ/4 PLATE | INFINITE | 0.505 | 25.00 | 1.620000 | TRANSMISSION |
| 16 | AIR | INFINITE | D (VARIABLE) | | | |
| 17 | LENS 1 | 1680.703 | 1.000 | 23.78 | 1.635500 | TRANSMISSION |
| 18 | | 162.438 | 0.100 | | | |
| 19 | LENS 2 | 162.438 | 1.783 | 55.93 | 1.544919 | TRANSMISSION |
| 20* | | -111.099 | 0.000 | | | |
| 21 | AIR | INFINITE | 0.200 | | | |
| 22 | FILTER B | INFINITE | 0.690 | 64.14 | 1.516330 | TRANSMISSION |
| 23** | GPL | INFINITE | 0.003 | 54.52 | 1.523303 | TRANSMISSION |
| 24 | DISPLAY DEVICE (COVER GLASS) | INFINITE | 0.700 | 58.57 | 1.52308 | |
| 25 | | INFINITE | 0.000 | | | |

[ASPHERIC COEFFICIENT]

| SURFACE NUMBER | K | A4 | A6 | A8 | A10 | A12 |
|---|---|---|---|---|---|---|
| 9*, 19* | -4.9999 | -1.77884E-06 | 7.90788E-08 | -2.25413E-09 | 3.10271E-11 | -1.65705E-13 |

[GPL DATA]

| SURFACE NUMBER | FOCAL LENGTH (mm)* | USED DIFFRACTION ORDER |
|---|---|---|
| 23** | -1120.000 | 1 |

*FOCAL LENGTH (mm) @ 528 nm

[VARIABLE GAP DATA]

| DIOPTER | 2 | -1 | -5 |
|---|---|---|---|
| D | 16.740 | 14.759 | 12.224 |
| FOCAL LENGTH (A) | 36.663 | 35.984 | 35.151 |
| LENS FOCAL LENGTH (B) | 211.490 | 211.490 | 211.490 |
| A/B | 0.173 | 0.170 | 0.166 |

FIG. 20A

[LENS SPECIFICATION]

| SURFACE NUMBER | COMMENT | RADIUS OF CURVATURE | THICKNESS | ABBE NUMBER FOR d LINE | REFRACTIVE INDEX FOR d LINE | SURFACE ACTION |
|---|---|---|---|---|---|---|
| 0 | AIR (EYE BOX) | INFINITE | -1000.000 | | | |
| 1 | AIR | INFINITE | 15.000 | | | |
| 2 | λ/4 PLATE | INFINITE | 0.230 | 64.14 | 1.516330 | TRANSMISSION |
| 3 | REFLECTIVE POLARIZING PLATE | INFINITE | 0.026 | 64.14 | 1.51633 | TRANSMISSION |
| 4 | λ/4 PLATE | INFINITE | 0.505 | 25.00 | 1.620000 | TRANSMISSION |
| 5 | | INFINITE | D (VARIABLE) | | | |
| 6 | LENS 1 | 249.146 | 1.000 | 23.78 | 1.635500 | TRANSMISSION |
| 7 | | 92.003 | 0.100 | | | |
| 8 | LENS 2 | 92.003 | 1.948 | 55.93 | 1.544919 | TRANSMISSION |
| 9* | HALF MIRROR | -125.682 | -1.948 | | | REFLECTION |
| 10 | | 92.003 | -0.100 | | | |
| 11 | LENS 1 | 92.003 | -1.000 | 23.78 | 1.635500 | TRANSMISSION |
| 12 | | 249.146 | D (VARIABLE) | | | |
| 13 | λ/4 PLATE | INFINITE | -0.505 | 25.00 | 1.620000 | TRANSMISSION |
| 14 | REFLECTIVE POLARIZING PLATE | INFINITE | 0.000 | | | REFLECTION |
| 15 | λ/4 PLATE | INFINITE | 0.505 | 25.00 | 1.620000 | TRANSMISSION |
| 16 | AIR | INFINITE | D (VARIABLE) | | | |
| 17 | LENS 1 | 249.146 | 1.000 | 23.78 | 1.635500 | TRANSMISSION |
| 18 | | 92.003 | 0.100 | | | |
| 19 | LENS 2 | 92.003 | 1.948 | 55.93 | 1.544919 | TRANSMISSION |
| 20* | | -125.682 | 0.000 | | | |
| 21 | AIR | INFINITE | 0.200 | | | |
| 22 | FILTER B | INFINITE | 0.690 | 64.14 | 1.516330 | TRANSMISSION |
| 23** | GPL | INFINITE | 0.003 | 54.52 | 1.523303 | TRANSMISSION |
| 24 | DISPLAY DEVICE (COVER GLASS) | INFINITE | 0.700 | 58.57 | 1.52308 | |
| 25 | | INFINITE | 0.000 | | | |

[ASPHERIC COEFFICIENT]

| SURFACE NUMBER | K | A4 | A6 | A8 | A10 | A12 |
|---|---|---|---|---|---|---|
| 9*, 19* | -4.9999 | -7.06586E-07 | 2.64105E-08 | -7.35306E-10 | 9.88243E-12 | -5.18826E-14 |

[GPL DATA]

*FOCAL LENGTH (mm) @ 528 nm

| SURFACE NUMBER | FOCAL LENGTH (mm)* | USED DIFFRACTION ORDER |
|---|---|---|
| 23** | -1189.145 | 1 |

[VARIABLE GAP DATA]

| DIOPTER | 2 | -1 | -5 |
|---|---|---|---|
| D | 16.571 | 14.597 | 12.073 |
| FOCAL LENGTH (A) | 36.547 | 35.594 | 34.446 |
| LENS FOCAL LENGTH (B) | 169.690 | 169.690 | 169.690 |
| A/B | 0.215 | 0.210 | 0.203 |

FIG. 21A

[LENS SPECIFICATION]

| SURFACE NUMBER | COMMENT | RADIUS OF CURVATURE | THICKNESS | ABBE NUMBER FOR d LINE | REFRACTIVE INDEX FOR d LINE | SURFACE ACTION |
|---|---|---|---|---|---|---|
| 0 | AIR (EYE BOX) | INFINITE | -1000.000 | | | |
| 1 | AIR | INFINITE | 15.000 | | | |
| 2 | λ/4 PLATE | INFINITE | 0.230 | 64.14 | 1.51633 | TRANSMISSION |
| 3 | REFLECTIVE POLARIZING PLATE | INFINITE | 0.026 | 64.14 | 1.51633 | TRANSMISSION |
| 4 | λ/4 PLATE | INFINITE | 0.505 | 25.00 | 1.62000 | TRANSMISSION |
| 5 | | INFINITE | D (VARIABLE) | | | |
| 6 | LENS 1 | 95.958 | 1.279 | 23.78 | 1.63550 | TRANSMISSION |
| 7 | | 54.538 | 0.100 | | | |
| 8 | LENS 2 | 54.538 | 2.211 | 55.93 | 1.54492 | TRANSMISSION |
| 9* | HALF MIRROR | -167.497 | -2.211 | | | REFLECTION |
| 10 | | 54.538 | -0.100 | | | |
| 11 | LENS 1 | 54.538 | -1.279 | 23.78 | 1.63550 | TRANSMISSION |
| 12 | | 95.958 | D (VARIABLE) | | | |
| 13 | λ/4 PLATE | INFINITE | -0.505 | 25.00 | 1.62000 | TRANSMISSION |
| 14 | REFLECTIVE POLARIZING PLATE | INFINITE | 0.000 | | | REFLECTION |
| 15 | λ/4 PLATE | INFINITE | 0.505 | 25.00 | 1.62000 | TRANSMISSION |
| 16 | AIR | INFINITE | D (VARIABLE) | | | |
| 17 | LENS 1 | 95.958 | 1.279 | 23.78 | 1.63550 | TRANSMISSION |
| 18 | | 54.538 | 0.100 | | | |
| 19 | LENS 2 | 54.538 | 2.211 | 55.93 | 1.54492 | TRANSMISSION |
| 20* | | -167.497 | 0.000 | | | |
| 21 | AIR | INFINITE | 0.200 | | | |
| 22 | FILTER B | INFINITE | 0.690 | 64.14 | 1.51633 | TRANSMISSION |
| 23** | GPL | INFINITE | 0.003 | 54.52 | 1.52330 | TRANSMISSION |
| 24 | DISPLAY DEVICE (COVER GLASS) | INFINITE | 0.700 | 58.57 | 1.52308 | |
| 25 | | INFINITE | 0.000 | | | |

[ASPHERIC COEFFICIENT]

| SURFACE NUMBER | K | A4 | A6 | A8 | A10 | A12 |
|---|---|---|---|---|---|---|
| 9*, 19* | 4.8199 | 1.47260E-06 | -6.26637E-08 | 1.74847E-09 | -2.36157E-11 | 1.23177E-13 |

[GPL DATA]

| SURFACE NUMBER | FOCAL LENGTH (mm)* | USED DIFFRACTION ORDER |
|---|---|---|
| 23** | 89.758 | 1 |

*FOCAL LENGTH (mm) @ 528 nm

[VARIABLE GAP DATA]

| DIOPTER | 2 | -1 | -5 |
|---|---|---|---|
| D | 16.003 | 14.062 | 11.579 |
| FOCAL LENGTH (A) | 36.738 | 34.140 | 31.308 |
| LENS FOCAL LENGTH (B) | 121.947 | 121.947 | 121.947 |
| A/B | 0.301 | 0.280 | 0.257 |

FIG. 22A

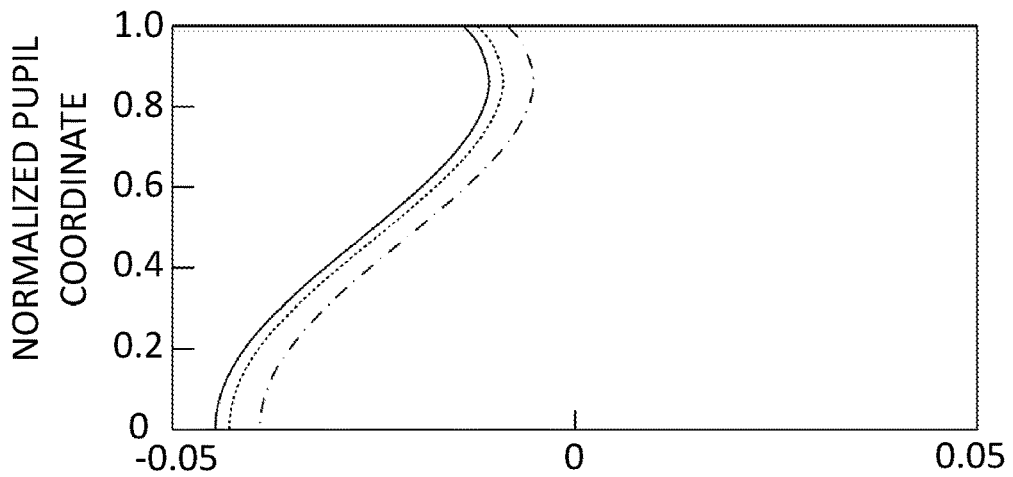
FIG. 22E SPHERICAL ABERRATION (mm)
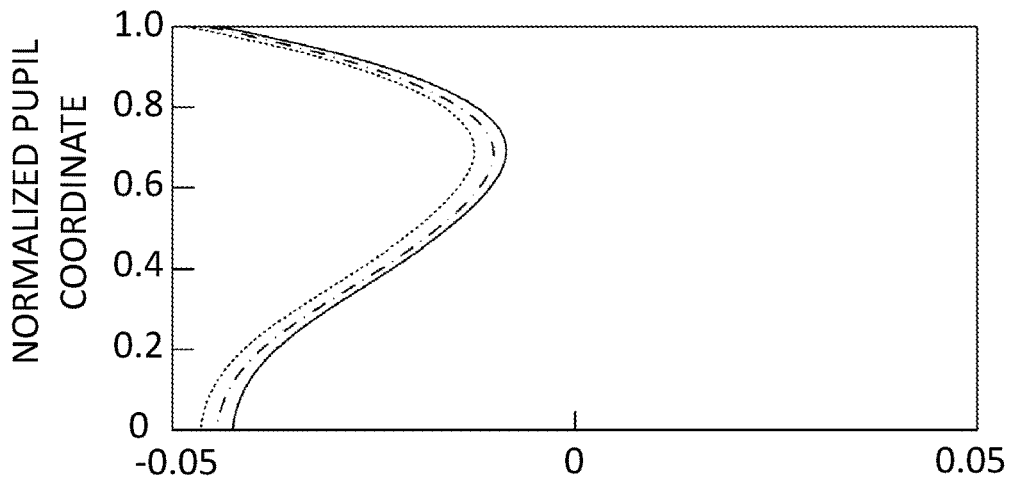
FIG. 22F SPHERICAL ABERRATION (mm)
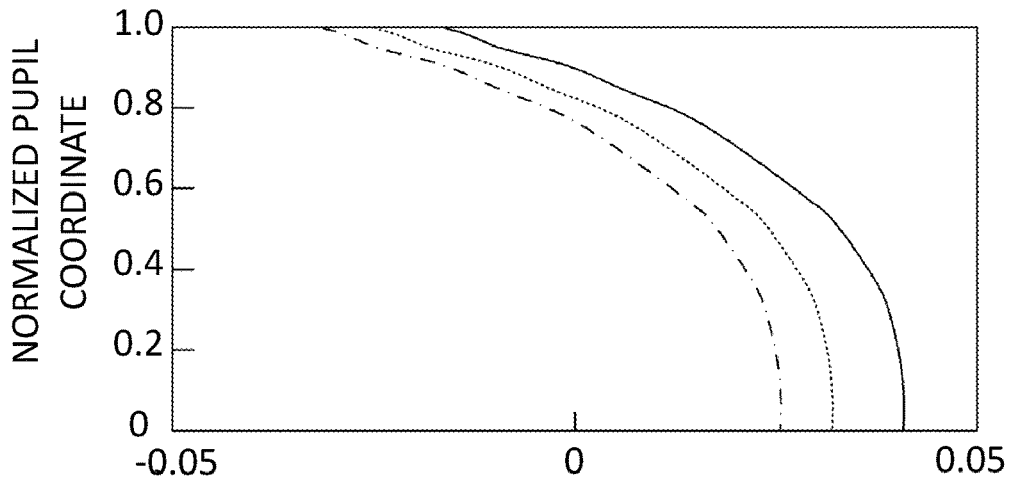
FIG. 22G SPHERICAL ABERRATION (mm)

OPTICAL APPARATUS

CROSS-REFERENCE TO RELATED APPLICATIONS

The contents of the following international patent application(s) are incorporated herein by reference:
PCT/JP2019/046018 filed on Nov. 25, 2019

BACKGROUND

1. Technical Field

The present invention relates to an optical apparatus that generates a magnified virtual image of an image.

2. Related Art

There is known an optical apparatus adopting an immersive virtual reality (VR) technology in which an image displayed on a display panel is magnified by a thinned triple-pass optical module by folding back two optical paths by two reflection surfaces, and the magnified virtual image is projected (see, for example, Patent Document 1).
Patent Document 1: International Publication No. 2018/150773

However, an optical apparatus capable of adjusting the position of the magnified virtual image according to the diopter of a user is not known.

BRIEF DESCRIPTION OF THE DRAWINGS

FIG. 12A illustrates detailed configurations of a diffractive optical element, a lens, and a filter included in the optical apparatuses according to Models 1 to 3.

FIG. 12B illustrates detailed configurations of filters A to C.

FIG. 13A illustrates a detailed design of an optical apparatus according to Example 1.

FIG. 14A illustrates a detailed design of an optical apparatus according to Example 2.

FIG. 15A illustrates a detailed design of an optical apparatus according to Example 3.

FIG. 15E illustrates a spherical aberration detected with respect to +2 diopter in the optical apparatus according to Example 3.

FIG. 15F illustrates a spherical aberration detected with respect to −1 diopter in the optical apparatus according to Example 3.

FIG. 15G illustrates a spherical aberration detected with respect to −5 diopter in the optical apparatus according to Example 3.

FIG. 16A illustrates a detailed design of an optical apparatus according to Example 4.

FIG. 17A illustrates a detailed design of an optical apparatus according to Example 5.

FIG. 18A illustrates a detailed design of an optical apparatus according to Example 6.

FIG. 19A illustrates a detailed design of an optical apparatus according to Example 7.

FIG. 20A illustrates a detailed design of an optical apparatus according to Example 8.

FIG. 21A illustrates a detailed design of an optical apparatus according to Example 9.

FIG. 22D illustrates a lateral aberration detected with respect to −5 diopter in the optical apparatus according to Example 10.

FIG. 22E illustrates a spherical aberration detected with respect to +2 diopter in the optical apparatus according to Example 10.

FIG. 22F illustrates a spherical aberration detected with respect to −1 diopter in the optical apparatus according to Example 10.

FIG. 22G illustrates a spherical aberration detected with respect to −5 diopter in the optical apparatus according to Example 10.

FIG. 22H illustrates a field curvature (left diagram) and an image distortion (right diagram) detected with respect to +2 diopter in the optical apparatus according to Example 10.

FIG. 22I illustrates a field curvature (left diagram) and an image distortion (right diagram) detected with respect to −1 diopter in the optical apparatus according to Example 10.

FIG. 22J illustrates a field curvature (left diagram) and an image distortion (right diagram) detected with respect to −5 diopter in the optical apparatus according to Example 10.

Figure 23:
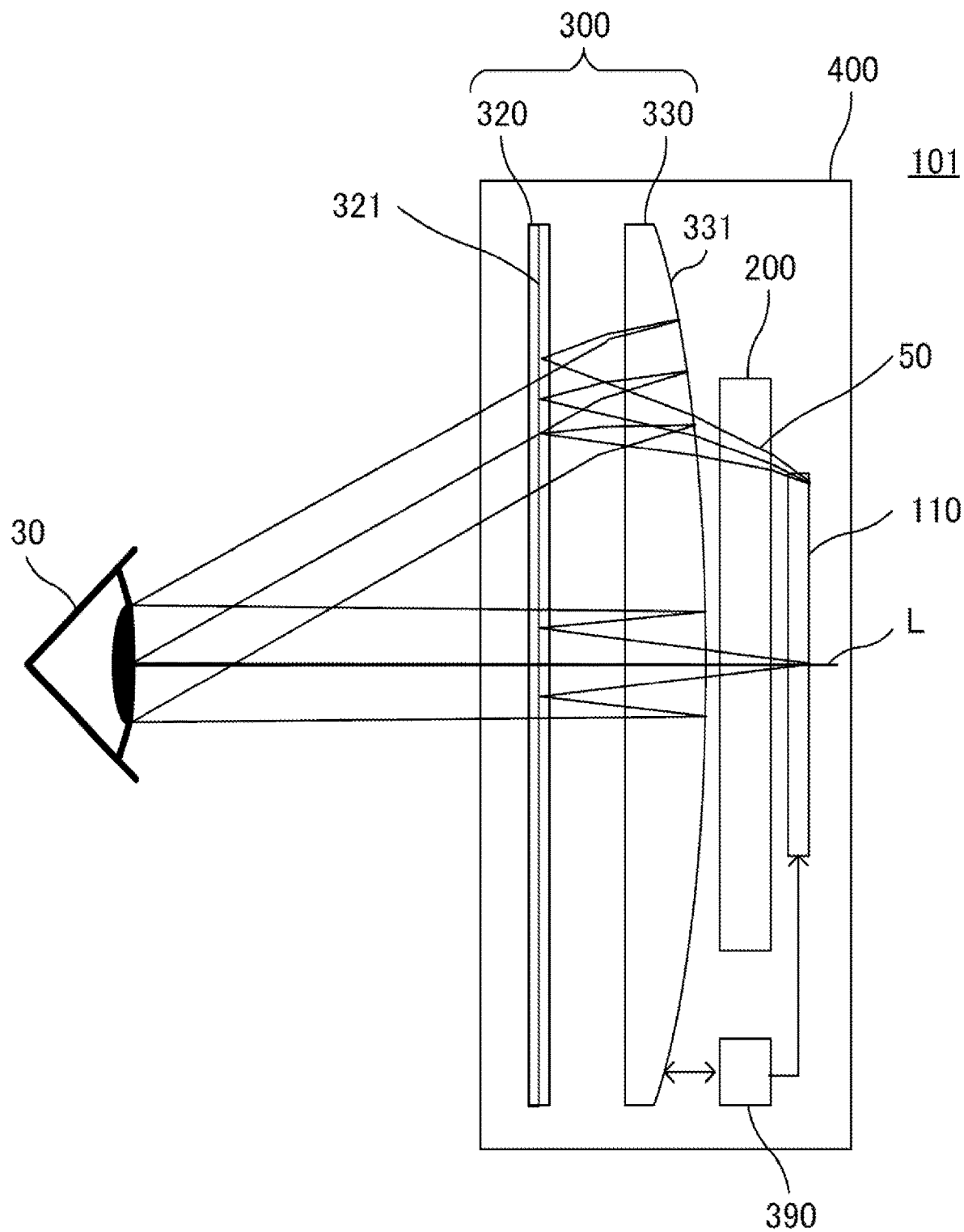

FIG. 23 schematically illustrates a configuration of an optical apparatus according to a modification.

DESCRIPTION OF EXEMPLARY EMBODIMENTS

Hereinafter, the present invention will be described through embodiments of the invention, but the following embodiments do not limit the invention according to the claims. In addition, not all combinations of features described in the embodiments are essential to the solution of the invention.

Figure 1:
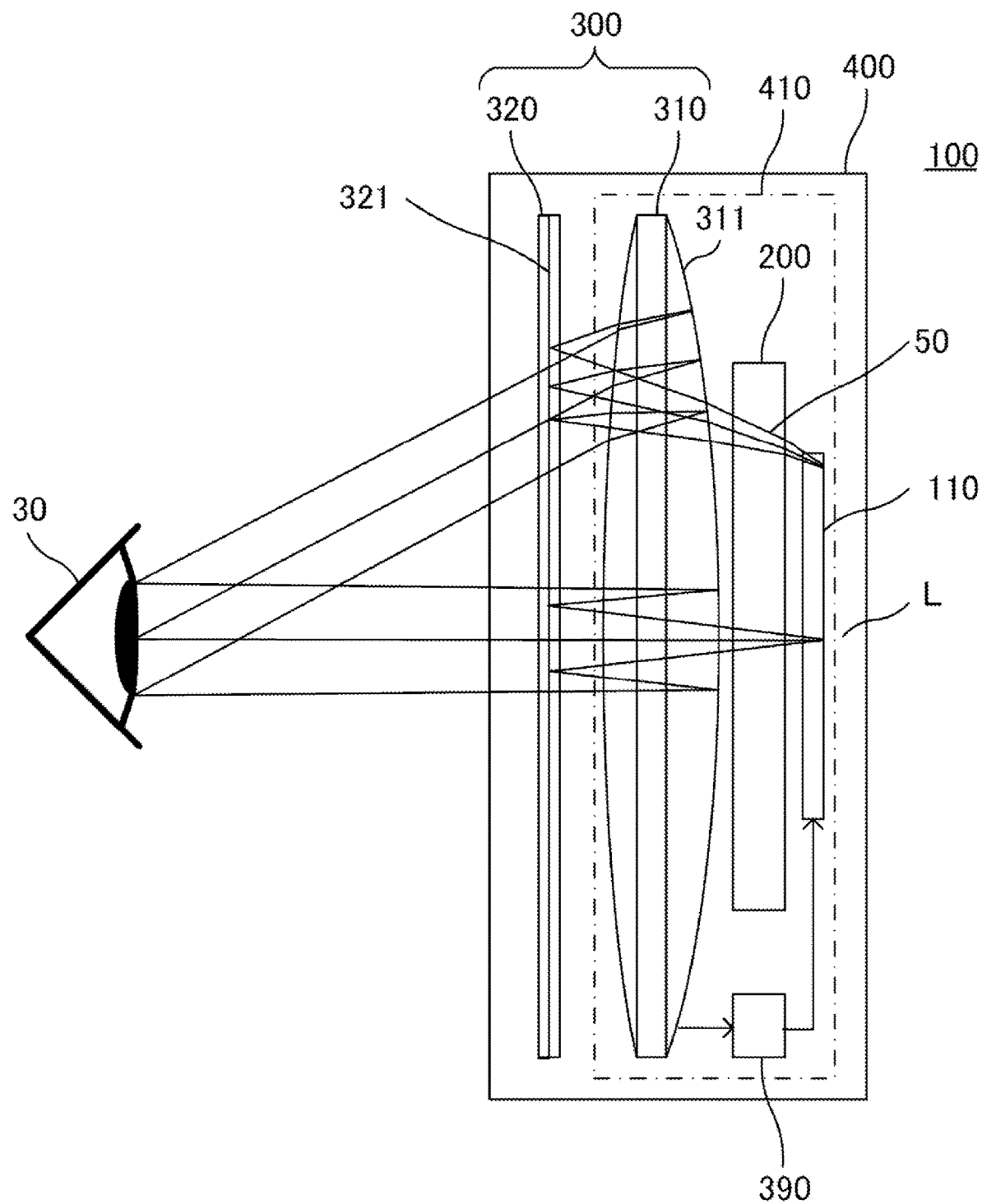
FIG. 1 schematically illustrates a configuration of an optical apparatus according to the present embodiment.

FIG. 1 schematically illustrates a configuration of an optical apparatus 100 according to the present embodiment.

The optical apparatus 100 is an apparatus that generates a magnified virtual image of an image, and is used for an immersive virtual reality (VR) technology, for example. The optical apparatus 100 includes a display 110, a diffractive optical element 200, an optical system 300, a control device 390, and a housing 400. Note that an image light 50 emitted from the display 110 is guided to an eye (one eye) 30 of a user via the diffractive optical element 200 and the optical system 300. Here, on an optical axis L of the image light 50, the display 110 side is referred to as an upstream side, and the user eye 30 side is referred to as a downstream side. The polarized light of the image light 50 is distinguished into a linearly polarized light in the horizontal direction, a linearly polarized light in the vertical direction, a left-turning (also referred to as counterclockwise-turning) circularly polarized light, and a right-turning (also referred to as clockwise-turning) circularly polarized light from the trajectory of the vibration of the electric field when the upstream side is viewed from the downstream side.

The display 110 is a device that displays an image. As the display 110, for example, a display device including an organic light emitting diode (OLED), a liquid crystal display device including a light source and a liquid crystal panel, or the like can be adopted. The image may be one or more images forming a still image, a moving image, or the like, or may be a color image including three colors of red, green, and blue. The display 110 emits the image light 50 forming an image from the display surface. In the case of a color image, each color may be emitted in a time-division manner, or may be simultaneously emitted in a manner superimposed on each other or spatially divided in units of pixels.

The diffractive optical element 200 includes a plurality of elements that process the image light 50. The diffractive optical element 200 is disposed on the downstream side of the display 110 and includes a first GPH element, a first λ/4 plate, a CSF element, a second λ/4 plate, a second GPH element, a third λ/4 plate, a first polarizing plate, and a fourth λ/4 plate (all not illustrated) stacked in order from the upstream side to the downstream side.

The first and second GPH (geometric phase hologram) elements are elements formed by distributing polymerizable liquid crystals in a specific pattern, and exert a lens action (diffusion or light condensing action) by a diffraction phenomenon while changing a polarization direction of incident light to output first-order diffracted light. The first and second GPH elements diffuse and output a light flux of the left-turning circularly polarized light, and condense and output a light flux of the right-turning circularly polarized light when unpolarized light is incident, diffuse and output a light flux while inverting the polarization direction to the left-turning circularly polarized light when the right-turning circularly polarized light is incident, and condense and output a light flux while inverting to the right-turning circularly polarized light when the left-turning circularly polarized light is incident. By using the first and second GPH elements, it is possible to compensate for a wavelength dispersion of a refraction angle with respect to the image light 50 and a chromatic aberration associated therewith.

The first to fourth λ/4 plates are elements that give a phase difference of ¼ wavelength to two polarized components of the image light 50 and modulate the two polarized components. The λ/4 plate modulates a linearly polarized light into a circularly polarized light and a circularly polarized light into a linearly polarized light.

A wavelength-selective polarization conversion (CSF) element is an element that rotates the polarization direction by 90 degrees only in a specific wavelength region. For example, the CSF element modulates a linearly polarized light in the vertical direction to a linearly polarized light in the horizontal direction, and a linearly polarized light in the horizontal direction to a linearly polarized light in the vertical direction.

The first polarizing plate is an element (so-called linearly polarizing plate) that absorbs one of the linearly polarized lights orthogonal to each other and transmits the other. As an example, the first polarizing plate transmits the linearly polarized light in the vertical direction and absorbs the linearly polarized light in the horizontal direction.

The optical system 300 is a triple-pass type optical system which is thinned by folding back the optical path twice by two reflection surfaces, and includes a filter 320 and a lens 310 arranged on the downstream side and the upstream side on the optical axis L, respectively. The optical system 300 diffuses the image light 50 by the lens 310 to magnify the image.

The filter 320 includes a plurality of elements that process the image light 50. The filter 320 is disposed on the downstream side of the lens 310 and includes a fifth λ/4 plate (not illustrated), a reflective polarizing plate 321, and a second polarizing plate (not illustrated) stacked in order from the upstream side to the downstream side.

The fifth λ/4 plate is an element that modulates the image light 50 through the lens 310 by giving a phase difference of ¼ wavelength to the two polarized components.

The reflective polarizing plate 321 is an example of a first transmissive/reflective surface, and is an element that reflects one of linearly polarized light orthogonal to each other and transmits the other linearly polarized light. As an example, the reflective polarizing plate 321 transmits the linearly polarized light in the vertical direction and reflects the linearly polarized light in the horizontal direction.

The second polarizing plate 320 is an element that absorbs one of the linearly polarized lights orthogonal to each other and transmits the other. As an example, the second polarizing plate 320 transmits the linearly polarized light in the vertical direction and absorbs the linearly polarized light in the horizontal direction.

The lens 310 is an element that diffuses the image light 50 to magnify an image. The lens 310 is designed to have a diopter (inverse of a focal length value in units of meters) of any value, for example, in a range from −5 to +2. The lens 310 has a half mirror surface 311, which is an example of a second transmissive/reflective surface, on one surface on the upstream side thereof. The half mirror surface 311 is a curved surface, in particular, an aspherical surface whose curved surface angle increases or decreases according to the distance from the center.

Figure 2A:
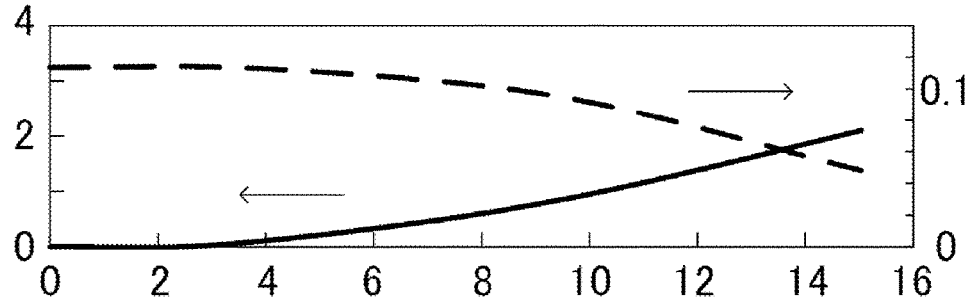
FIG. 2A illustrates an example of a surface shape of a half mirror surface (HM) of a lens.

FIG. 2A illustrates an example of a surface shape of the half mirror surface (HM) 311 of the lens 310. Here, the solid line indicates the aspherical shape of the half mirror surface (HM) 311 by a surface position Z with respect to the surface radius. The broken line indicates a change amount Δθ of the curved surface angle of the half mirror surface (HM) 311 with respect to the surface radius. In the surface shape of the half mirror surface 311, the surface position Z is shifted with increasing distance from the center to the outside, but the change amount Δθ of the curved surface angle tends to decrease with increasing distance from the center to the outside.

Figure 2B:
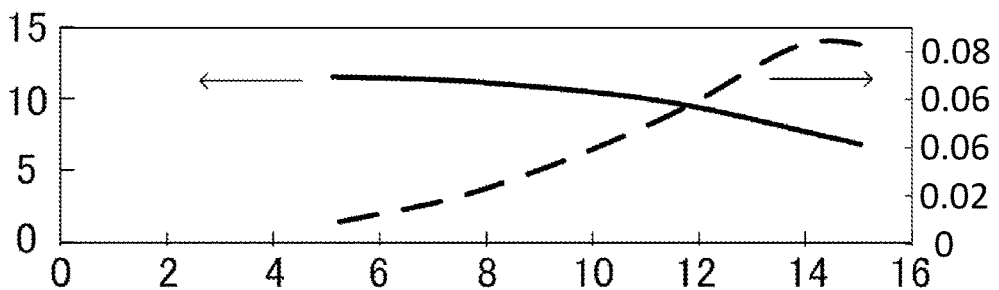
FIG. 2B illustrates an example of a light flux cone angle characteristic after reflection on the half mirror surface (HM) of the lens.

FIG. 2B illustrates an example of light flux cone angle characteristics after reflection on the half mirror surface (HM) 311 of the lens 310. Here, the solid line indicates the light flux cone angle after being reflected on the half mirror surface (HM) 311 with respect to the reflection position.

However, the width of the light flux before reflection has been set to 5 mm, and the cone angle has been set to an infinite distance condition (parallel). The broken line indicates the transition of the change amount of the light flux cone angle after being reflected on the half mirror surface (HM) 311 with respect to the reflection position. The light flux cone angle decreases as it goes away from the center of the half mirror surface 311 toward the outside, and the change amount tends to increase.

Since the change amount Δθ of the curved surface angle of the half mirror surface 311 tends to decrease as it goes away from the center toward the outside, the change amount of the light flux cone angle after being reflected on the half mirror surface 311 tends to increase as it goes away from the center toward the outside. As a result, the field curvature can be corrected by moving the half mirror surface 311 in the optical axis direction and changing the reflection position of the image light 50 on the half mirror surface 311 in the surface radial direction.

Note that, instead of the lens 310, a lens element that exerts a lens action on the image light 50 by combining optical elements including a plurality of lenses may be adopted.

The control device 390 is a device that controls each component of the optical apparatus 100. The control device 390 may drive the lens 310 in the optical axis L direction by rotating a guide ring 430 of a mobile device 410 to be described later by, for example, a rotary motor, an actuator, or the like (not illustrated) included in the housing 400.

The control device 390 changes a distortion correction value of the image according to the state of the optical system 300, for example, the diopter of the optical system 300. For example, in the triple-pass optical system 300, a virtual image tends to be distorted in a pincushion shape. Therefore, the control device 390 corrects distortion by causing the display 110 to display a barrel-shaped distortion image by an amount that cancels the pincushion-shaped distortion by the optical system 300. Here, the distortion of the optical system 300 is measured in advance using a camera or the like, and a distortion amount for generating a barrel-shaped distortion image that cancels the distortion is stored in the control device 390 as a distortion correction value. When the degree of distortion by the optical system 300 is different for each diopter, the distortion is measured for each diopter, and the distortion correction value is stored in the control device 390. The control device 390 inputs the distortion correction value according to the diopter of the optical system 300 to the display 110, and causes the display 110 to display the barrel-shaped distortion image according to the distortion correction value, thereby correcting distortion of the diopter selected by the user.

The housing 400 accommodates the display 110, the diffractive optical element 200, and the optical system 300. The housing 400 holds the mobile device 410 that moves the lens 310 (particularly, the half mirror surface 311) along the optical axis L with respect to the filter 320 (particularly, the reflective polarizing plate 321). The position of the magnified virtual image can be changed by moving the lens 310 with respect to the filter 320 to change the folded length of the optical path of the image light 50 therebetween. The configuration of the mobile device 410 will be further described later.

The principle in which the optical apparatus 100 guides the image light 50 of the display 110 to the eye 30 of the user will be described.

The display 110 generates and outputs an unpolarized image light 50. By making the image light 50 unpolarized, luminance unevenness can be prevented when the image light 50 passes through the first GPH element for correcting the chromatic aberration.

The image light 50 output from the display 110 is incident on the diffractive optical element 200. In the diffractive optical element 200, the image light 50 first enters the first GPH element. As a result, one of the ±first-order diffracted lights of the unpolarized image light 50 is diffused and output as a left-turning circularly polarized light, and the other is condensed and output as a right-turning circularly polarized light. Next, the image light 50 enters the first λ/4 plate. As a result, the image light 50 of the left-turning circularly polarized light is modulated into a linearly polarized light in the horizontal direction, and the image light 50 of the right-turning circularly polarized light is modulated into a linearly polarized light in the vertical direction. Next, the image light 50 enters the CSF. As a result, the image light 50 of the linearly polarized light in the horizontal direction in the specific wavelength region is modulated into the linearly polarized light in the vertical direction, and is output together with the image light 50 of the linearly polarized light in the vertical direction outside the specific wavelength region. The image light 50 of the linearly polarized light in the vertical direction in the specific wavelength region is modulated into the linearly polarized light in the horizontal direction, and then removed by the first polarizing plate. Thereby, one of the diffused light and the focused light output from the first GPH element is output from the diffractive optical element 200 according to the wavelength region, that is, the optical path is changed according to the wavelength region, whereby the chromatic aberration is corrected. Hereinafter, only the image light 50 of the linearly polarized light in the vertical direction output from the CSF will be described.

Next, the image light 50 enters the second λ/4 plate. As a result, the image light 50 of the linearly polarized light in the vertical direction is modulated into a left-turning circularly polarized light. Next, the image light 50 enters the second GPH element. As a result, the image light 50 of the left-turning circularly polarized light is modulated into a right-turning circularly polarized light while receiving a light condensing action. Next, the image light 50 enters the third λ/4 plate. As a result, the image light 50 of the right-turning circularly polarized light is modulated into a linearly polarized light in the vertical direction. Next, the image light 50 enters the first polarizing plate. The image light 50 of linearly polarized light in the vertical direction is transmitted through the first polarizing plate, and unnecessary light of the linearly polarized light in the horizontal direction is absorbed by the first polarizing plate. Next, the image light 50 enters the fourth λ/4 plate. As a result, the image light 50 of the linearly polarized light in the vertical direction is modulated into a left-turning circularly polarized light. In this way, the image light 50 is modulated into the left-turning circularly polarized light and the chromatic aberration is compensated, and is output from the diffractive optical element 200 to the downstream side.

Note that, in the optical apparatus 100 according to the present embodiment, the image light 50 modulated into the linearly polarized light in the vertical direction by the first λ/4 plate and the CSF element in the diffractive optical element 200 is used, and the image light 50 modulated into the linearly polarized light in the horizontal direction is removed by the first polarizing plate as unnecessary light. However, instead of this, the image light 50 modulated into the linearly polarized light in the horizontal direction by the first λ/4 plate and the CSF element in the diffractive optical element 200 may be used, and the image light 50 modulated into the linearly polarized light in the vertical direction may be removed by the first polarizing plate as unnecessary light.

The image light 50 output from the diffractive optical element 200 enters the optical system 300. In the optical system 300, the image light 50 is first incident on the lens 310. As a result, the image light 50 having half the intensity is transmitted through the half mirror surface 311 without depending on the polarization state, is magnified by the lens action and is output to the downstream side, and the image light 50 having the remaining half the intensity is reflected on the half mirror surface 311.

Next, the image light 50 is incident on the filter 320. Within the filter 320, the image light 50 first enters the fifth λ/4 plate. As a result, the image light 50 of the left-turning circularly polarized light is modulated into the linearly polarized light in the horizontal direction. Next, the image light 50 enters the reflective polarizing plate. As a result, the image light 50 of the linearly polarized light in the horizontal direction is reflected. The image light 50 enters the fifth λ/4 plate again. As a result, the image light 50 of the linearly polarized light in the horizontal direction is modulated into the right-turning circularly polarized light. The image light 50 is thus reflected on the filter 320 and output to the upstream side.

The image light 50 is incident on the lens 310 from the downstream side. As a result, the image light 50 is magnified by the lens action, the image light 50 having half the intensity is reflected on the half mirror surface 311 to be further magnified by the lens action, and is output to the downstream side, and the image light 50 having the remaining half intensity is transmitted through the half mirror surface 311.

The image light 50 is incident on the filter 320 again. Within the filter 320, the image light 50 first enters the fifth λ/4 plate. As a result, the image light 50 of the right-turning circularly polarized light is modulated into a linearly polarized light in the vertical direction. Next, the image light 50 enters the reflective polarizing plate. The image light 50 of the linearly polarized light in the vertical direction is transmitted through the reflective polarizing plate. Next, the image light 50 enters the second polarizing plate. The image light 50 of linearly polarized light in the vertical direction is transmitted through the second polarizing plate, and unnecessary light of the linearly polarized light in the horizontal direction is absorbed by the second polarizing plate. The diffused image light 50 is output from the filter 320 to the downstream side.

In this way, the image light 50 once passes through the lens 310 in the optical system 300, is reflected on the filter 320 and reciprocates through the lens 310, is further subjected to the lens action by the lens 310 to be magnified, is output to the downstream side, and is guided to the eye 30 of the user.

Figure 3A:
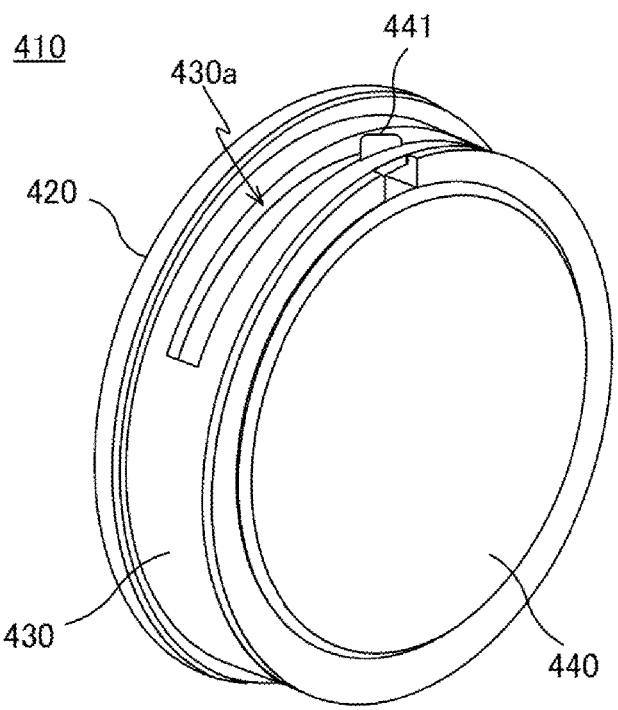
FIG. 3A illustrates an overall configuration of a mobile device.
Figure 3B:
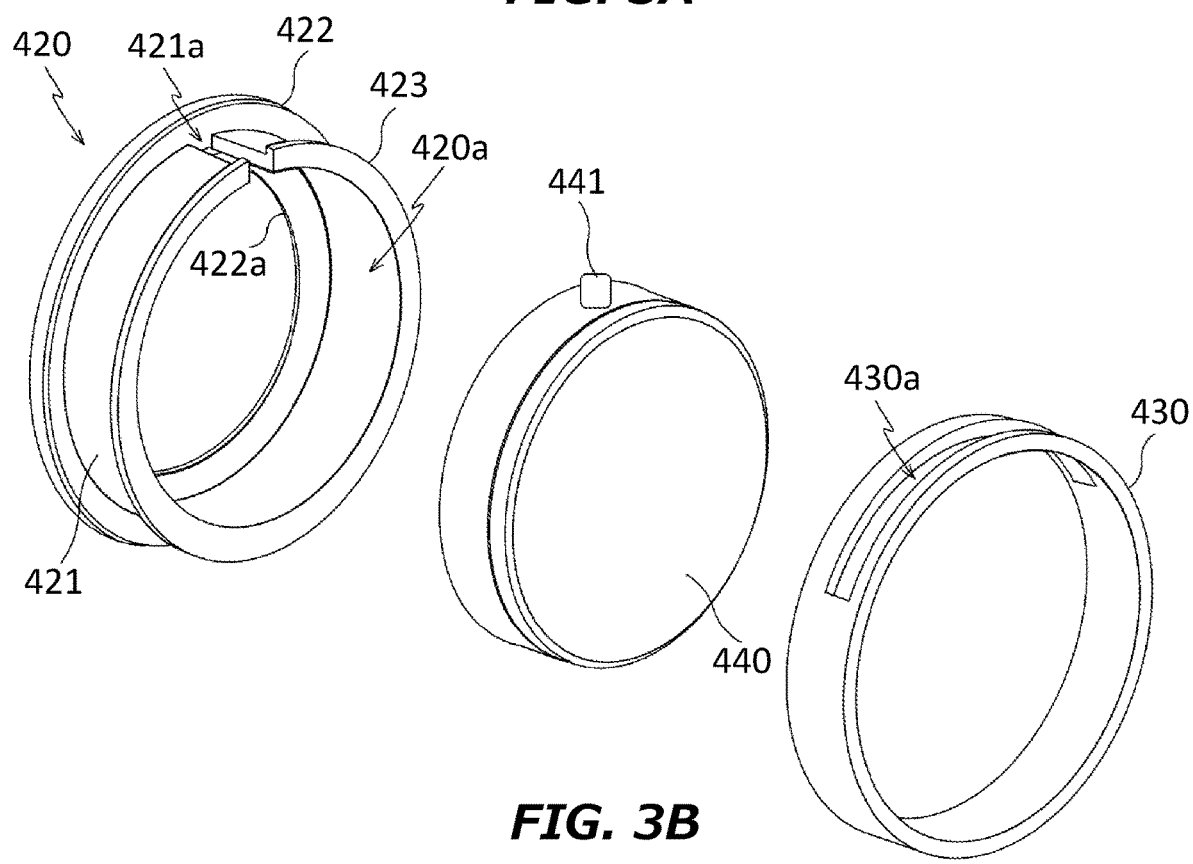
FIG. 3B illustrates an exploded configuration of the mobile device.

FIG. 3A and FIG. 3B illustrate an overall configuration and an exploded configuration of the mobile device 410, respectively. The mobile device 410 includes a first case 420, a second case 440, and a guide ring 430.

The first case 420 is a housing that accommodates the second case 440 in an internal space 420a so as to be unreeled. The first case 420 includes a body portion 421 and first and second flange portions 422 and 423. The body portion 421 has a cylindrical shape including the internal space 420a, and is provided with a slit 421a on the side surface to be extended in the axial direction. The first flange portion 422 is formed to protrude outward from one end of the body portion 421, and extends inward to form a circular opening 422a smaller than the inner diameter of the body portion 421. The second flange portion 423 is formed to protrude outward from the other end of the body portion 421.

The second case 440 is a housing that accommodates the lens 310 and the like. In the present embodiment, the second case 440 accommodates the display 110, the diffractive optical element 200, and the lens 310 in order from the near side to the far side in the drawing. The second case 440 is molded in a bottomed cylindrical shape having an outer diameter equal to or slightly smaller than the inner diameter of the body portion 421, and a guide pin 441 is provided on the side surface.

The guide ring 430 is a member that guides the movement of the second case 440 in the first case 420. The guide ring 430 has a cylindrical shape having an inner diameter equal to or slightly larger than the outer diameter of the body portion 421, and a slit 430a extending in a spiral shape is provided on the side surface.

The mobile device 410 is assembled as follows. First, while the guide pin 441 of the second case 440 enters the slit 421a of the body portion 421, the second case 440 is inserted into the internal space 420a of the first case 420. The second case 440 is positioned in contact with the inner edge of the first flange portion 422 in the first case 420. Then, while the guide pin 441 protruding upward from the slit 421a of the body portion 421 enters the slit 430a of the guide ring 430, the guide ring 430 is fitted to the outer periphery of the body portion 421 between the first and second flange portions 422 and 423.

Note that the filter 320 is fixed to the downstream side of the mobile device 410 in the housing 400.

Figure 4A:
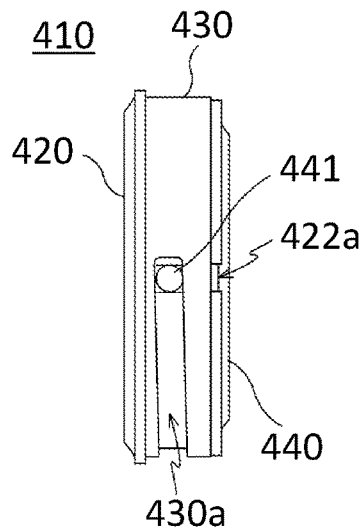
FIG. 4A illustrates the principle (minimum separation state) of lens movement by the mobile device.
Figure 4B:
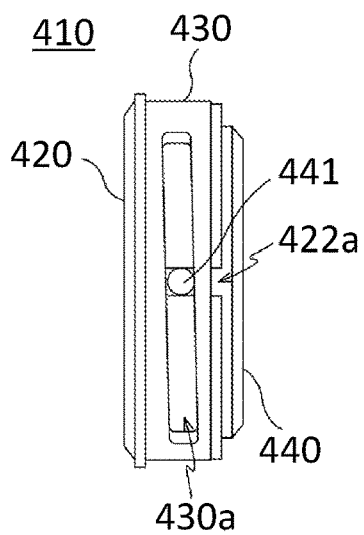
FIG. 4B illustrates the principle (unreeled state) of lens movement by the mobile device.
Figure 4C:
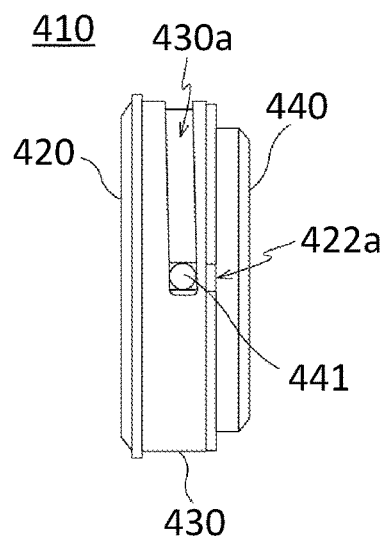
FIG. 4C illustrates the principle (maximum separation state) of lens movement by the mobile device.

FIG. 4A to FIG. 4C illustrate the principle of lens movement by the mobile device 410. First, in the state illustrated in FIG. 4A (minimum separation state), the guide pin 441 is located on one side of the slit 430a of the guide ring 430. At this time, the second case 440 is retracted into the first case 420. That is, the lens 310 is closest to the filter 320. Next, as illustrated in FIG. 4B (unreeled state), by rotating the side surface of the guide ring 430 on the near side in the drawing upward, the guide pin 441 is guided by the spiral slit 430a and moves in the slit 421a of the body portion 421 to the right side in the drawing, and accordingly, the second case 440 is unreeled from the first case 420 to the right side in the drawing. As illustrated in FIG. 4C (maximum separation state), the guide pin 441 reaches the other side of the slit 430a of the guide ring 430, so that the second case 440 is most unreeled from the first case 420. That is, the lens 310 is most separated from the filter 320. Conversely, by rotating the side surface of the guide ring 430 on the near side in the drawing downward, the guide pin 441 is guided by the spiral slit 430a and moves in the slit 421a of the body portion 421 to the left side in the drawing, and accordingly, as illustrated in FIG. 4A (minimum separation state), the second case 440 is retracted into the first case 420.

Therefore, the mobile device 410 maintains the relative positional relationship among the display 110, the diffractive optical element 200, and the lens 310 (the half mirror surface 311), and relatively moves the display 110, the diffractive optical element 200, and the lens 310 with respect to the filter 320 (the reflective polarizing plate 321).

Figure 5A:
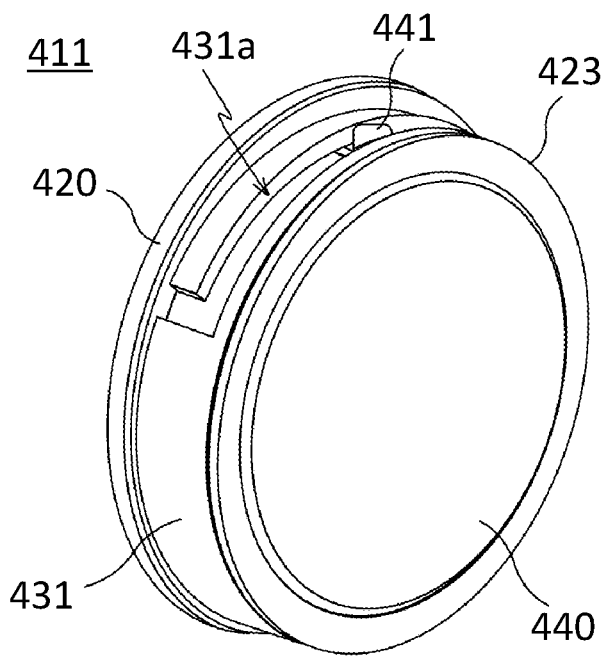
FIG. 5A illustrates an overall configuration of a mobile device according to a first modification.
Figure 5B:
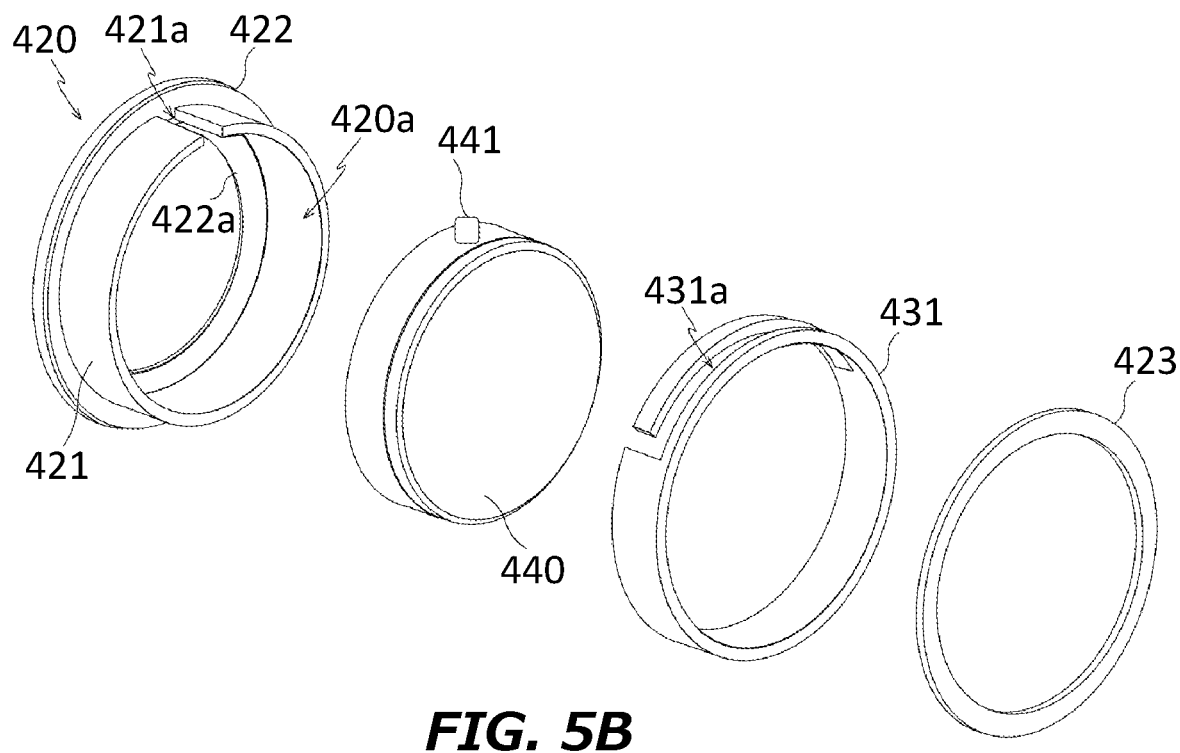
FIG. 5B illustrates an exploded configuration of the mobile device according to the first modification.

FIG. 5A and FIG. 5B illustrate an overall configuration and an exploded configuration of a mobile device 411 according to a first modification, respectively. The mobile device 411 includes the first case 420, the second case 440, a guide ring 431, and the second flange portion 423.

The first case 420 includes the body portion 421 and the first flange portion 422 described above.

The second case 440 is configured in a similar manner as described above.

The guide ring 431 has a cylindrical shape having an inner diameter equal to or slightly larger than the outer diameter of the body portion 421, and is provided, on a side surface, with a slit 431a extending in a spiral shape and having one side opening toward one end of the cylinder. Note that one side of the slit 431a that opens toward one end of the cylinder is referred to as an opening end, and a portion of the slit 431a that extends in a spiral shape is referred to as a spiral portion.

The second flange portion 423 is molded in a ring shape as a member independent from the first case 420 described above. The inner diameter of the second flange portion 423 is equal to the inner diameter of the body portion 421, and the outer diameter thereof is larger than the outer diameter of the body portion 421.

The mobile device 411 is assembled as follows. First, while the guide pin 441 of the second case 440 enters the slit 421a of the body portion 421, the second case 440 is inserted into the internal space 420a of the first case 420. The second case 440 is positioned in contact with the inner edge of the first flange portion 422 in the first case 420. Next, the guide pin 441 protruding upward from the slit 421a of the body portion 421 enters the slit 431a of the guide ring 431 from the opening end, and the guide ring 431 is rotated with respect to the first case 420 so that the guide pin 441 enters the spiral portion of the slit 431a. Finally, the second flange portion 423 is fixed to the end portion of the body portion 421 by adhesion, welding, screwing, or the like. As a result, the guide ring 431 is fitted into the outer periphery of the body portion 421 between the first and second flange portions 422 and 423.

Figure 6A:
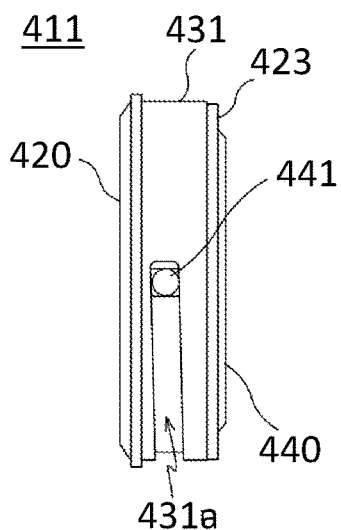
FIG. 6A illustrates the principle (minimum separation state) of lens movement by the mobile device according to the first modification.
Figure 6B:
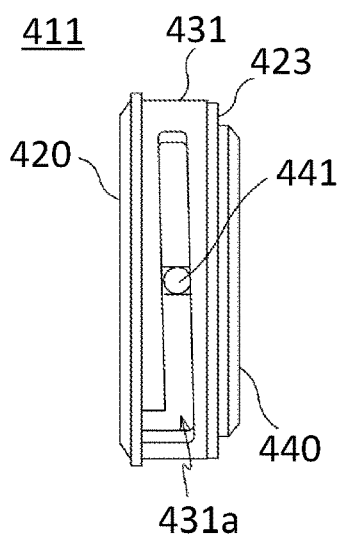
FIG. 6B illustrates the principle (unreeled state) of lens movement by the mobile device according to the first modification.
Figure 6C:
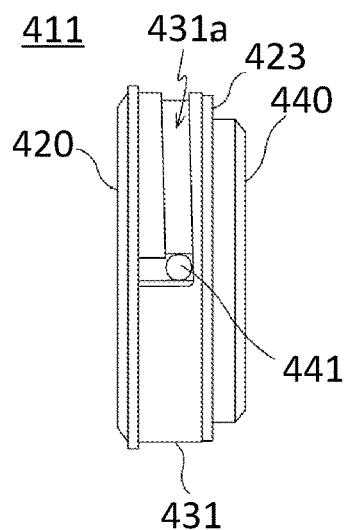
FIG. 6C illustrates the principle (maximum separation state) of lens movement by the mobile device according to the first modification.

FIG. 6A to FIG. 6C illustrate the principle of lens movement by the mobile device 411. First, in the state (minimum separation state) illustrated in FIG. 6A, the guide pin 441 is located on one side of the slit 431a of the guide ring 431. At this time, the second case 440 is retracted into the first case 420. That is, the lens 310 is closest to the filter 320. Next, as illustrated in FIG. 6B (unreeled state), by rotating the side surface of the guide ring 431 on the near side in the drawing upward, the guide pin 441 is guided by the spiral portion of the slit 431a and moves in the slit 421a of the body portion 421 to the right side in the drawing, and accordingly, the second case 440 is unreeled from the first case 420 to the right side in the drawing. As illustrated in FIG. 6C (maximum separation state), the guide pin 441 reaches the other side of the slit 431a of the guide ring 431, so that the second case 440 is most unreeled from the first case 420. That is, the lens 310 is most separated from the filter 320. Conversely, by rotating the side surface of the guide ring 431 on the near side in the drawing downward, the guide pin 441 is guided by the spiral portion of the slit 431a and moves in the slit 421a of the body portion 421 to the left side in the drawing, and accordingly, as illustrated in FIG. 6A (minimum separation state), the second case 440 is retracted into the first case 420.

Therefore, similarly to the mobile device 410, the mobile device 411 maintains the relative positional relationship among the display 110, the diffractive optical element 200, and the lens 310 (the half mirror surface 311), and relatively moves the display 110, the diffractive optical element 200, and the lens 310 with respect to the filter 320 (the reflective polarizing plate 321).

Figure 7A:
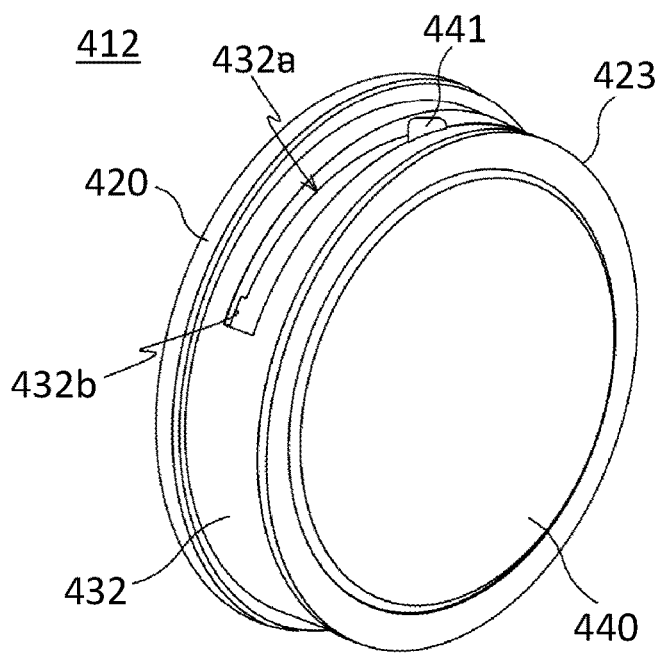
FIG. 7A illustrates an overall configuration of a mobile device according to a second modification.
Figure 7B:
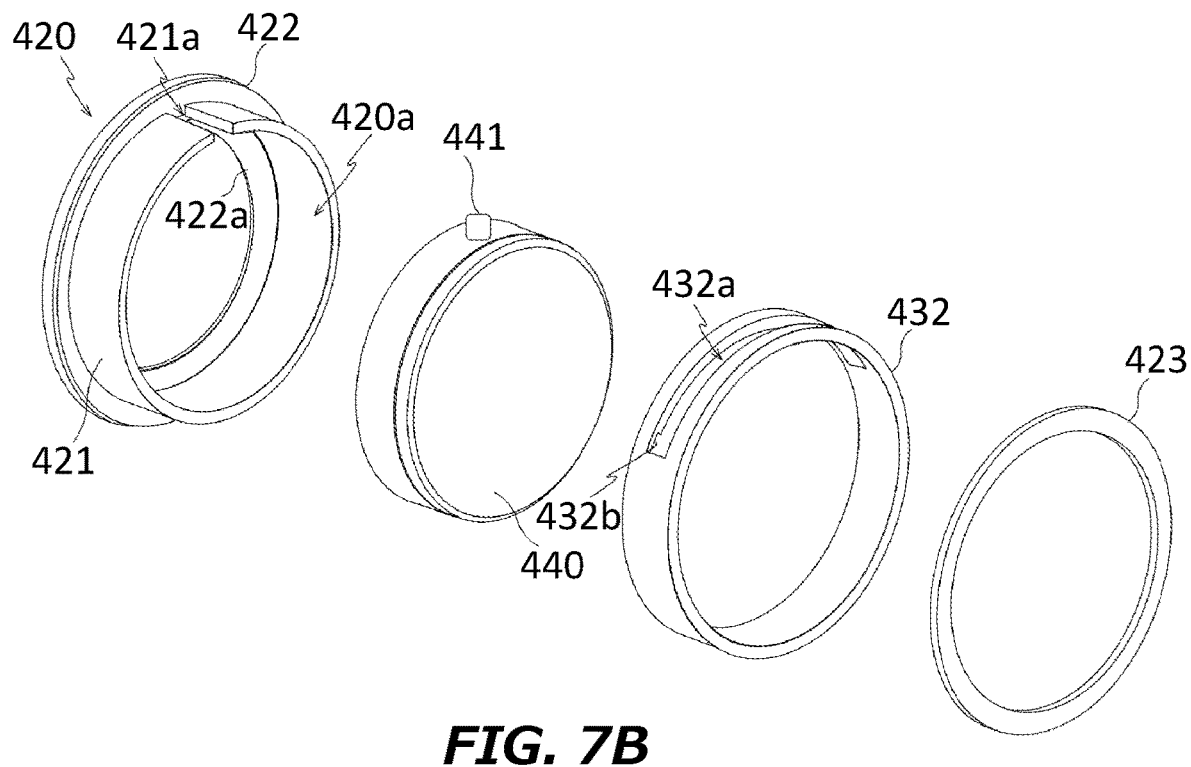
FIG. 7B illustrates an exploded configuration of the mobile device according to the second modification.

FIG. 7A and FIG. 7B illustrate an overall configuration and an exploded configuration of a mobile device 412 according to a second modification, respectively. The mobile device 412 includes the first case 420, the second case 440, a guide ring 432, and the second flange portion 423.

The first case 420, the second case 440, and the second flange portion 423 are configured similarly to those in the mobile device 411 according to the first modification described above. However, the guide pin 441 of the second case 440 is formed slightly lower than that of the first modification.

The guide ring 432 has a cylindrical shape having an inner diameter equal to or slightly larger than the outer diameter of the body portion 421, and a slit 432a extending in a spiral shape and a tunnel portion 432b having a groove shape provided on the inner surface from one side of the slit 432a toward one end of the cylinder are provided on the side surface. The thickness of the tunnel portion 432b is thinner than the other portions.

Instead of the slit 432a, a spiral groove portion may be formed on the inner surface of the guide ring 432. The groove portion is connected to the tunnel portion 432b on one side thereof. As a result, the second case 440 is sealed in the first case 420 by the guide ring 432, and mixing of foreign matter such as dust can be prevented.

The mobile device 412 is assembled as follows. First, while the guide pin 441 of the second case 440 enters the slit 421a of the body portion 421, the second case 440 is inserted into the internal space 420a of the first case 420. The second case 440 is positioned in contact with the inner edge of the first flange portion 422 in the first case 420. Next, the guide pin 441 protruding upward from the slit 421a of the body portion 421 enters the slit 432a through the tunnel portion 432b of the guide ring 432, and the guide ring 432 is rotated with respect to the first case 420 to move the guide pin 441 to the back side of the slit 432a. Finally, the second flange portion 423 is fixed to the end portion of the body portion 421 by adhesion, welding, screwing, or the like. As a result, the guide ring 432 is fitted into the outer periphery of the body portion 421 between the first and second flange portions 422 and 423.

Figure 8A:
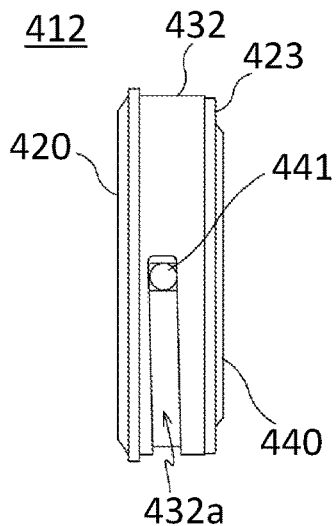
FIG. 8A illustrates the principle (minimum separation state) of lens movement by the mobile device according to the second modification.
Figure 8B:
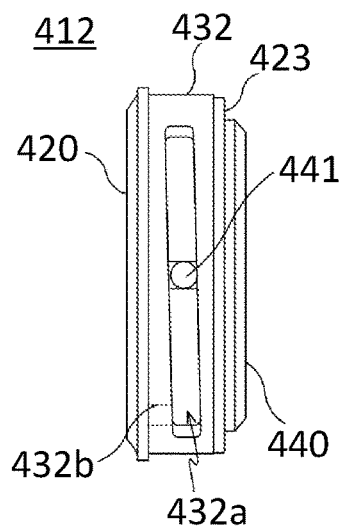
FIG. 8B illustrates the principle (unreeled state) of lens movement by the mobile device according to the second modification.
Figure 8C:
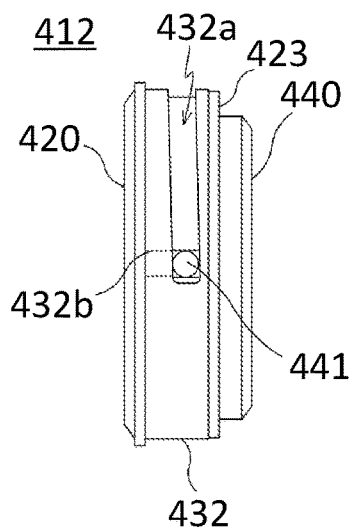
FIG. 8C illustrates the principle (maximum separation state) of lens movement by the mobile device according to the second modification.

FIG. 8A to FIG. 8C illustrate the principle of lens movement by the mobile device 412. First, in the state (minimum separation state) illustrated in FIG. 8A, the guide pin 441 is located on one side of the slit 432a of the guide ring 432. At this time, the second case 440 is retracted into the first case 420. That is, the lens 310 is closest to the filter 320. Next, as illustrated in FIG. 8B (unreeled state), by rotating the side surface of the guide ring 432 on the near side in the drawing upward, the guide pin 441 is guided by the slit 432a and moves in the slit 421a of the body portion 421 to the right side in the drawing, and accordingly, the second case 440 is unreeled from the first case 420 to the right side in the drawing. As illustrated in FIG. 8C (maximum separation state), the guide pin 441 reaches the other side of the slit 432a of the guide ring 432, so that the second case 440 is most unreeled from the first case 420. That is, the lens 310 is most separated from the filter 320. Conversely, by rotating the side surface of the guide ring 432 on the near side in the drawing downward, the guide pin 441 is guided by the slit 432a and moves in the slit 421a of the body portion 421 to the left side in the drawing, and accordingly, as illustrated in FIG. 8A (minimum separation state), the second case 440 is retracted into the first case 420.

Therefore, similarly to the mobile device 410, the mobile device 412 maintains the relative positional relationship among the display 110, the diffractive optical element 200, and the lens 310 (the half mirror surface 311), and relatively moves the display 110, the diffractive optical element 200, and the lens 310 with respect to the filter 320 (the reflective polarizing plate 321).

In the optical apparatus 100, it is necessary to keep the field curvature of the virtual image displayed at the virtual image position within the focal depth of the optical system 300. However, in the case of the triple-pass optical system 300, since the focal depth is shallow, there is a problem that the field curvature does not fall within the focal depth as the diopter of the optical system 300 is changed. Therefore, in the optical apparatus 100 according to the present embodiment, the lens 310 (the half mirror surface 311) is moved along the optical axis L with respect to the filter 320 (the reflective polarizing plate 321) by the mobile device 410, and the field curvature is adjusted by changing the distance between the reflective polarizing plate 321 and the half mirror surface 311, and it is possible to keep the field curvature within the focal depth for each diopter.

Figure 9A:
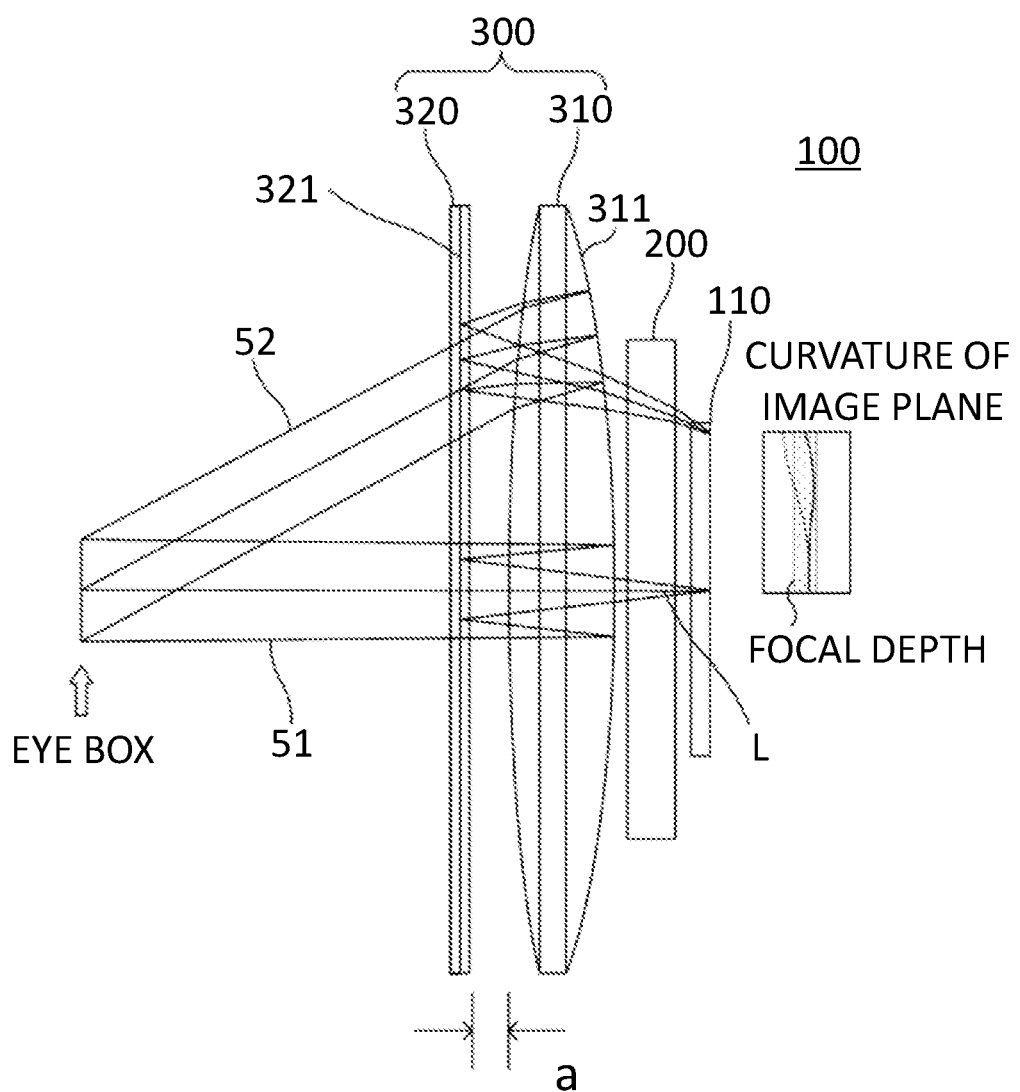
FIG. 9A illustrates a change in field curvature when a distance (air distance) between a reflective polarizing plate and a half mirror surface is changed (air distance: small).
Figure 9B:
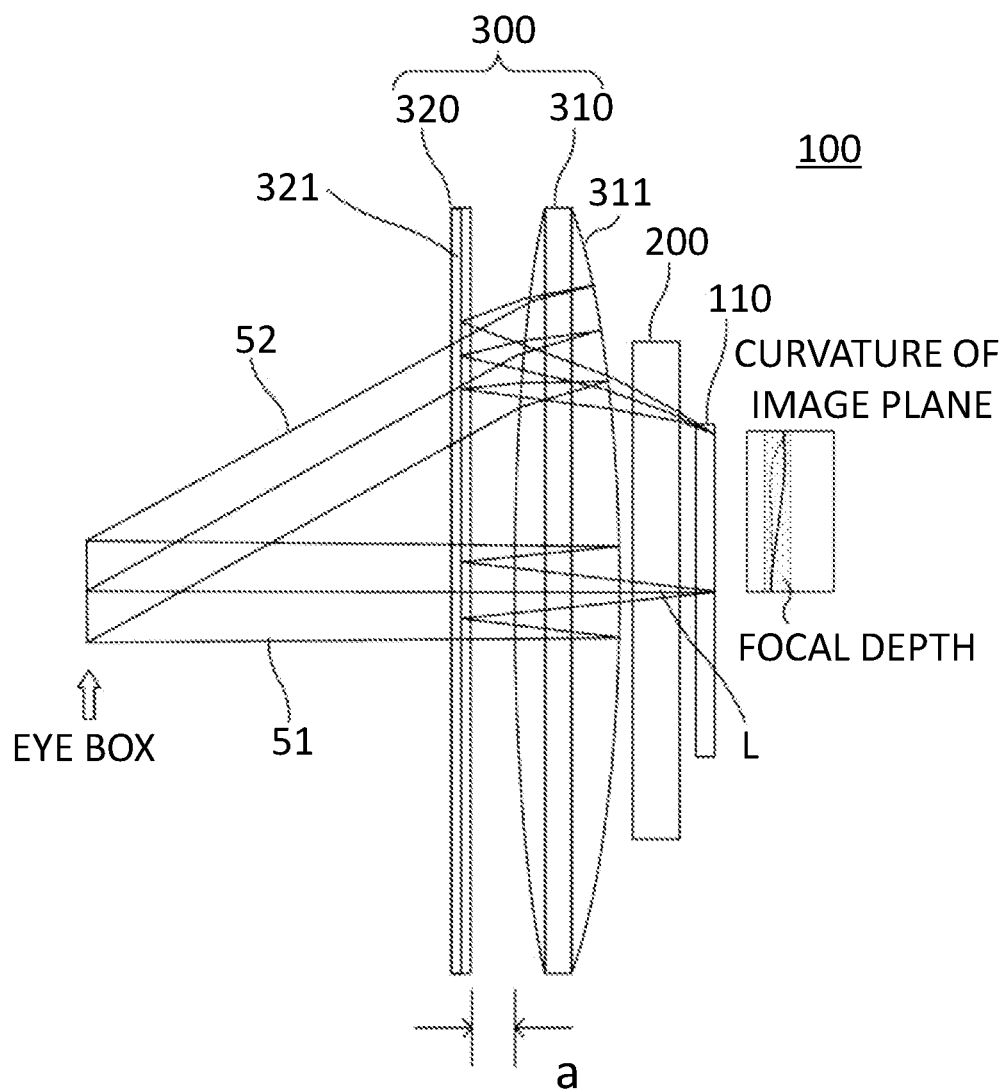
FIG. 9B illustrates a field curvature when the distance (air distance) between the reflective polarizing plate and the half mirror surface is changed (air distance: intermedium).
Figure 9C:
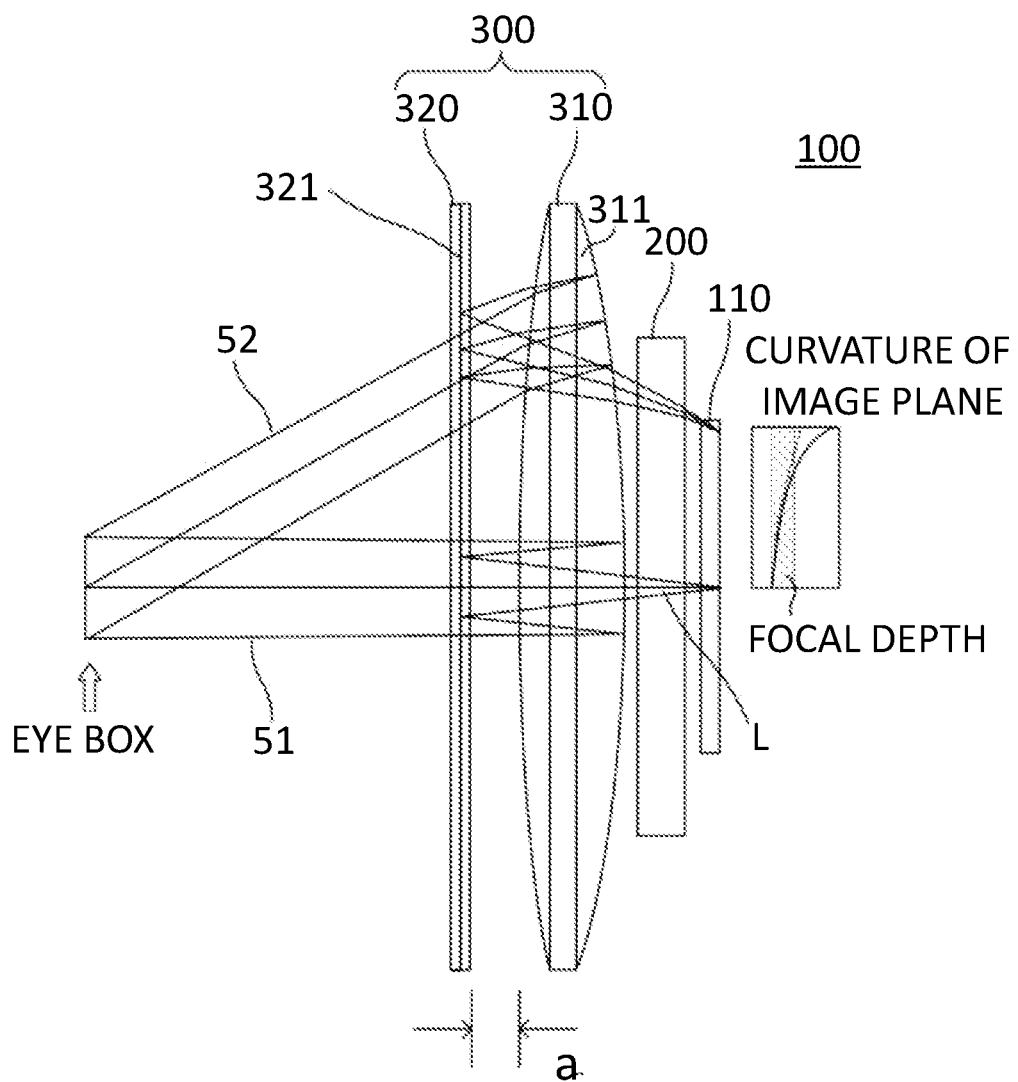
FIG. 9C illustrates a field curvature when the distance (air distance) between the reflective polarizing plate and the half mirror surface is changed (air distance: large).

FIG. 9A to FIG. 9C illustrate changes in the trajectory of the light beam and the field curvature in a case where the diopter of the optical system 300 is uniquely set, and a distance a (referred to as a spatial distance or an air distance) between the reflective polarizing plate 321 and the half mirror surface 311 is changed by moving the lens 310 (the half mirror surface 311) along the optical axis L with respect to the filter 320 (the reflective polarizing plate 321). However, in a light beam reverse tracking simulation, a light beam is drawn from the virtual image position toward the eye box, and retroreflected on the eye box to follow the trajectory of the light beam toward the display 110, and the curvature of the image plane imaged on the display is analyzed. Note that, in the present example, the diopter of the optical system 300 is set to −3. Each drawing illustrates a light beam (referred to as center light 51) horizontally reflected from the eye box to the upstream side to reach the center of the display surface of the display 110 and a light beam (referred to as ambient light 52) reflected obliquely upward from the eye box to the upstream side to reach the upper end of the display 110.

FIG. 9A illustrates the trajectory of the light beam and the field curvature on the display surface of the display 110 in the case of the air distance a=1.5 mm. Note that the field curvature is indicated at a position in the optical axis L direction where the light beam is most focused. Here, the solid line indicates the field curvature on the tangential plane, and the broken line indicates the field curvature on the sagittal plane. The hatched region represents the range of the focal diopter of the optical system 300, and the field curvature needs to fall within this range. The center light 51 horizontally reflected from the eye box to the upstream side is transmitted through the filter 320, enters the lens 310, is reflected at the center of the half mirror surface 311, is condensed and transmitted to the downstream side, is reflected on the reflective polarizing plate 321 in the filter 320, is transmitted through the lens 310, is further condensed, and reaches the center of the display 110 via the diffractive optical element 200. The ambient light 52 reflected obliquely upward from the eye box to the upstream side passes through the filter 320, enters the lens 310, is reflected on the upper side of the half mirror surface 311, is condensed and transmitted obliquely downward to the downstream side, is reflected on the reflective polarizing plate 321 in the filter 320, is transmitted through the lens 310, is further condensed, and reaches the upper end of the display 110 via the diffractive optical element 200. The image plane tends to be imaged on the downstream side in the periphery relative to the center of the display 110 and somewhat beyond the range of the focal depth.

FIG. 9B illustrates the trajectory of the light beam and the field curvature on the display surface of the display 110 in the case of the air distance a=1.7 mm. The center light 51 horizontally reflected from the eye box to the upstream side is condensed similarly to the case of the air distance a=1.5 mm, and reaches the center of the display 110 following the same optical path. The ambient light 52 reflected obliquely upward from the eye box to the upstream side passes through the filter 320, enters the lens 310, is further reflected on the upper side of the half mirror surface 311, is condensed and transmitted obliquely downward to the downstream side, is reflected on the reflective polarizing plate 321 in the filter 320, is transmitted through the lens 310, is further condensed, and reaches the upper side of the display 110 via the diffractive optical element 200. The field curvature is small and is within the focal depth.

FIG. 9C illustrates the trajectory of the light beam and the field curvature on the display surface of the display 110 in the case of the air distance a=1.9 mm. The center light 51 horizontally reflected from the eye box to the upstream side is condensed similarly to the case of the air distance a=1.5 mm, and reaches the center of the display 110 following the same optical path. The ambient light 52 reflected obliquely upward from the eye box to the upstream side passes through the filter 320, enters the lens 310, is further reflected on the upper side of the half mirror surface 311, is condensed and transmitted obliquely downward to the downstream side, is reflected on the reflective polarizing plate 321 in the filter 320, is transmitted through the lens 310, is further condensed, and reaches the upper side of the display 110 via the diffractive optical element 200. The image plane tends to be imaged on the upstream side in the periphery relative to the center of the display 110 and somewhat beyond the range of the focal depth.

Figure 10A:
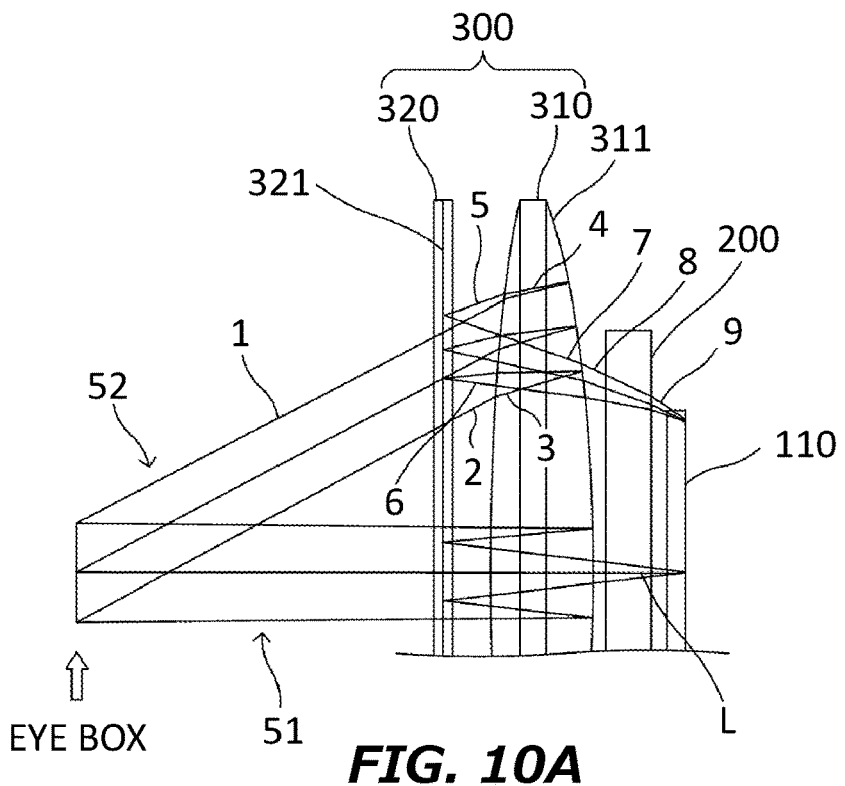
FIG. 10A illustrates a definition of a light beam section in the optical apparatus.

FIG. 10A illustrates a definition of a light beam section in the optical apparatus 100. Here, a light beam section 1 represents a section from the eye box to the emission surface of the filter 320, a light beam section 2 represents a section from the incident surface of the filter 320 to the emission surface of the lens 310, a light beam section 3 represents a section from the emission surface of the lens 310 to the incident surface (the half mirror surface 311) of the lens 310, a light beam section 4 represents a section from the incident surface (the half mirror surface 311) of the lens 310 to the emission surface of the lens 310, a light beam section 5 represents a section from the emission surface of the lens 310 to the incident surface of the filter 320, a light beam section 6 represents a section from the incident surface of the filter 320 to the emission surface of the lens 310, a light beam section 7 represents a section from the emission surface of the lens 310 to the incident surface of the lens 310, a light beam section 8 represents a section from the incident surface of the lens 310 to the emission surface of the diffractive optical element 200, and a light beam section 9 represents a section from the incident surface of the diffractive optical element 200 to the emission surface of the display 110. Note that, although the light beam sections are defined for the ambient light 52 in FIG. 10A, the center light 51 is also defined in a similar manner.

Figure 10B:
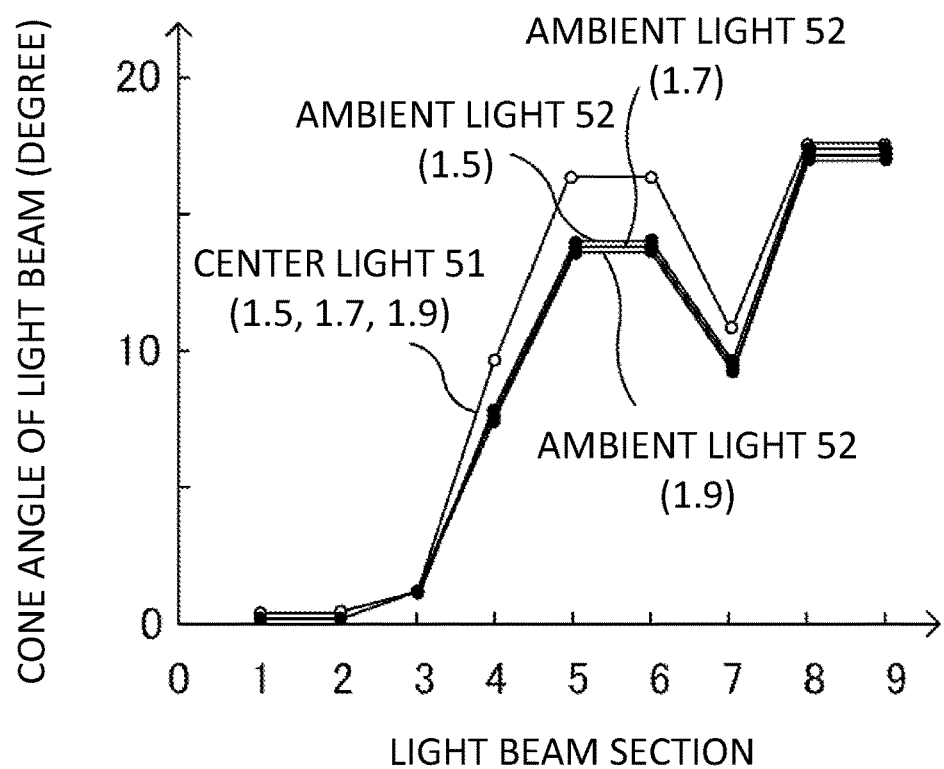
FIG. 10B illustrates a cone angle of a light beam in each light beam section illustrated in FIG. 10A.

FIG. 10B illustrates cone angles of the center light 51 and the ambient light 52 in each of the light beam sections 1 to 9 in the optical apparatus 100 defined in FIG. 10A. The cone angle of the center light 51 is equal for each of the air distances a=1.5, 1.7, and 1.9 mm, is zero in the light beam sections 1 and 2, increases in the sections 3 and 4, that is, is expanded by entering the lens 310, becomes constant in the sections 5 and 6, decreases in the section 7, increases again in the section 8, and reaches the display 110 at the maximum angle in the section 9. The behavior of the cone angle of the ambient light 52 is the same as the cone angle of the center light 51. However, the cone angle of the ambient light 52 varies depending on the air distance after the section 4 in which the ambient light 52 enters the lens 310. That is, as the air distance increases, the ambient light 52 enters the upper side of the half mirror surface 311, so that the cone angle decreases, and the ambient light 52 is condensed far. As the air distance decreases, the ambient light 52 enters the lower side of the half mirror surface 311, so that the cone angle increases, and the ambient light 52 is condensed near.

By changing the air distance, the light flux condensed position around the screen can be changed back and forth with respect to the light flux condensed position at the screen center, thereby adjusting the field curvature. Note that, as illustrated in FIG. 2B, the change amount of the cone angle increases toward the periphery of the half mirror surface 311, so that the field curvature can be corrected by changing the air distance.

Figure 11:
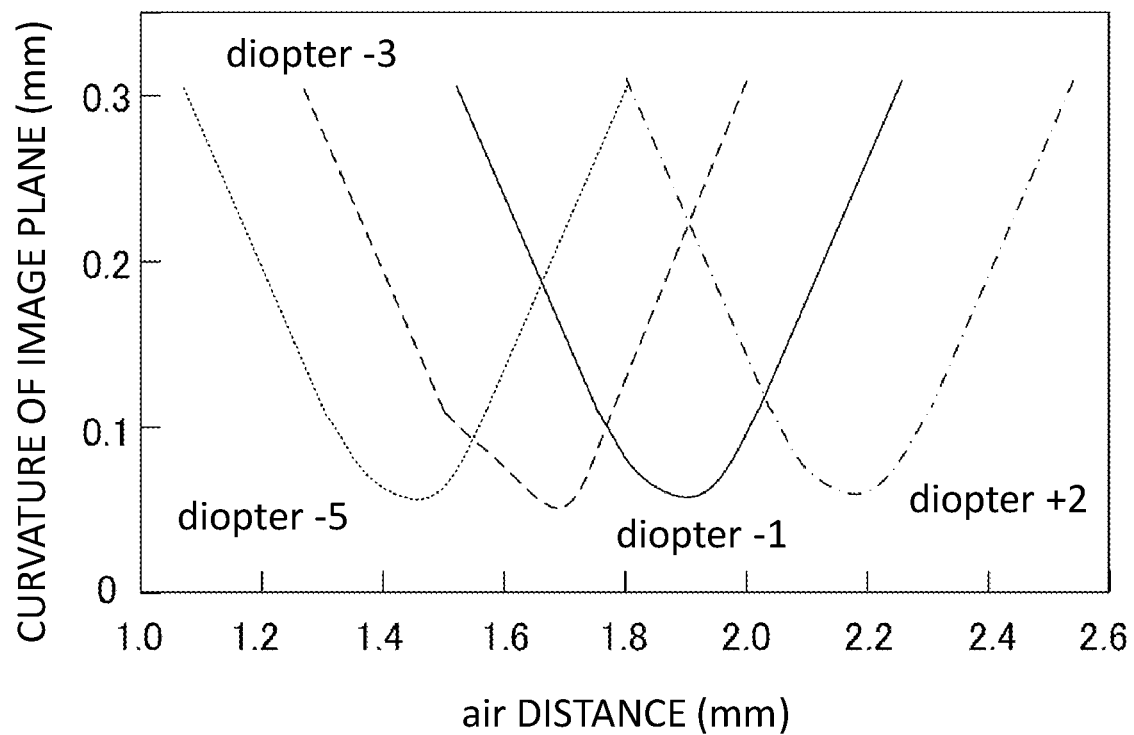
FIG. 11 illustrates a change in field curvature with respect to air distance in each diopter.

FIG. 11 illustrates a change in field curvature with respect to the air distance for each of the diopters −5, −3, −1, and +2. The field curvature decreases as the air distance increases, exhibiting a minimum at some air distance, and exhibits behavior that increases as the air distance further increases. For each diopter, there is an air distance at which the field curvature is minimized. Therefore, it can be seen that the field curvature can be minimized more precisely according to the diopter by roughly selecting the diopter according to the diopter of the user, designing the optical system 300, and moving the optical system 300 with respect to the filter 320.

FIG. 12A illustrates detailed configurations of the diffractive optical element 200, the lens 310, and the filter 320 included in the optical apparatus 100 according to Models 1 to 3. In Model 1, the diffractive optical element 200 is configured by stacking a GPL (GPH lens) element, a filter A, a GPL element, and a filter B in order from the upstream side to the downstream side. The lens 310 is configured by stacking a half mirror and a biconvex lens in order from the upstream side to the downstream side. The filter 320 is configured by stacking a λ/4 plate, a reflective polarizing plate, and a polarizing plate in order from the upstream side to the downstream side. In the optical apparatus 100 according to Model 1, the diffractive optical element 200 is configured similarly to the diffractive optical element 200 according to the above-described embodiment, and chromatic aberration is suppressed by two GPH elements (GPL elements) and the CSF element. In Model 2, the diffractive optical element 200 includes a filter C. The lens 310 is configured by stacking a half mirror, a biconvex lens, and a concave meniscus lens in order from the upstream side to the downstream side. The filter 320 is configured similarly to Model 1. In the optical apparatus 100 according to Model 2, the diffractive optical element 200 does not include the GPH element (GPL element) and the CSF element, and chromatic aberration is suppressed only by the configuration of the lens 310. In Model 3, the diffractive optical element 200 is configured by stacking the GPL element and a filter B in order from the upstream side to the downstream side. The lens 310 is configured similarly to Model 2. The filter 320 is configured similarly to Model 1. In the optical apparatus 100 according to Model 3, the diffractive optical element 200 does not include the CSF element, and chromatic aberration is suppressed only by the GPH element (GPL element).

FIG. 12B illustrates a detailed configuration of the filters A to C. Each filter is configured by stacking the elements listed in the right column in order from the upstream side to the downstream side.

FIG. 13A illustrates a detailed design of the optical apparatus 100 according to Example 1. In Example 1, Model 1 of FIG. 12A is adopted, and the optical apparatus 100 is designed according to various parameters given to the lens specification, the aspheric coefficient, the GPL data, and the variable interval data. In the optical apparatus 100, a focal length B is uniquely determined by designing the lens 310 by applying the lens parameter to the lens configuration of Model 1, and the position of the magnified virtual image can be adjusted according to the diopter of the user by determining a focal length A of the entire optical system 300 by adjusting the air distance or the like. Therefore, it is considered that the detailed configuration of the optical apparatus 100 can be summarized by the ratio A/B of the focal length A of the entire optical system 300 to the focal length B of the lens 310. In the present example, the ratios A/B are given as 0.183, 0.176, and 0.168 with respect to +2, −1, and −5 diopters, respectively. Note that X diopter indicates a state in which the magnified virtual image by the optical system can be located at a position of 1/X [m] on the optical axis from the eye box. However, the sign is positive when the image is formed on the downstream side of the optical system.

Figure 13B:
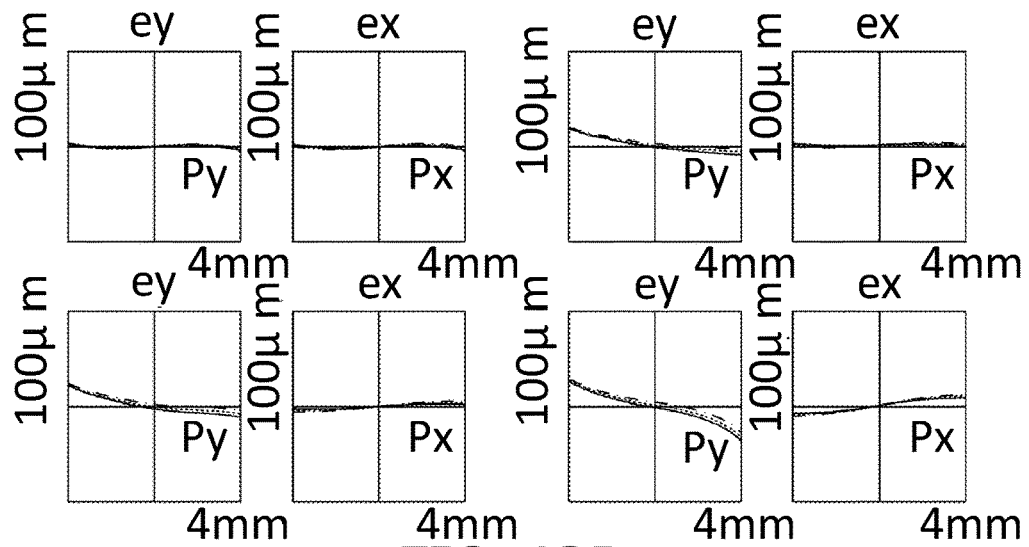
FIG. 13B illustrates a lateral aberration detected with respect to +2 diopter in the optical apparatus according to Example 1.
Figure 13C:
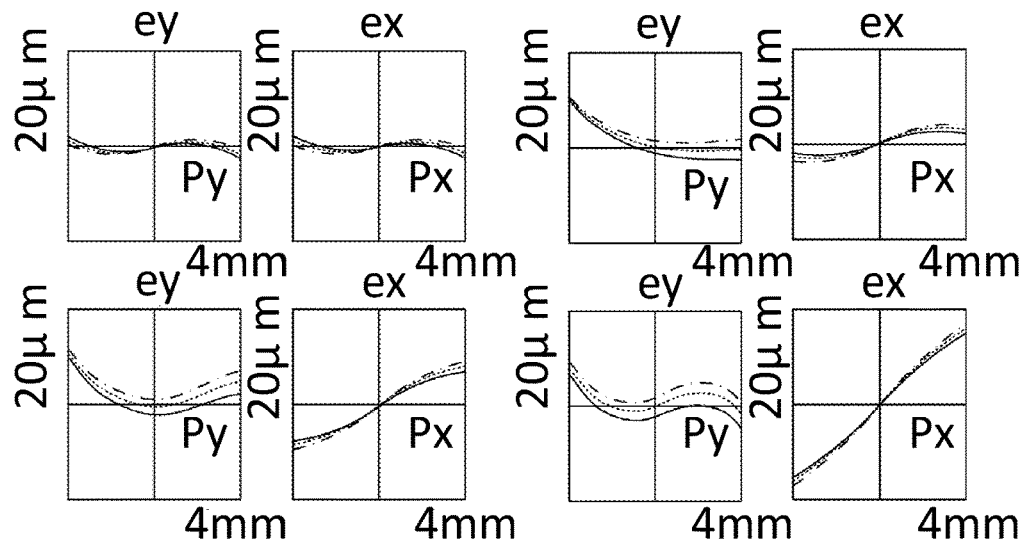
FIG. 13C illustrates a lateral aberration detected with respect to −1 diopter in the optical apparatus according to Example 1.
Figure 13D:
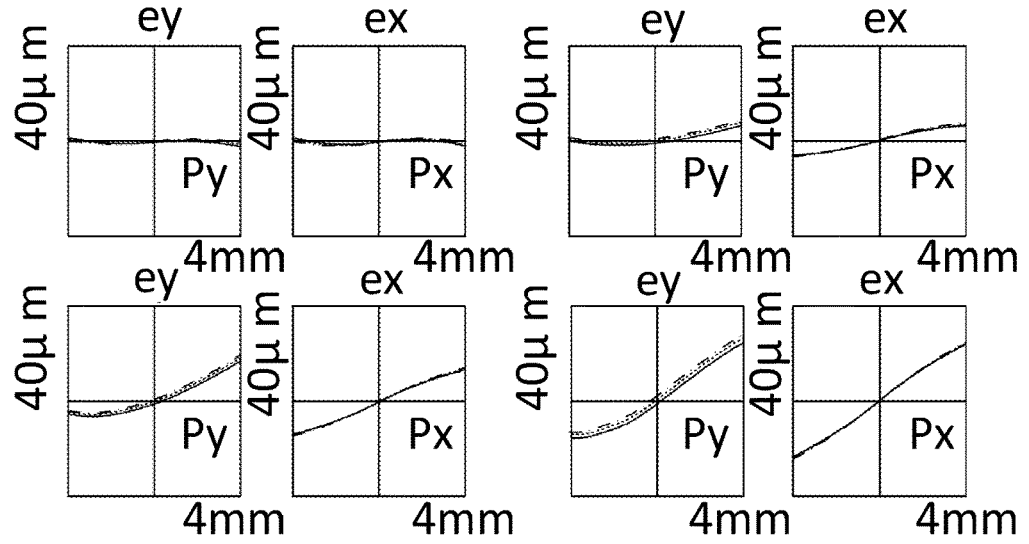
FIG. 13D illustrates a lateral aberration detected with respect to −5 diopter in the optical apparatus according to Example 1.

FIG. 13B, FIG. 13C, and FIG. 13D illustrate lateral aberrations detected with respect to +2, −1, and −5 diopters (ratios A/B=0.183, 0.176, and 0.168), respectively, in the optical apparatus 100 according to Example 1. Here, the upper left set of diagrams illustrates the center of the image, the upper right set of diagrams illustrates the center of the upper and lower ends of the image, the lower left set of diagrams illustrates the center of the left and right ends, and the lower right set of diagrams illustrates the aberration at the diagonal. Py and Px are coordinates (full scale: 4 mm) on the aperture plane (at the position of the eye box), and ey and ex are the aberration amount of the tangential plane and the aberration amount of the sagittal plane (full scale is shown in each drawing), respectively. The solid line indicates an aberration with respect to a wavelength of 0.515 μm, the dotted line indicates an aberration with respect to a wavelength of 0.528 μm, and the alternate long and short dash line indicates aberration with respect to a wavelength of 0.544 μm.

Figure 13E:
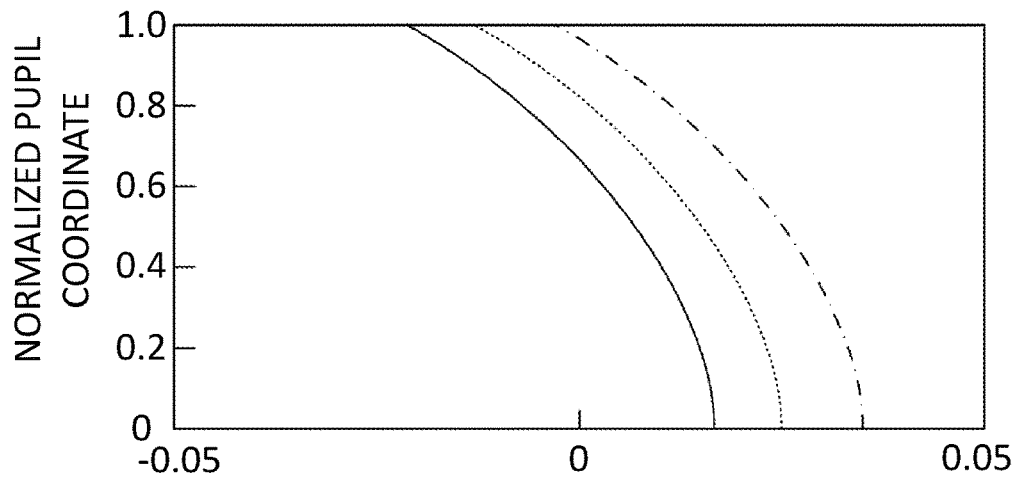
FIG. 13E illustrates a spherical aberration detected with respect to +2 diopter in the optical apparatus according to Example 1.
Figure 13F:
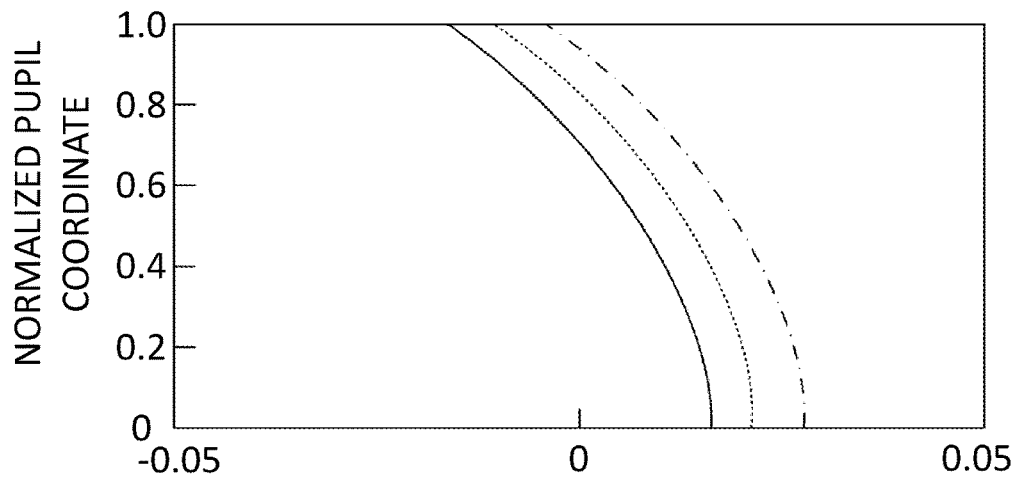
FIG. 13F illustrates a spherical aberration detected with respect to −1 diopter in the optical apparatus according to Example 1.
Figure 13G:
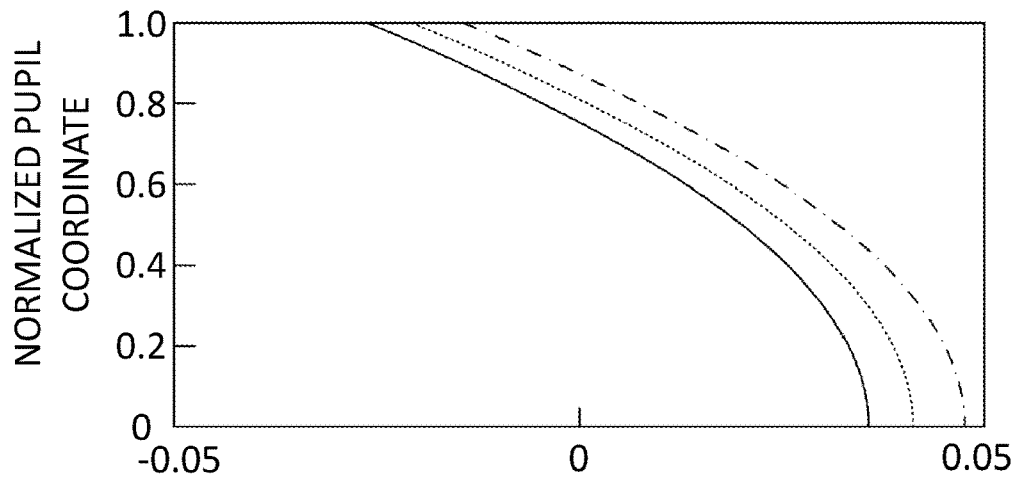
FIG. 13G illustrates a detected spherical aberration with respect to −5 diopter in the optical apparatus according to Example 1.

FIG. 13E, FIG. 13F, and FIG. 13G illustrate spherical aberrations on the optical axis detected with respect to +2, −1, and −5 diopters (ratios A/B=0.183, 0.176, and 0.168), respectively, in the optical apparatus 100 according to Example 1. Here, the vertical axis represents normalized pupil coordinates (full scale: 4 mm) at the position of the eye box, and the horizontal axis represents the aberration amount. In each drawing, the solid line indicates an aberration with respect to a wavelength of 0.515 μm, the dotted line indicates an aberration with respect to a wavelength of 0.528 μm, and the alternate long and short dash line indicates aberration with respect to a wavelength of 0.544 μm.

Figure 13H:
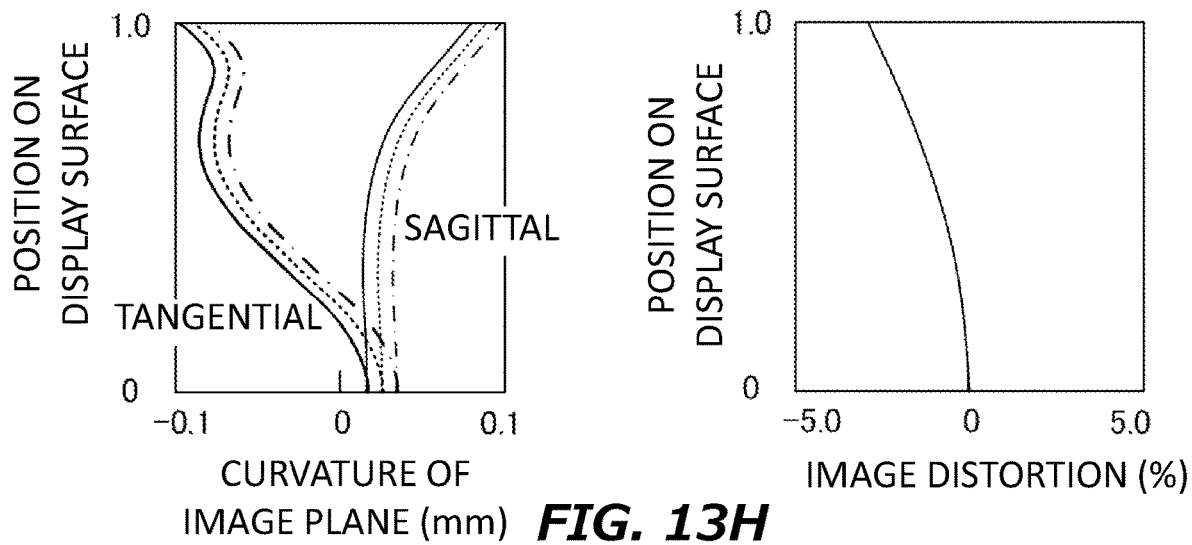
FIG. 13H illustrates a field curvature (left diagram) and an image distortion (right diagram) detected with respect to +2 diopter in the optical apparatus according to Example 1.
Figure 13I:
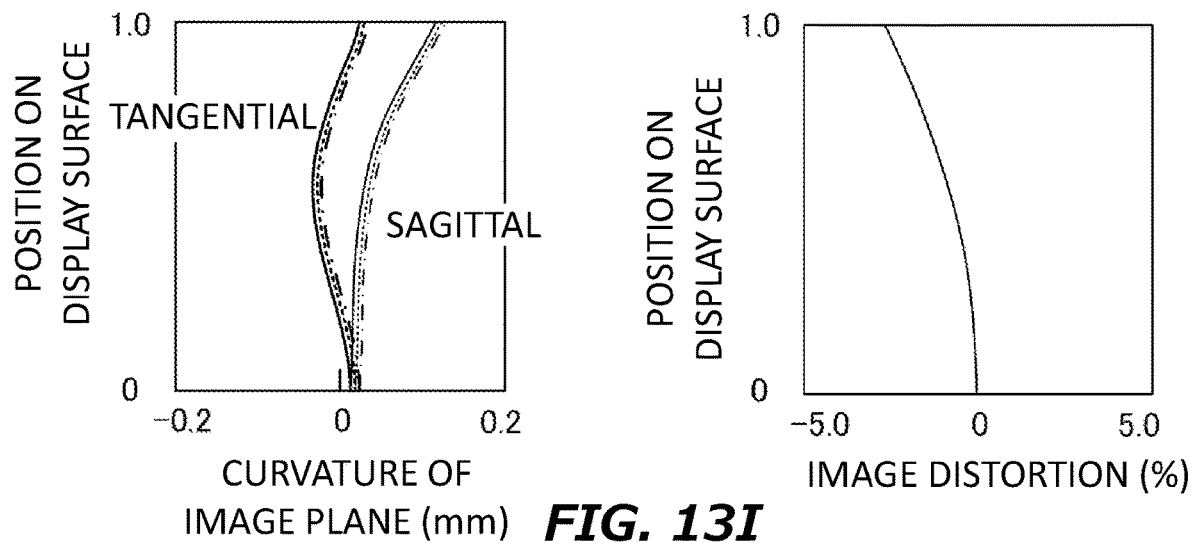
FIG. 13I illustrates a field curvature (left diagram) and an image distortion (right diagram) detected with respect to −1 diopter in the optical apparatus according to Example 1.
Figure 13J:
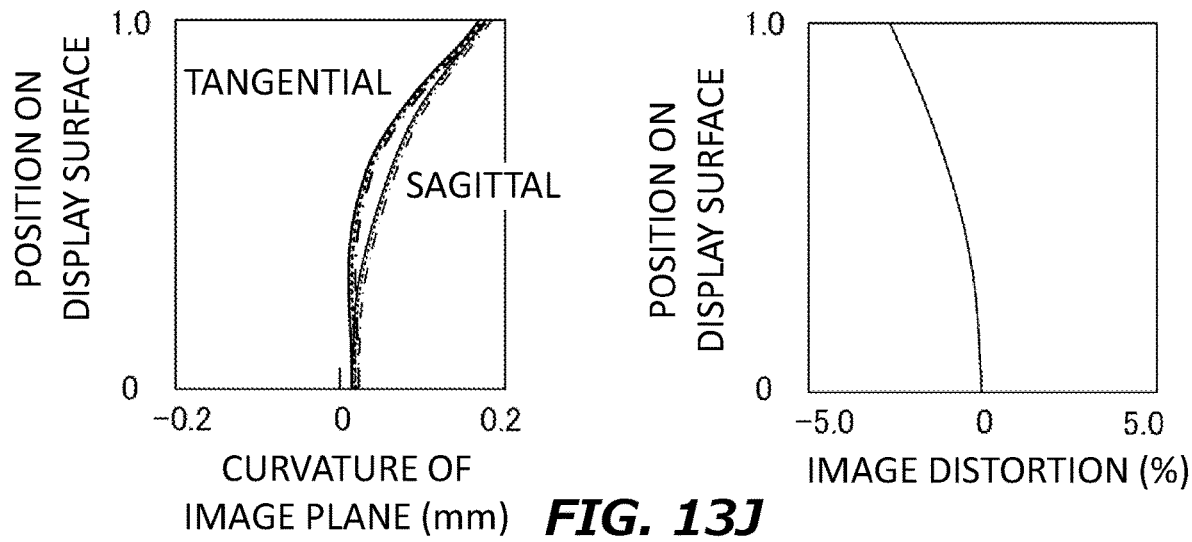
FIG. 13J illustrates a field curvature (left diagram) and an image distortion (right diagram) detected with respect to −5 diopter in the optical apparatus according to Example 1.

FIG. 13H, FIG. 13I, and FIG. 13J illustrate field curvatures (left diagram) and image distortion (right diagram) detected with respect to +2, −1, and −5 diopters (ratios A/B=0.183, 0.176, and 0.168), respectively, in the optical apparatus 100 according to Example 1. Similarly to the field curvature illustrated in FIG. 9A to FIG. 9C, the field curvature is illustrated on the horizontal axis with respect to the position (the outermost position is 1.0) to the center on the display surface [110] of the vertical axis. The field curvature on the tangential plane and the field curvature on the sagittal plane are shown, respectively. The image distortion is shown on the horizontal axis with respect to the position on the diagonal to the center on the display surface of the vertical axis. In each drawing, the solid line indicates a wavelength of 0.515 µm, the dotted line indicates a wavelength of 0.528 µm, and the alternate long and short dash line indicates the field curvature and the image distortion with respect to a wavelength of 0.544 µm.

In FIG. 13H (+2 diopter, ratio A/B=0.183), the image plane is imaged on the downstream side in the periphery with respect to the center of the display 110 on the tangential plane, and is imaged on the upstream side in the periphery with respect to the center of the display 110 on the sagittal plane. The image distortion shows a negative distortion with respect to the center of the display 110, that is, the image is distorted in a barrel shape.

In FIG. 13I (−1 diopter, ratio A/B=0.176), the image plane is imaged on the somewhat upstream side in the periphery with respect to the center of the display 110 on the tangential plane, and is imaged on the upstream side in the periphery with respect to the center of the display 110 on the sagittal plane. The image distortion shows a negative distortion with respect to the center of the display 110, that is, the image is distorted in a barrel shape.

In FIG. 13J (−5 diopter, ratio A/B=0.168), the image plane is imaged on the downstream side in the periphery with respect to the center of the display 110 on the tangential plane and the sagittal plane. Note that the wavelength dependency of the field curvature is very small. The image distortion shows a negative distortion with respect to the center of the display 110, that is, the image is distorted in a barrel shape.

In the optical apparatus 100 according to Example 1, the field curvature has been within a range of ±0.2 mm with respect to +2, −1, and −5 diopters (ratios A/B=0.183, 0.176, and 0.168), and the image distortion has been about −3% at maximum.

FIG. 14A illustrates a detailed design of the optical apparatus 100 according to Example 2. In Example 2, Model 1 of FIG. 12A is adopted, and the optical apparatus 100 is designed according to various parameters given to the lens specification, the aspheric coefficient, the GPL data, and the variable interval data. In the present example, the ratios A/B are given as 0.210, 0.202, and 0.193 with respect to +2, −1, and −5 diopters, respectively.

Figure 14B:
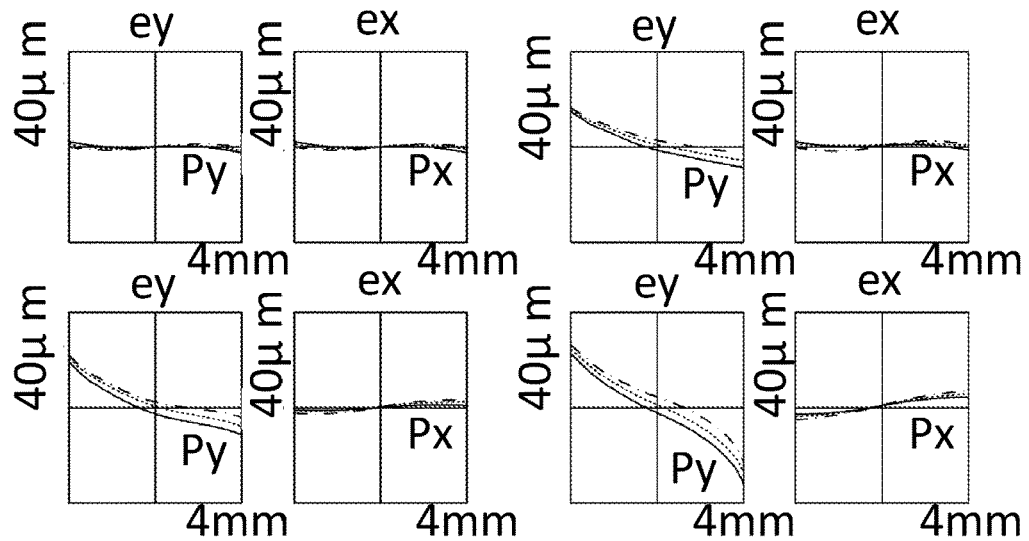
FIG. 14B illustrates a lateral aberration detected with respect to +2 diopter in the optical apparatus according to Example 2.
Figure 14C:
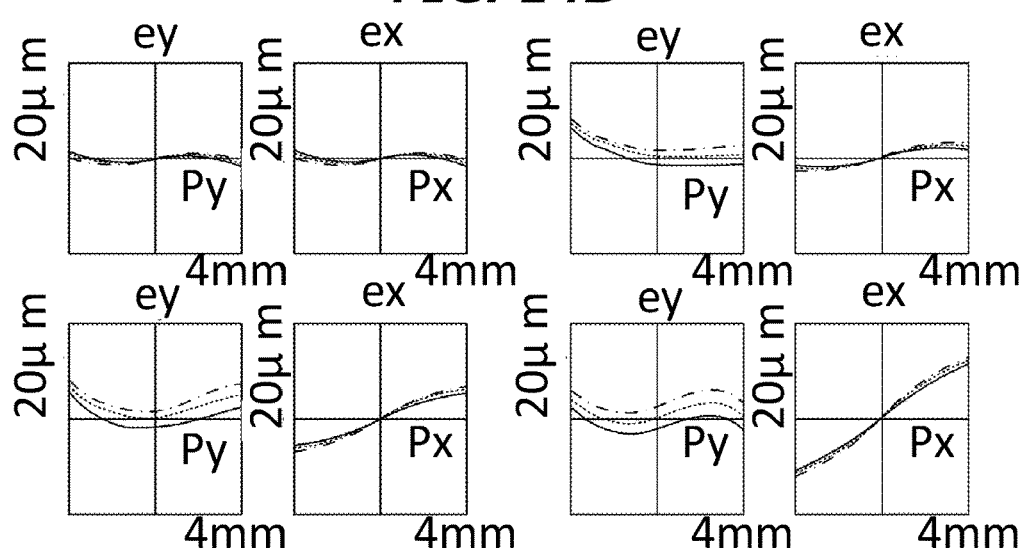
FIG. 14C illustrates a lateral aberration detected with respect to −1 diopter in the optical apparatus according to Example 2.
Figure 14D:
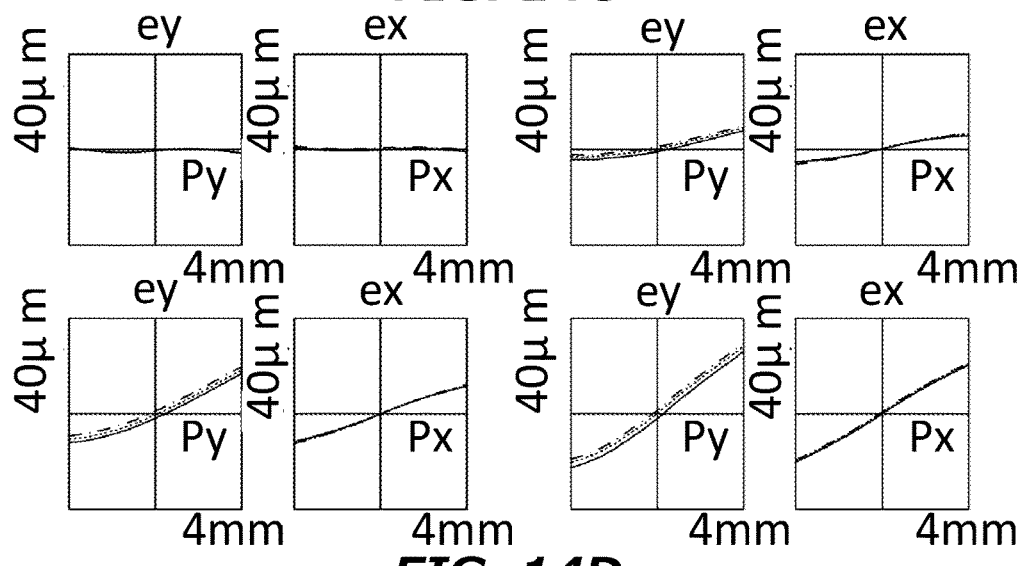
FIG. 14D illustrates a lateral aberration detected with respect to −5 diopter in the optical apparatus according to Example 2.

FIG. 14B, FIG. 14C, and FIG. 14D illustrate lateral aberrations detected with respect to +2, −1, and −5 diopters (ratios A/B=0.210, 0.202, and 0.193), respectively, in the optical apparatus 100 according to Example 2. Here, the upper left set of diagrams illustrates the center of the image, the upper right set of diagrams illustrates the center of the upper and lower ends of the image, the lower left set of diagrams illustrates the center of the left and right ends, and the lower right set of diagrams illustrates the aberration at the diagonal. Py and Px are coordinates (full scale: 4 mm) on the aperture plane (at the position of the eye box), and ey and ex are the aberration amount of the tangential plane and the aberration amount of the sagittal plane (full scale is shown in each drawing), respectively. The solid line indicates an aberration with respect to a wavelength of 0.515 µm, the dotted line indicates an aberration with respect to a wavelength of 0.528 µm, and the alternate long and short dash line indicates aberration with respect to a wavelength of 0.544 µm.

Figure 14E:
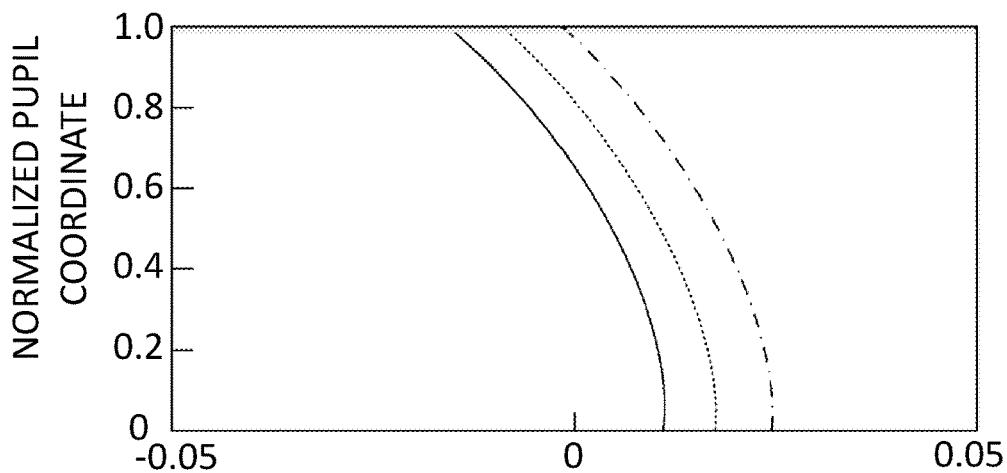
FIG. 14E illustrates a spherical aberration detected with respect to +2 diopter in the optical apparatus according to Example 2.
Figure 14F:
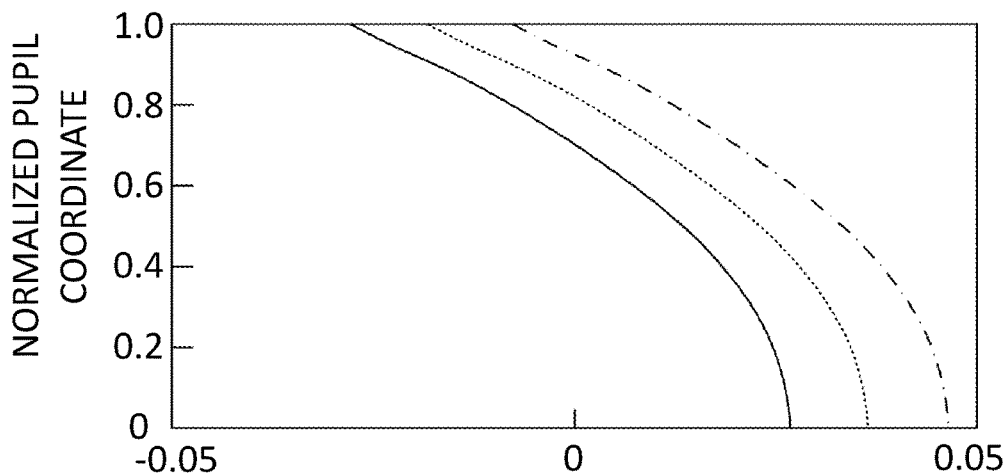
FIG. 14F illustrates a spherical aberration detected with respect to −1 diopter in the optical apparatus according to Example 2.
Figure 14G:
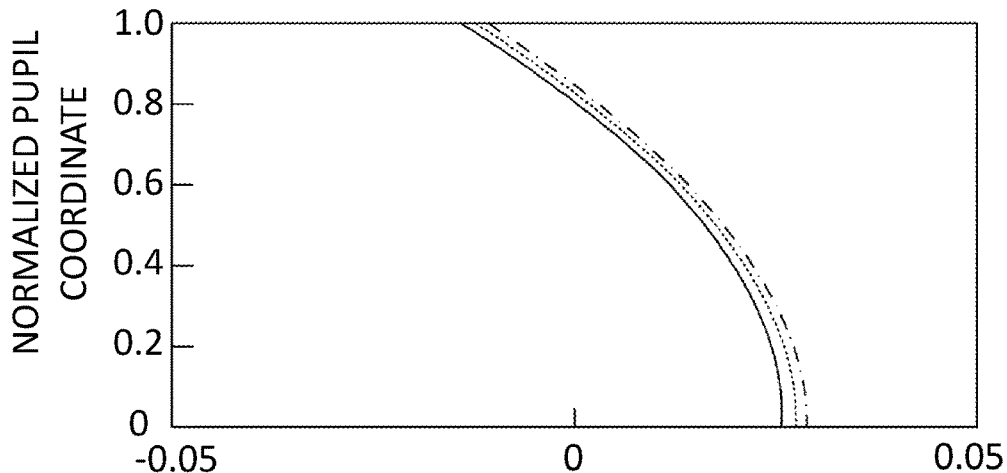
FIG. 14G illustrates a spherical aberration detected with respect to −5 diopter in the optical apparatus according to Example 2.

FIG. 14E, FIG. 14F, and FIG. 14G illustrate spherical aberrations on the optical axis detected with respect to +2, −1, and −5 diopters (ratios A/B=0.210, 0.202, and 0.193), respectively, in the optical apparatus 100 according to Example 2. Here, the vertical axis represents normalized pupil coordinates (full scale: 4 mm) at the position of the eye box, and the horizontal axis represents the aberration amount. In each drawing, the solid line indicates an aberration with respect to a wavelength of 0.515 µm, the dotted line indicates an aberration with respect to a wavelength of 0.528 µm, and the alternate long and short dash line indicates aberration with respect to a wavelength of 0.544 µm.

Figure 14H:
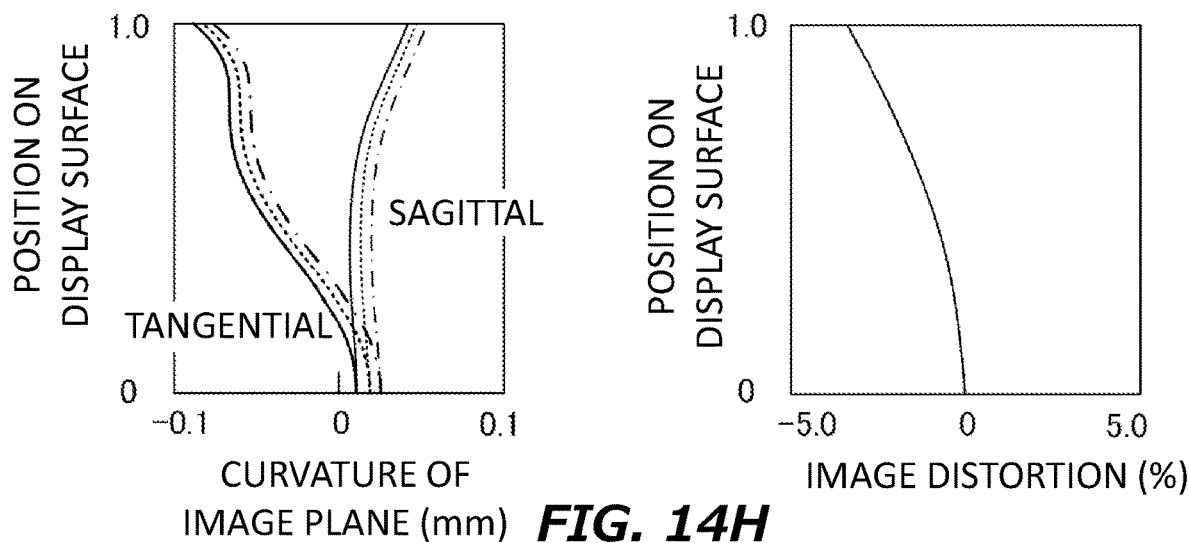
FIG. 14H illustrates a field curvature (left diagram) and an image distortion (right diagram) detected with respect to +2 diopter in the optical apparatus according to Example 2.
Figure 14I:
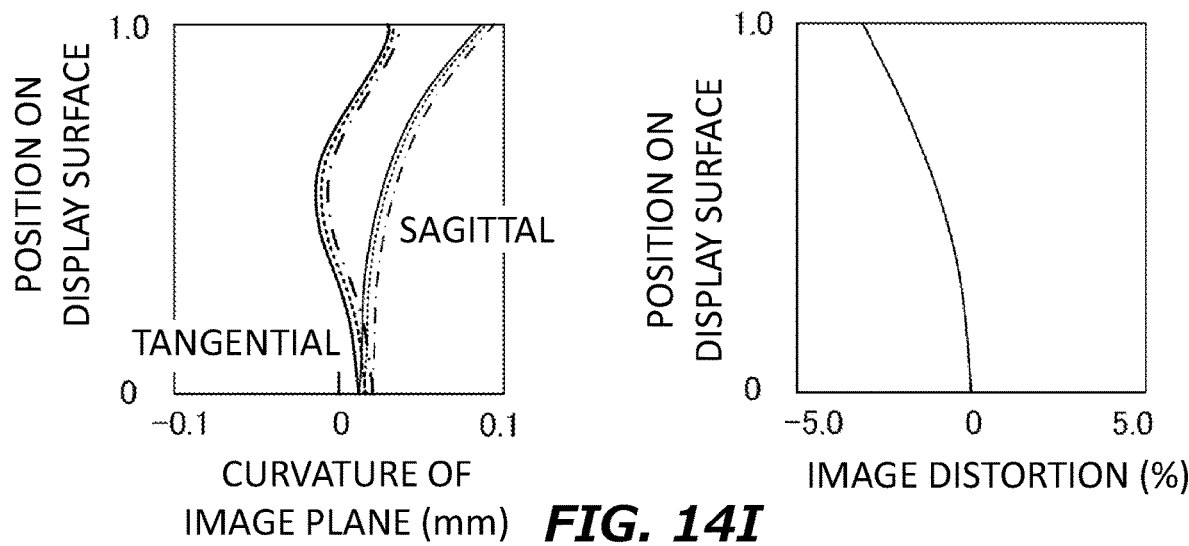
FIG. 14I illustrates a field curvature (left diagram) and an image distortion (right diagram) detected with respect to −1 diopter in the optical apparatus according to Example 2.
Figure 14J:
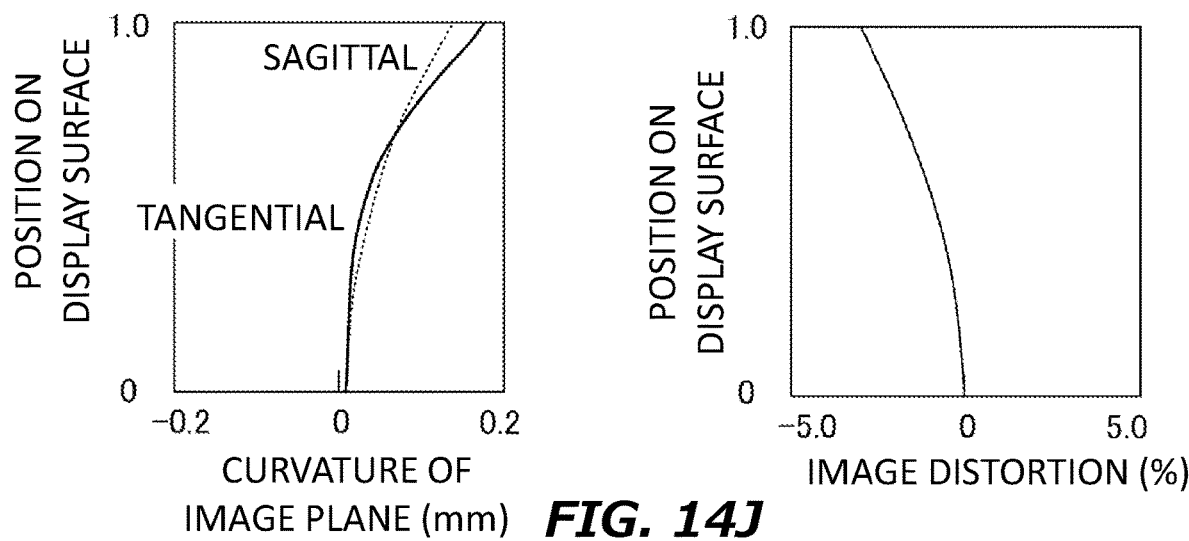
FIG. 14J illustrates a field curvature (left diagram) and an image distortion (right diagram) detected with respect to −5 diopter in the optical apparatus according to Example 2.

FIG. 14H, FIG. 14I, and FIG. 14J illustrate the field curvature (left diagram) and the image distortion (right diagram) detected with respect to +2, −1, and −5 diopters (ratios A/B=0.210, 0.202, and 0.193), respectively, in the optical apparatus 100 according to Example 2. Similarly to the field curvature illustrated in FIG. 9A to FIG. 9C, the field curvature is illustrated on the horizontal axis with respect to the position (the outermost position is 1.0) to the center on the display surface of the vertical axis. The field curvature on the tangential plane and the field curvature on the sagittal plane are shown, respectively. The image distortion is shown on the horizontal axis with respect to the position on the diagonal to the center on the display surface [110] of the vertical axis. In each drawing, the solid line indicates a wavelength of 0.515 µm, the dotted line indicates a wavelength of 0.528 µm, and the alternate long and short dash line indicates the field curvature and the image distortion with respect to a wavelength of 0.544 µm.

In FIG. 14H (+2 diopter, ratio A/B=0.210), the image plane is imaged on the downstream side in the periphery with respect to the center of the display 110 on the tangential plane, and is imaged on the upstream side in the periphery with respect to the center of the display 110 on the sagittal plane. The image distortion shows a negative distortion with respect to the center of the display 110, that is, the image is distorted in a barrel shape.

In FIG. 14I (−1 diopter, ratio A/B=0.202), the image plane is imaged on the somewhat upstream side in the periphery with respect to the center of the display 110 on the tangential plane, and is imaged on the upstream side in the periphery with respect to the center of the display 110 on the sagittal plane. The image distortion shows a negative distortion with respect to the center of the display 110, that is, the image is distorted in a barrel shape.

In FIG. 14J (−5 diopter, ratio A/B=0.193), the image plane is imaged on the upstream side in the periphery with respect to the center of the display 110 on the tangential plane and the sagittal plane. Note that the wavelength dependency of the field curvature is hardly observed. The image distortion shows a negative distortion with respect to the center of the display 110, that is, the image is distorted in a barrel shape.

In the optical apparatus 100 according to Example 2, the field curvature has been within a range of ±0.2 mm with respect to +2, −1, and −5 diopters (ratios A/B=0.210, 0.202, and 0.193), and the image distortion has been about −3% at maximum.

FIG. 15A illustrates a detailed design of the optical apparatus 100 according to Example 3. In Example 3, Model 1 of FIG. 12A is adopted, and the optical apparatus 100 is designed according to various parameters given to the lens specification, the aspheric coefficient, the GPL data, and the variable interval data. In the present example, the ratios A/B are given as 0.283, 0.270, and 0.254 with respect to +2, −1, and −5 diopters, respectively.

Figure 15B:
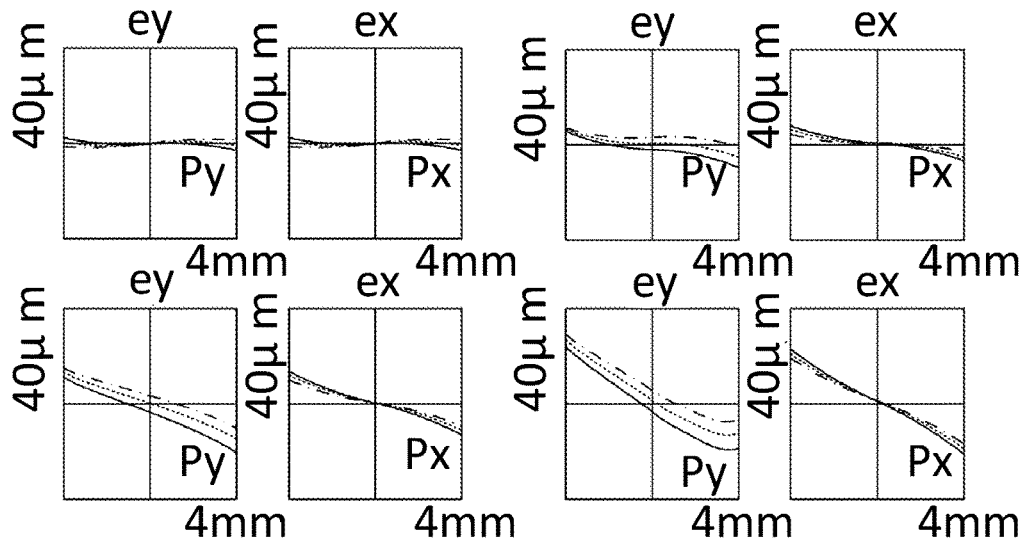
FIG. 15B illustrates a lateral aberration detected with respect to +2 diopter in the optical apparatus according to Example 3.
Figure 15C:
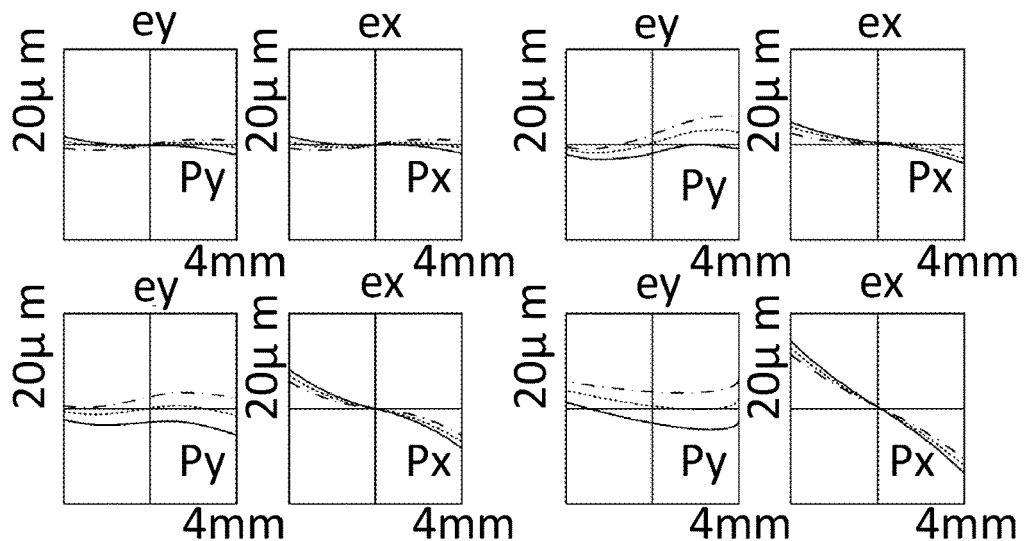
FIG. 15C illustrates a lateral aberration detected with respect to −1 diopter in the optical apparatus according to Example 3.
Figure 15D:
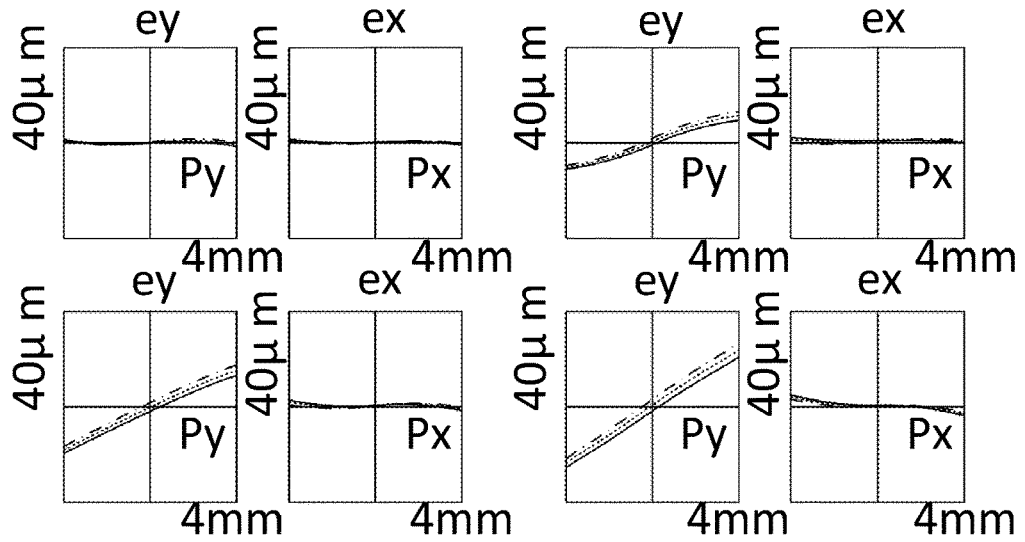
FIG. 15D illustrates a lateral aberration detected with respect to −5 diopter in the optical apparatus according to Example 3.

FIG. 15B, FIG. 15C, and FIG. 15D illustrate lateral aberrations detected with respect to +2, −1, and −5 diopters (ratios A/B=0.283, 0.270, and 0.254), respectively, in the optical apparatus 100 according to Example 3. Here, the upper left set of diagrams illustrates the center of the image, the upper right set of diagrams illustrates the center of the upper and lower ends of the image, the lower left set of diagrams illustrates the center of the left and right ends, and the lower right set of diagrams illustrates the aberration at the diagonal. Py and Px are coordinates (full scale: 4 mm) on the aperture plane (at the position of the eye box), and ey and ex are the aberration amount of the tangential plane and the aberration amount of the sagittal plane (full scale is shown in each drawing), respectively. The solid line indicates an aberration with respect to a wavelength of 0.515 μm, the dotted line indicates an aberration with respect to a wavelength of 0.528 μm, and the alternate long and short dash line indicates aberration with respect to a wavelength of 0.544 μm.

FIG. 15E, FIG. 15F, and FIG. 15G illustrate spherical aberrations on the optical axis detected with respect to +2, −1, and −5 diopters (ratios A/B=0.283, 0.270, and 0.254), respectively, in the optical apparatus 100 according to Example 3. Here, the vertical axis represents normalized pupil coordinates (full scale: 4 mm) at the position of the eye box, and the horizontal axis represents the aberration amount. In each drawing, the solid line indicates an aberration with respect to a wavelength of 0.515 μm, the dotted line indicates an aberration with respect to a wavelength of 0.528 μm, and the alternate long and short dash line indicates aberration with respect to a wavelength of 0.544 μm.

Figure 15H:
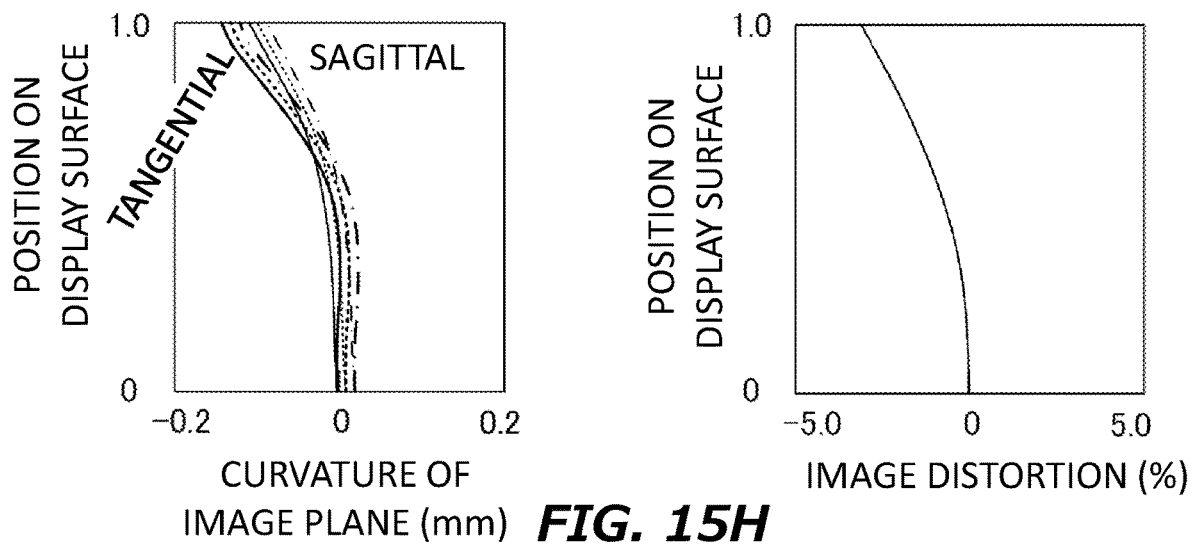
FIG. 15H illustrates a field curvature (left diagram) and an image distortion (right diagram) detected with respect to +2 diopter in the optical apparatus according to Example 3.
Figure 15I:
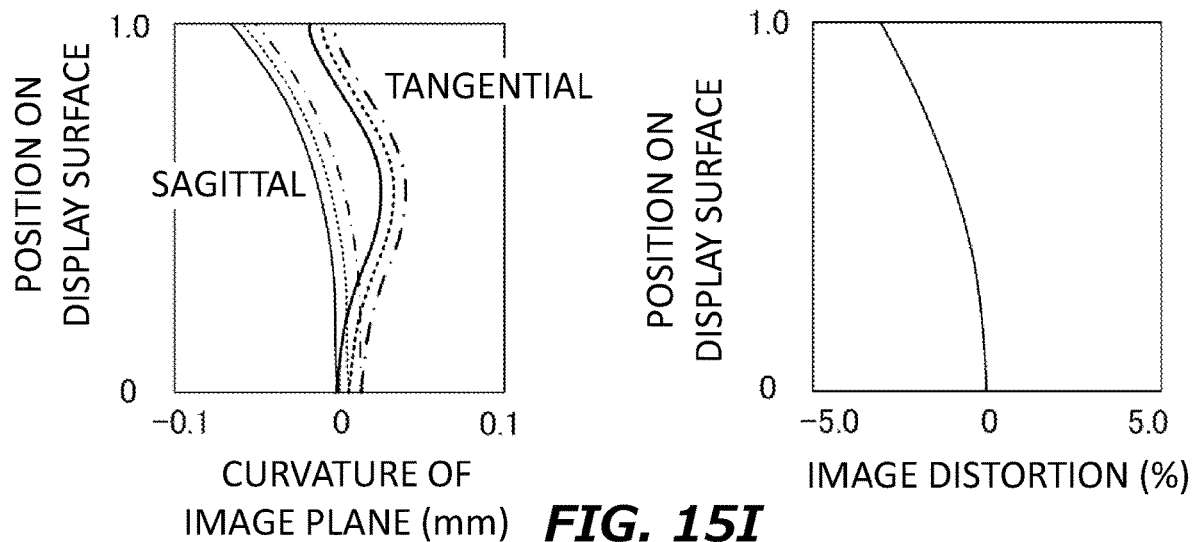
FIG. 15I illustrates a field curvature (left diagram) and an image distortion (right diagram) detected with respect to −1 diopter in the optical apparatus according to Example 3.
Figure 15J:
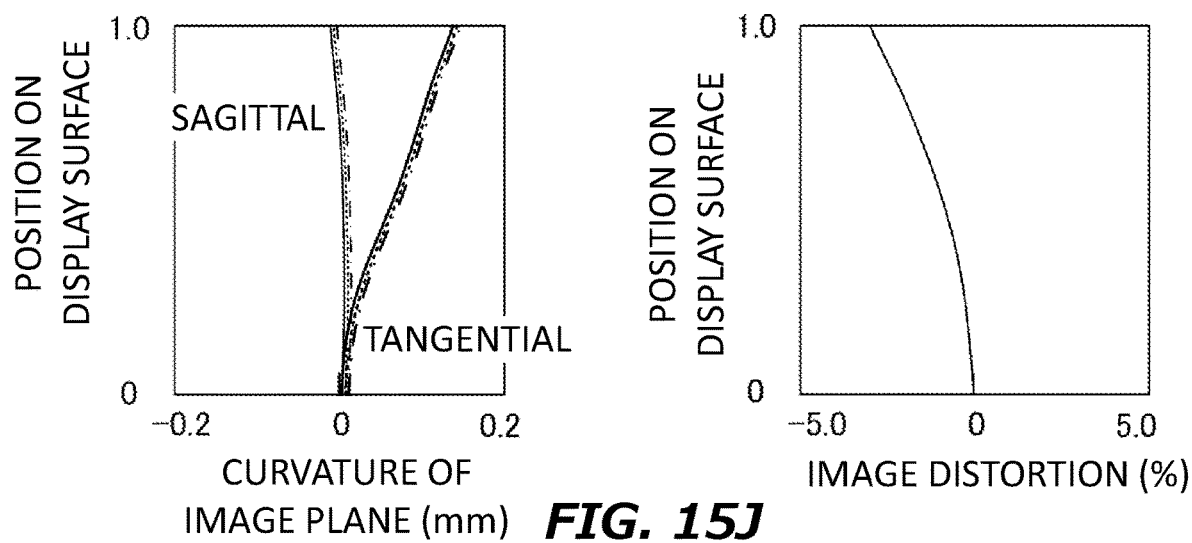
FIG. 15J illustrates a field curvature (left diagram) and an image distortion (right diagram) detected with respect to −5 diopter in the optical apparatus according to Example 3.

FIG. 15H, FIG. 15I, and FIG. 15J illustrate the field curvature (left diagram) and the image distortion (right diagram) detected with respect to +2, −1, and −5 diopters (ratios A/B=0.283, 0.270, and 0.254), respectively, in the optical apparatus 100 according to Example 3. Similarly to the field curvature illustrated in FIG. 9A to FIG. 9C, the field curvature is illustrated on the horizontal axis with respect to the position (the outermost position is 1.0) to the center on the display surface of the vertical axis. The field curvature on the tangential plane and the field curvature on the sagittal plane are shown, respectively. The image distortion is shown on the horizontal axis with respect to the position on the diagonal to the center on the display surface of the vertical axis. In each drawing, the solid line indicates a wavelength of 0.515 μm, the dotted line indicates a wavelength of 0.528 μm, and the alternate long and short dash line indicates the field curvature and the image distortion with respect to a wavelength of 0.544 μm.

In FIG. 15H (2 diopter, ratio A/B=0.283), the image plane is imaged on the downstream side in the periphery with respect to the center of the display 110 on the tangential plane and the sagittal plane. The image distortion shows a negative distortion with respect to the center of the display 110, that is, the image is distorted in a barrel shape.

In FIG. 15I (−1 diopter, ratio A/B=0.270), the image plane is imaged on the somewhat downstream side in the periphery with respect to the center of the display 110 on the tangential plane, and is imaged on the downstream side in the periphery with respect to the center of the display 110 on the sagittal plane. The image distortion shows a negative distortion with respect to the center of the display 110, that is, the image is distorted in a barrel shape.

In FIG. 15J (−5 diopter, ratio A/B=0.254), the image plane is imaged on the upstream side in the periphery with respect to the center of the display 110 on the tangential plane, and is hardly distorted on the sagittal plane. The image distortion shows a negative distortion with respect to the center of the display 110, that is, the image is distorted in a barrel shape.

In the optical apparatus 100 according to Example 3, the field curvature has been within a range of ±0.2 mm with respect to +2, −1, and −5 diopters (ratios A/B=0.283, 0.270, and 0.254), and the image distortion has been about −3% at maximum.

FIG. 16A illustrates a detailed design of the optical apparatus 100 according to Example 4. In Example 4, Model 1 of FIG. 12A is adopted, and the optical apparatus 100 is designed according to various parameters given to the lens specification, the aspheric coefficient, the GPL data, and the variable interval data. In the present example, the ratios A/B are given as 0.317, 0.299, and 0.279 with respect to +2, −1, and −5 diopters, respectively.

Figure 16B:
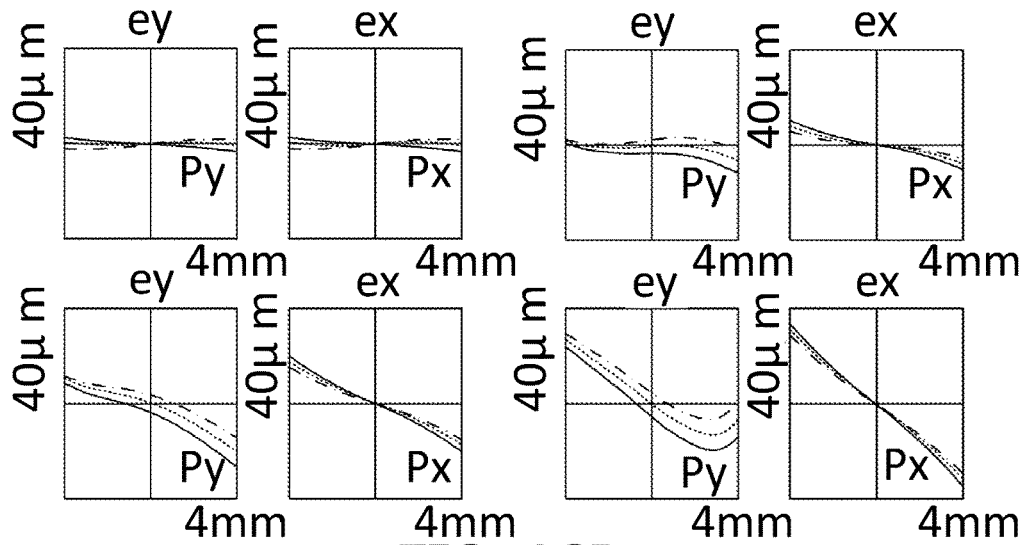
FIG. 16B illustrates a lateral aberration detected with respect to +2 diopter in the optical apparatus according to Example 4.
Figure 16C:
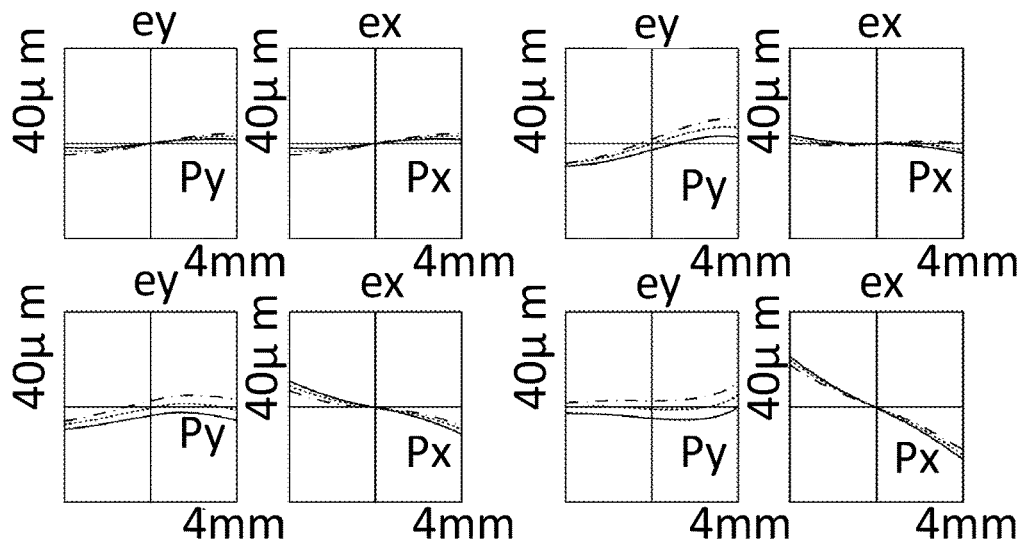
FIG. 16C illustrates a lateral aberration detected with respect to −1 diopter in the optical apparatus according to Example 4.
Figure 16D:
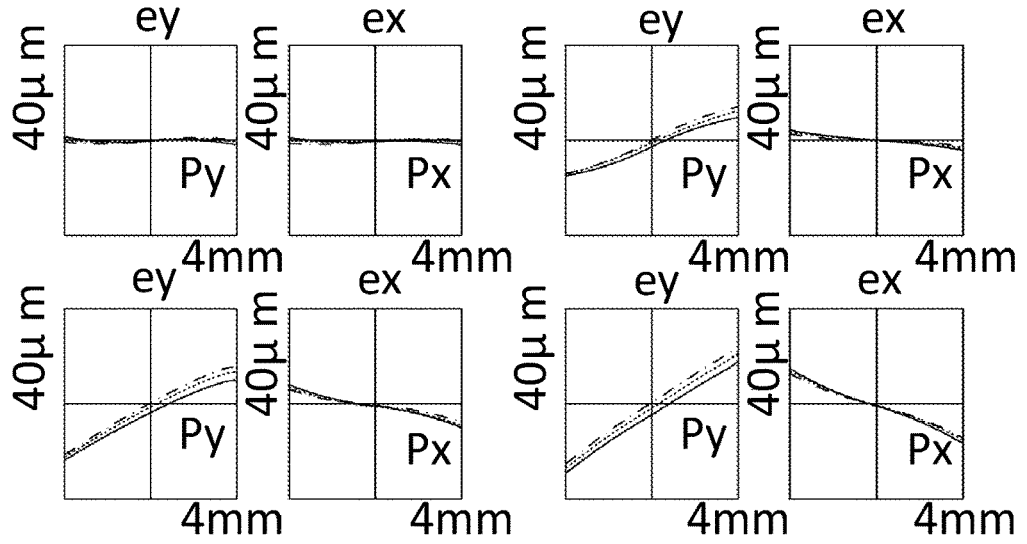
FIG. 16D illustrates a lateral aberration detected with respect to −5 diopter in the optical apparatus according to Example 4.

FIG. 16B, FIG. 16C, and FIG. 16D illustrate lateral aberrations detected with respect to +2, −1, and −5 diopters (ratios A/B=0.317, 0.299, and 0.279), respectively, in the optical apparatus 100 according to Example 4. Here, the upper left set of diagrams illustrates the center of the image, the upper right set of diagrams illustrates the center of the upper and lower ends of the image, the lower left set of diagrams illustrates the center of the left and right ends, and the lower right set of diagrams illustrates the aberration at the diagonal. Py and Px are coordinates (full scale: 4 mm) on the aperture plane (at the position of the eye box), and ey and ex are the aberration amount of the tangential plane and the aberration amount of the sagittal plane (full scale is shown in each drawing), respectively. The solid line indicates an aberration with respect to a wavelength of 0.515 μm, the dotted line indicates an aberration with respect to a wavelength of 0.528 μm, and the alternate long and short dash line indicates aberration with respect to a wavelength of 0.544 μm.

Figure 16E:
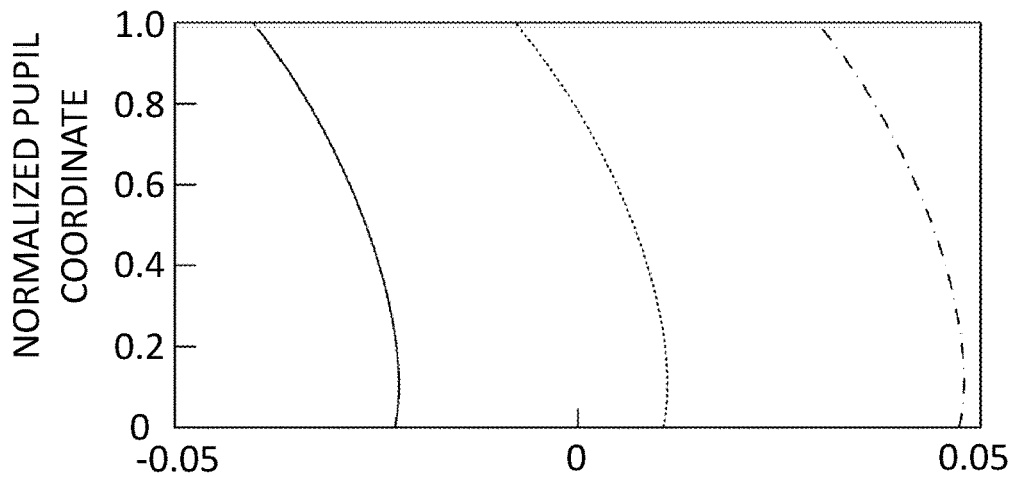
FIG. 16E illustrates a spherical aberration detected with respect to +2 diopter in the optical apparatus according to Example 4.
Figure 16F:
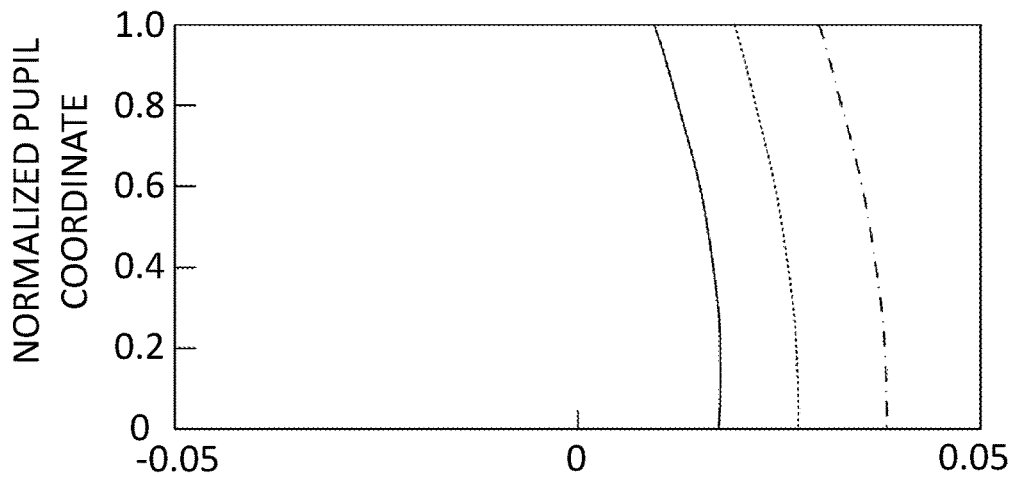
FIG. 16F illustrates a spherical aberration detected with respect to −1 diopter in the optical apparatus according to Example 4.
Figure 16G:
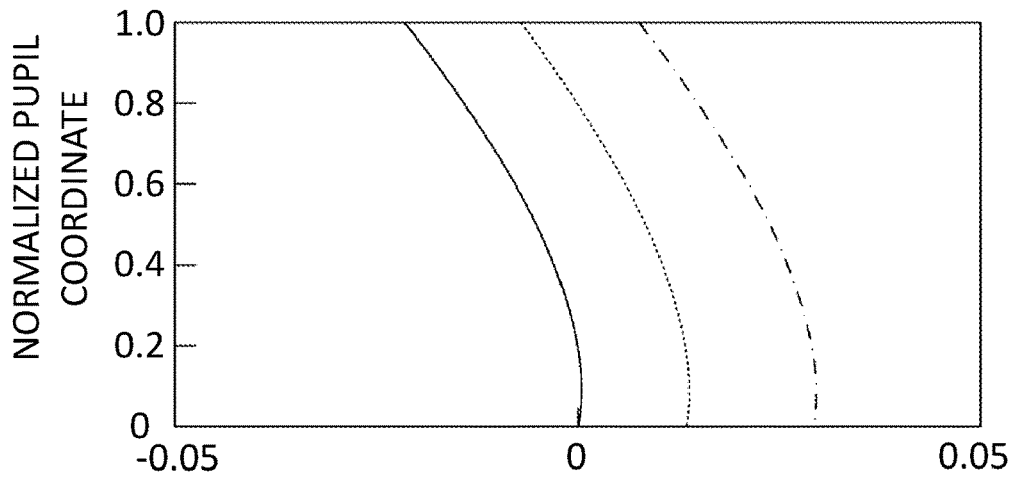
FIG. 16G illustrates a spherical aberration detected with respect to −5 diopter in the optical apparatus according to Example 4.

FIG. 16E, FIG. 16F, and FIG. 16G illustrate spherical aberrations on the optical axis detected with respect to +2, −1, and −5 diopters (ratios A/B=0.317, 0.299, and 0.279), respectively, in the optical apparatus 100 according to Example 4. Here, the vertical axis represents normalized pupil coordinates (full scale: 4 mm) at the position of the eye box, and the horizontal axis represents the aberration amount. In each drawing, the solid line indicates an aberration with respect to a wavelength of 0.515 μm, the dotted line indicates an aberration with respect to a wavelength of 0.528 μm, and the alternate long and short dash line indicates aberration with respect to a wavelength of 0.544 μm.

Figure 16H:
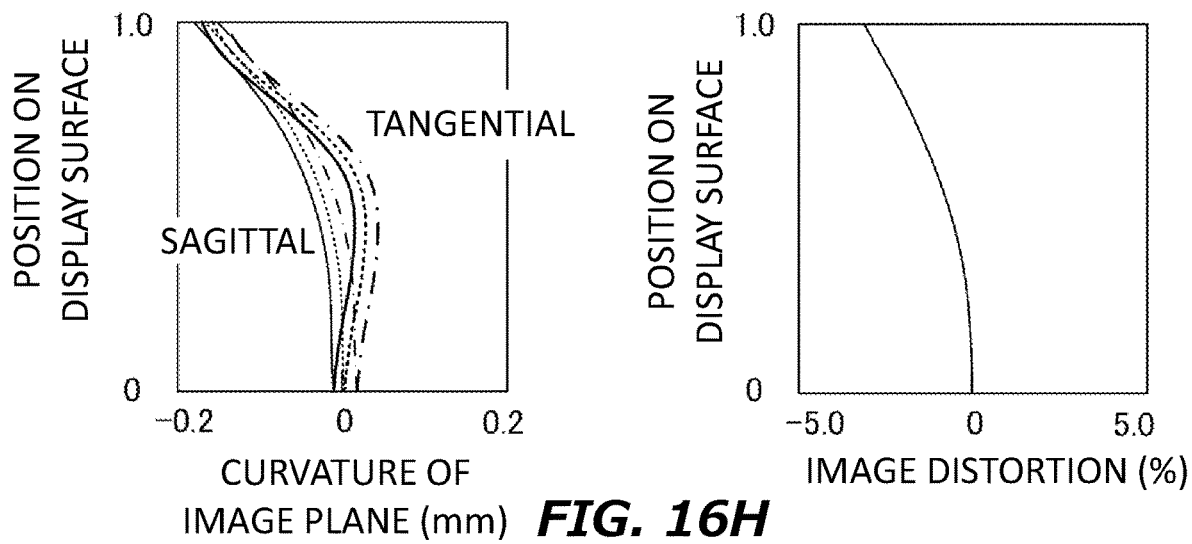
FIG. 16H illustrates a field curvature (left diagram) and an image distortion (right diagram) detected with respect to +2 diopter in the optical apparatus according to Example 4.
Figure 16I:
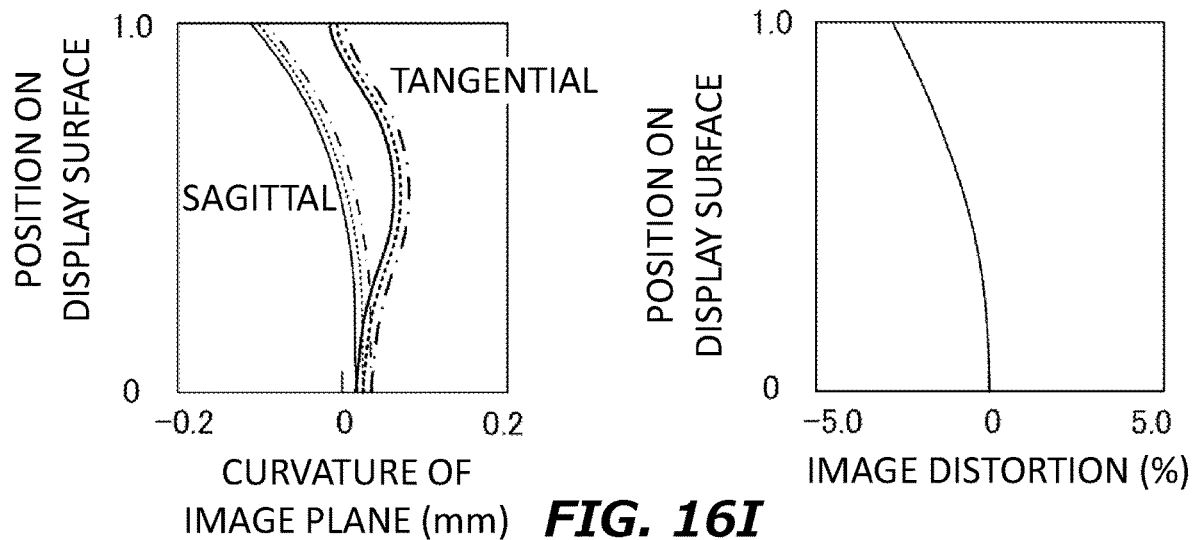
FIG. 16I illustrates a field curvature (left diagram) and an image distortion (right diagram) detected with respect to −1 diopter in the optical apparatus according to Example 4.
Figure 16J:
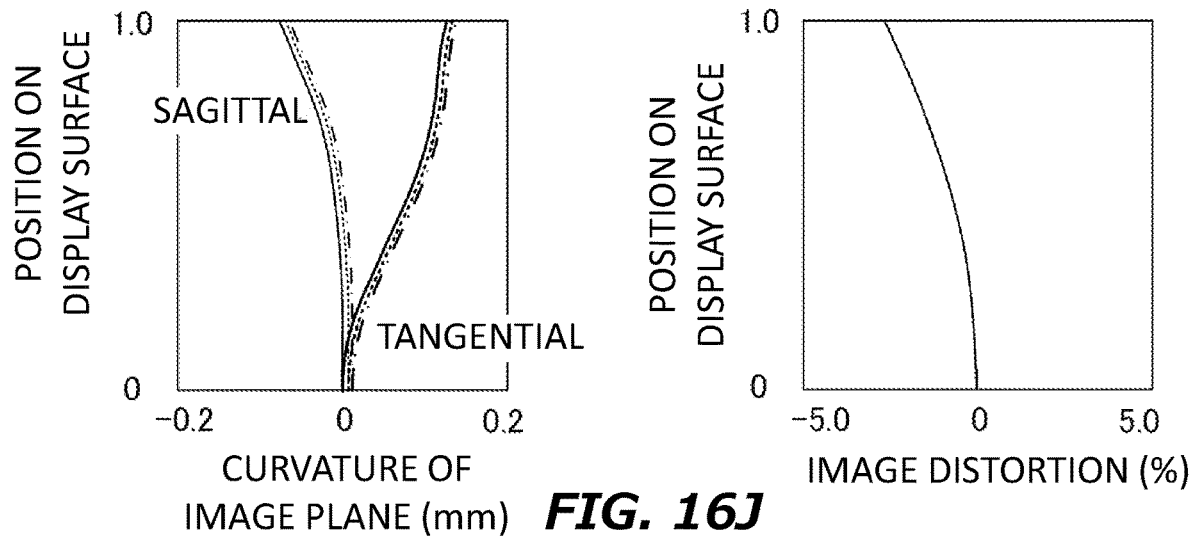
FIG. 16J illustrates a field curvature (left diagram) and an image distortion (right diagram) detected with respect to −5 diopter in the optical apparatus according to Example 4.

FIG. 16H, FIG. 16I, and FIG. 16J illustrate the field curvature (left diagram) and the image distortion (right diagram) detected with respect to +2, −1, and −5 diopters (ratios A/B=0.317, 0.299, and 0.279), respectively, in the optical apparatus 100 according to Example 4. Similarly to the field curvature illustrated in FIG. 9A to FIG. 9C, the field curvature is illustrated on the horizontal axis with respect to the position (the outermost position is 1.0) to the center on the display surface of the vertical axis. The field curvature on the tangential plane and the field curvature on the sagittal plane are shown, respectively. The image distortion is shown on the horizontal axis with respect to the position on the diagonal to the center on the display surface of the vertical axis. In each drawing, the solid line indicates a wavelength of 0.515 μm, the dotted line indicates a wavelength of 0.528 μm, and the alternate long and short dash line indicates the field curvature and the image distortion with respect to a wavelength of 0.544 μm.

In FIG. 16H (2 diopter, ratio A/B=0.317), the image plane is imaged on the downstream side in the periphery with respect to the center of the display 110 on the tangential plane and the sagittal plane. The image distortion shows a negative distortion with respect to the center of the display 110, that is, the image is distorted in a barrel shape.

In FIG. 16I (−1 diopter, ratio A/B=0.299), the image plane is imaged on the somewhat downstream side in the periphery with respect to the center of the display 110 on the tangential plane, and is imaged on the downstream side in the periphery with respect to the center of the display 110 on the sagittal plane. The image distortion shows a negative distortion with respect to the center of the display 110, that is, the image is distorted in a barrel shape.

In FIG. 16J (−5 diopter, ratio A/B=0.279), the image plane is imaged on the upstream side in the periphery with respect to the center of the display 110 on the tangential plane, and is imaged on the downstream side in the periphery with respect to the center of the display 110 on the sagittal plane. The image distortion shows a negative distortion with respect to the center of the display 110, that is, the image is distorted in a barrel shape.

In the optical apparatus 100 according to Example 4, the field curvature has been within a range of ±0.2 mm with respect to +2, −1, and −5 diopters (ratios A/B=0.317, 0.299, and 0.279), and the image distortion has been about −3% at maximum.

FIG. 17A illustrates a detailed design of the optical apparatus 100 according to Example 5. In Example 5, Model 2 of FIG. 12A is adopted, and the optical apparatus 100 is designed according to various parameters given to the lens specification, the aspheric coefficient, the GPL data, and the variable interval data. In the present example, the ratios A/B are given as 0.179, 0.175, and 0.171 with respect to +2, −1, and −5 diopters, respectively.

Figure 17B:
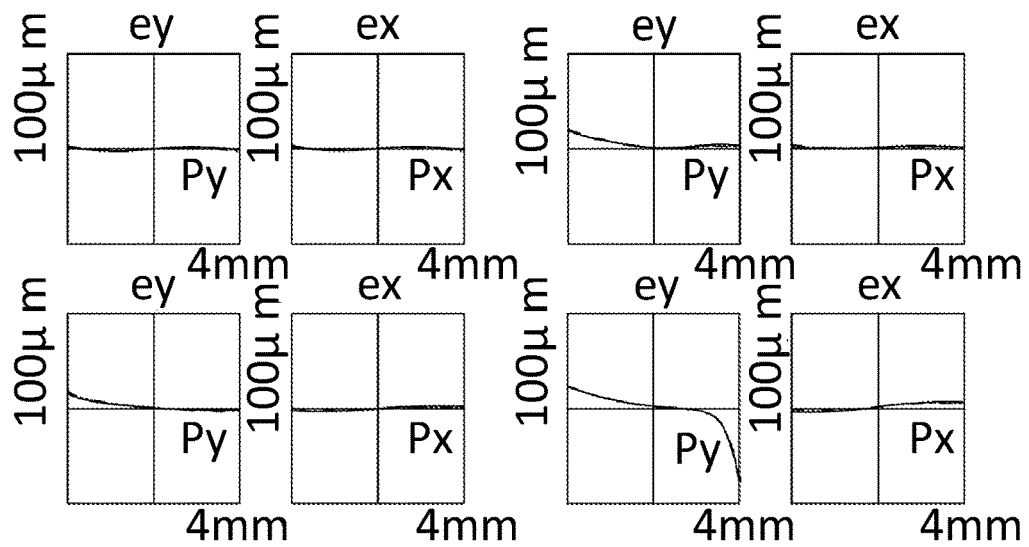
FIG. 17B illustrates a lateral aberration detected with respect to +2 diopter in the optical apparatus according to Example 5.
Figure 17C:
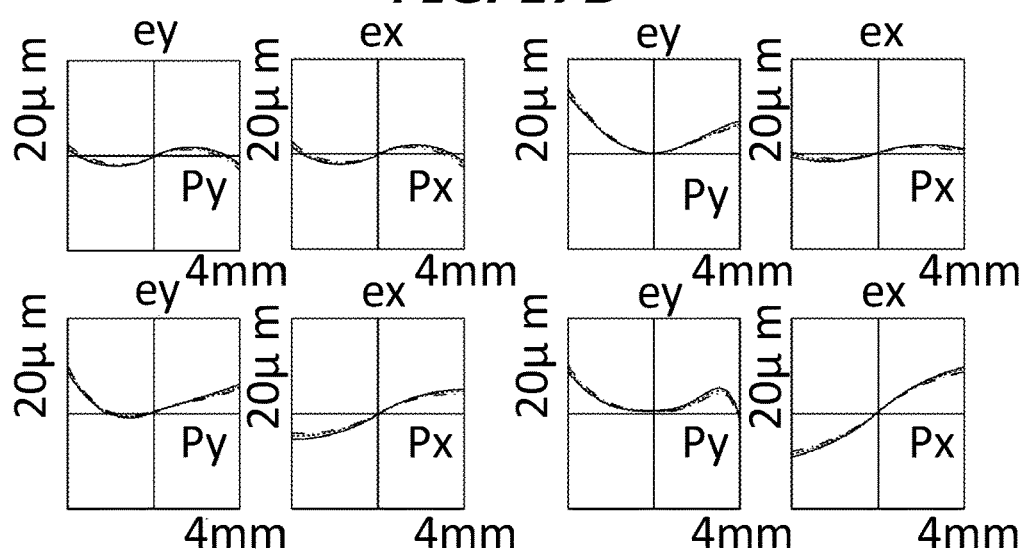
FIG. 17C illustrates a lateral aberration detected with respect to −1 diopter in the optical apparatus according to Example 5.
Figure 17D:
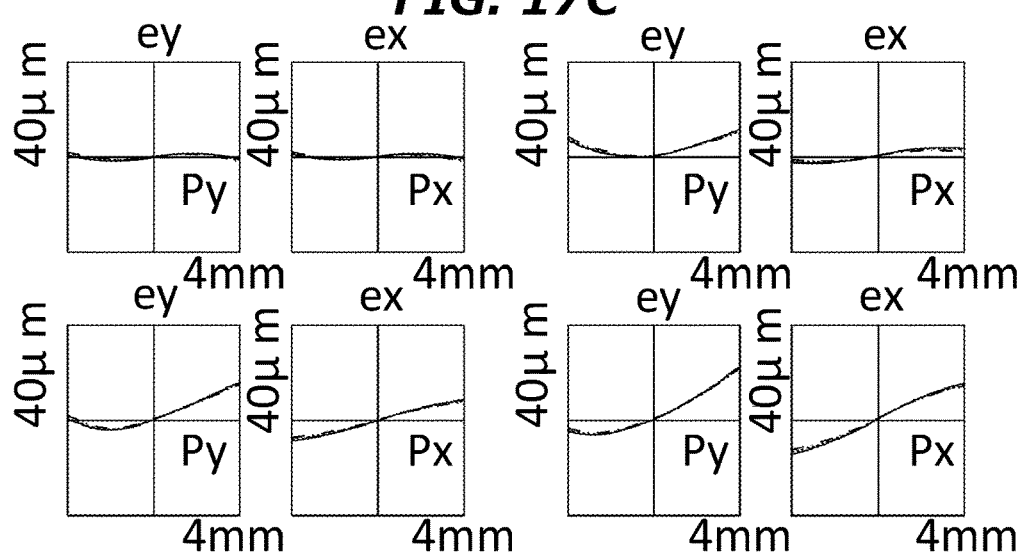
FIG. 17D illustrates a lateral aberration detected with respect to −5 diopter in the optical apparatus according to Example 5.

FIG. 17B, FIG. 17C, and FIG. 17D illustrate lateral aberrations detected with respect to +2, −1, and −5 diopters (ratios A/B=0.179, 0.175, and 0.171), respectively, in the optical apparatus 100 according to Example 5. Here, the upper left set of diagrams illustrates the center of the image, the upper right set of diagrams illustrates the center of the upper and lower ends of the image, the lower left set of diagrams illustrates the center of the left and right ends, and the lower right set of diagrams illustrates the aberration at the diagonal. Py and Px are coordinates (full scale: 4 mm) on the aperture plane (at the position of the eye box), and ey and ex are the aberration amount of the tangential plane and the aberration amount of the sagittal plane (full scale is shown in each drawing), respectively. The solid line indicates an aberration with respect to a wavelength of 0.515 μm, the dotted line indicates an aberration with respect to a wavelength of 0.528 μm, and the alternate long and short dash line indicates aberration with respect to a wavelength of 0.544 μm.

Figure 17E:
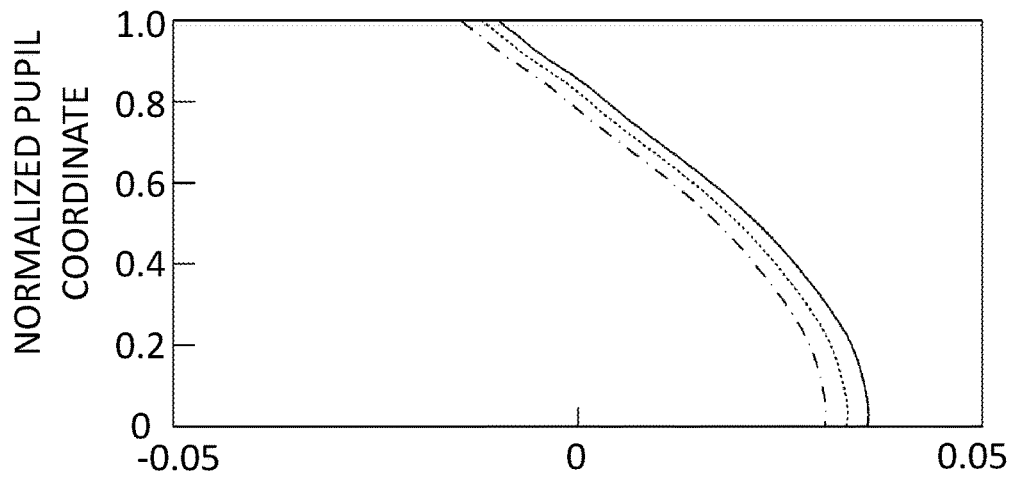
FIG. 17E illustrates a spherical aberration detected with respect to +2 diopter in the optical apparatus according to Example 5.
Figure 17F:
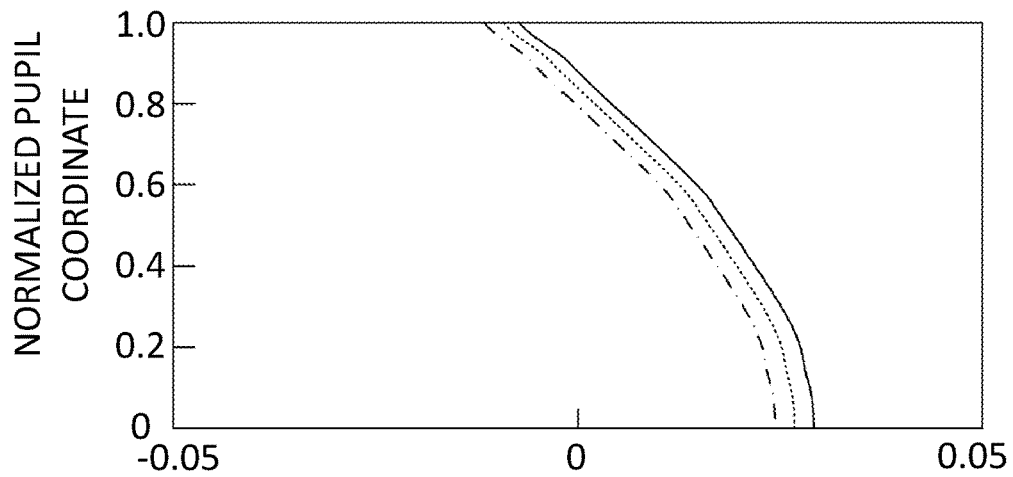
FIG. 17F illustrates a spherical aberration detected with respect to −1 diopter in the optical apparatus according to Example 5.
Figure 17G:
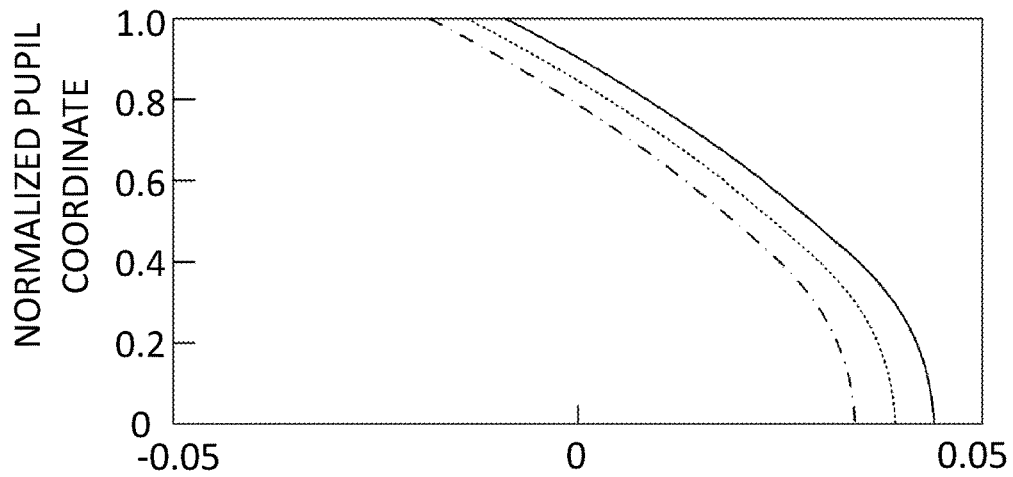
FIG. 17G illustrates a spherical aberration detected with respect to −5 diopter in the optical apparatus according to Example 5.

FIG. 17E, FIG. 17F, and FIG. 17G illustrate spherical aberrations on the optical axis detected with respect to +2, −1, and −5 diopters (ratios A/B=0.179, 0.175, and 0.171), respectively, in the optical apparatus 100 according to Example 5. Here, the vertical axis represents normalized pupil coordinates (full scale: 4 mm) at the position of the eye box, and the horizontal axis represents the aberration amount. In each drawing, the solid line indicates an aberration with respect to a wavelength of 0.515 μm, the dotted line indicates an aberration with respect to a wavelength of 0.528 μm, and the alternate long and short dash line indicates aberration with respect to a wavelength of 0.544 μm.

Figure 17H:
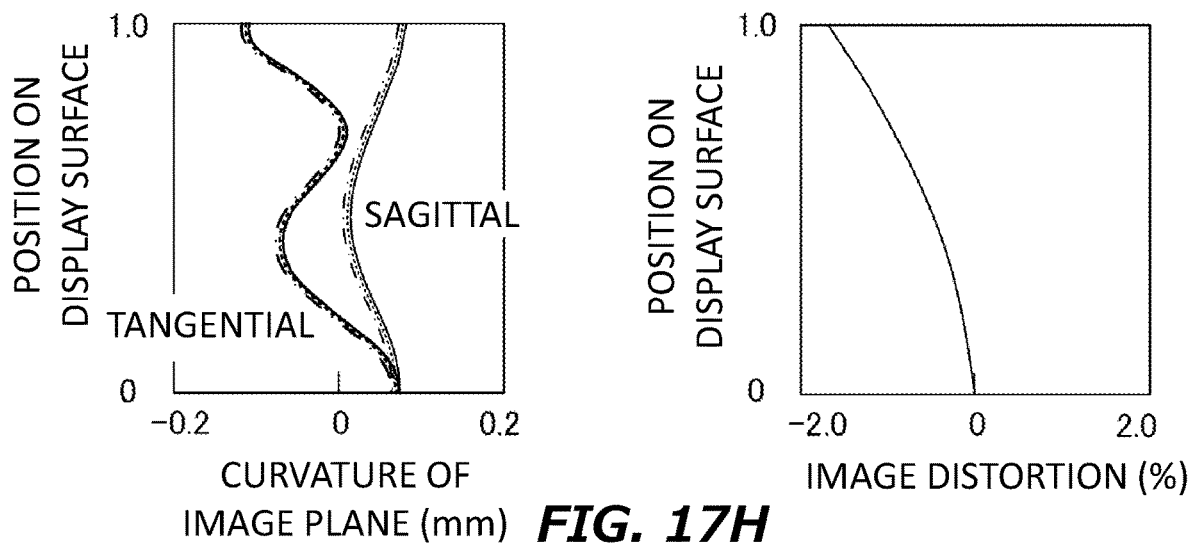
FIG. 17H illustrates a field curvature (left diagram) and an image distortion (right diagram) detected with respect to +2 diopter in the optical apparatus according to Example 5.
Figure 17I:
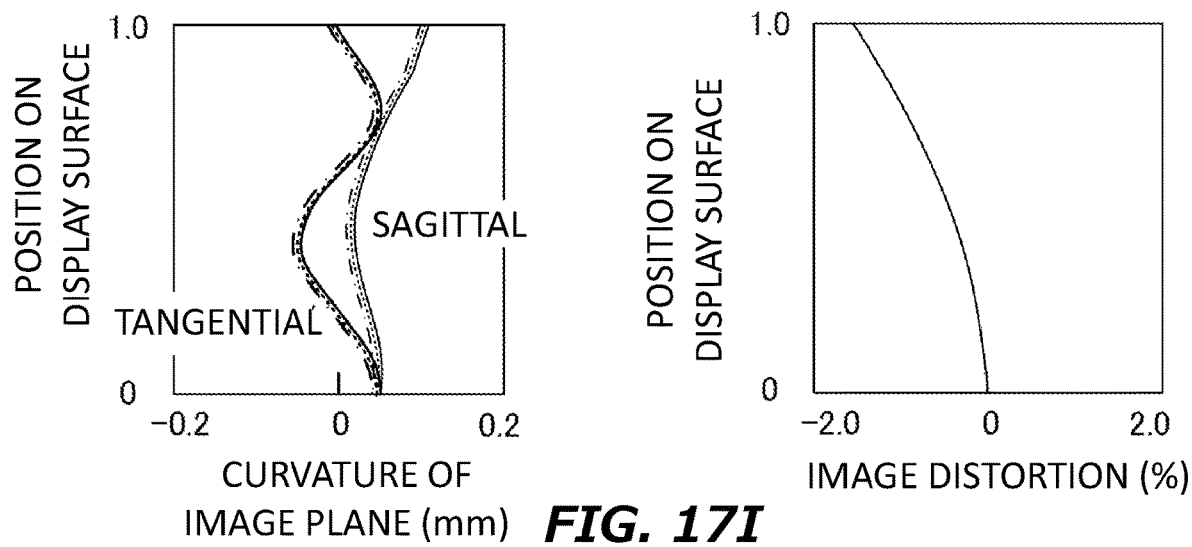
FIG. 17I illustrates a field curvature (left diagram) and an image distortion (right diagram) detected with respect to −1 diopter in the optical apparatus according to Example 5.
Figure 17J:
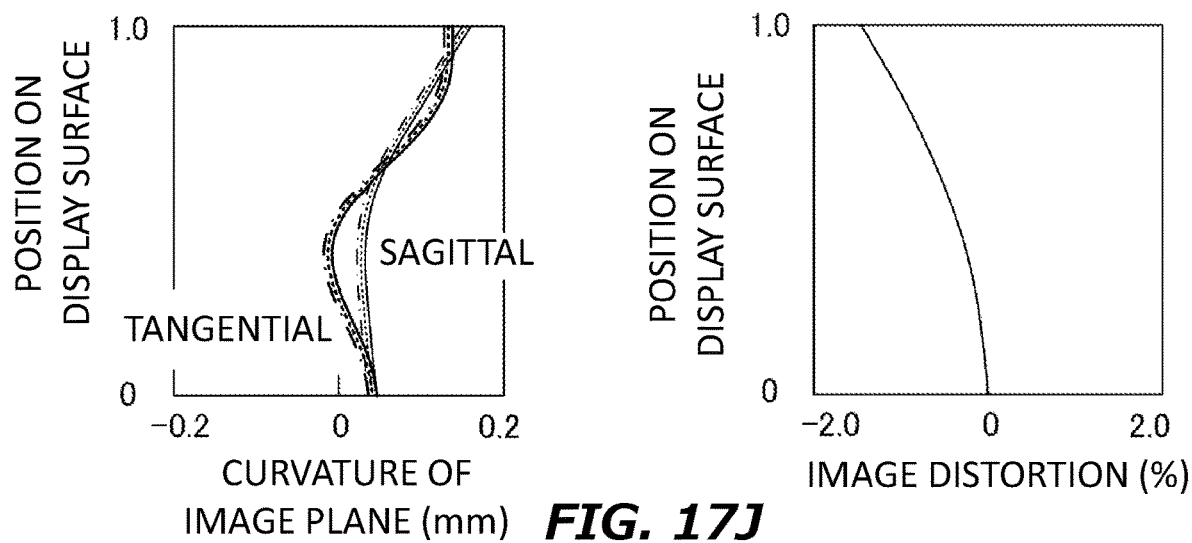
FIG. 17J illustrates a field curvature (left diagram) and an image distortion (right diagram) detected with respect to −5 diopter in the optical apparatus according to Example 5.

FIG. 17H, FIG. 17I, and FIG. 17J illustrate the field curvature (left diagram) and the image distortion (right diagram) detected with respect to +2, −1, and −5 diopters (ratios A/B=0.179, 0.175, and 0.171), respectively, in the optical apparatus 100 according to Example 5. Similarly to the field curvature illustrated in FIG. 9A to FIG. 9C, the field curvature is illustrated on the horizontal axis with respect to the position (the outermost position is 1.0) to the center on the display surface of the vertical axis. The field curvature on the tangential plane and the field curvature on the sagittal plane are shown, respectively. The image distortion is shown on the horizontal axis with respect to the position on the diagonal to the center on the display surface of the vertical axis. In each drawing, the solid line indicates a wavelength of 0.515 μm, the dotted line indicates a wavelength of 0.528 μm, and the alternate long and short dash line indicates the field curvature and the image distortion with respect to a wavelength of 0.544 μm.

In FIG. 17H (+2 diopter, ratio A/B=0.179), the image plane greatly vibrates according to the position from the center of the display 110 on the tangential plane, and is imaged on the downstream side in the periphery with respect to the center. On the sagittal plane, the image plane gently vibrates according to the position from the center of the display 110, and is imaged on the somewhat upstream side in the periphery with respect to the center. The image distortion shows a negative distortion with respect to the center of the display 110, that is, the image is distorted in a barrel shape.

In FIG. 17I (−1 diopter, ratio A/B=0.175), the image plane greatly vibrates according to the position from the center of the display 110 on the tangential plane, and is imaged on the downstream side in the periphery with respect to the center. On the sagittal plane, the image plane gently vibrates according to the position from the center of the display 110, and is imaged on the upstream side in the periphery with respect to the center. The image distortion shows a negative distortion with respect to the center of the display 110, that is, the image is distorted in a barrel shape.

In FIG. 17J (−5 diopter, ratio A/B=0.171), the image plane greatly vibrates according to the position from the center of the display 110 on the tangential plane, and is imaged on the upstream side in the periphery with respect to the center. On the sagittal plane, the image plane gently varies according to the position from the center of the display 110, and is imaged on the upstream side in the periphery with respect to the center. The image distortion shows a negative distortion with respect to the center of the display 110, that is, the image is distorted in a barrel shape.

In the optical apparatus 100 according to Example 5, the field curvature has been within a range of ±0.2 mm with respect to +2, −1, and −5 diopters (ratios A/B=0.179, 0.175, and 0.171), and the image distortion has been about −2% at maximum.

FIG. 18A illustrates a detailed design of the optical apparatus 100 according to Example 6. In Example 6, Model 2 of FIG. 12A is adopted, and the optical apparatus 100 is designed according to various parameters given to the lens specification, the aspheric coefficient, the GPL data, and the variable interval data. In the present example, the ratios A/B are given as 0.204, 0.201, and 0.196 with respect to +2, −1, and −5 diopters, respectively.

Figure 18B:
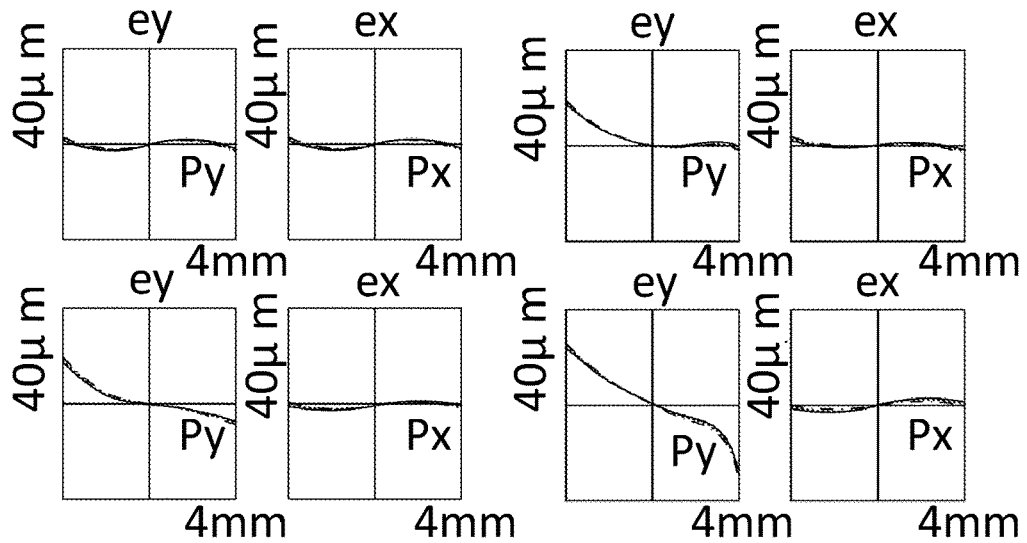
FIG. 18B illustrates a lateral aberration detected with respect to +2 diopter in the optical apparatus according to Example 6.
Figure 18C:
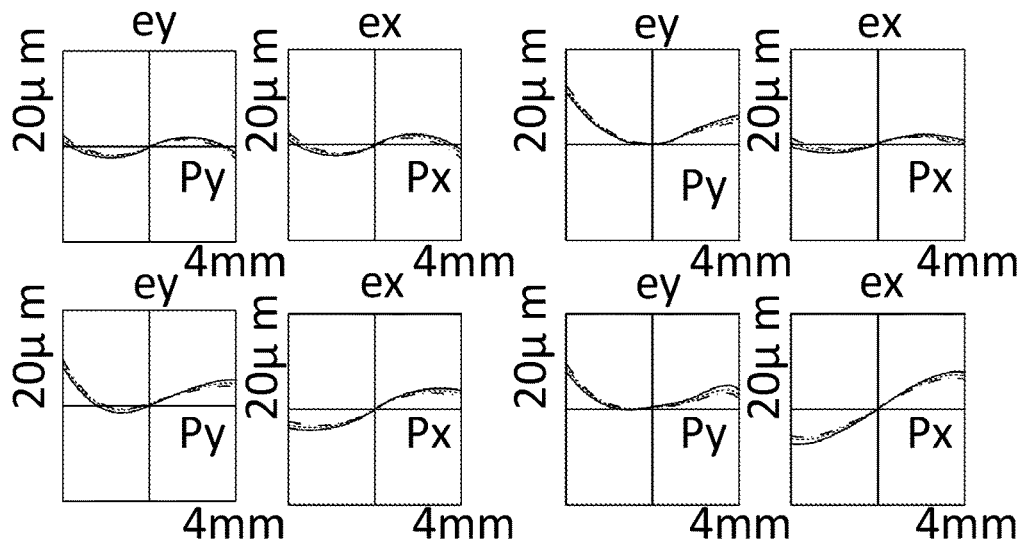
FIG. 18C illustrates a lateral aberrations detected with respect to −1 diopter in the optical apparatus according to Example 6.
Figure 18D:
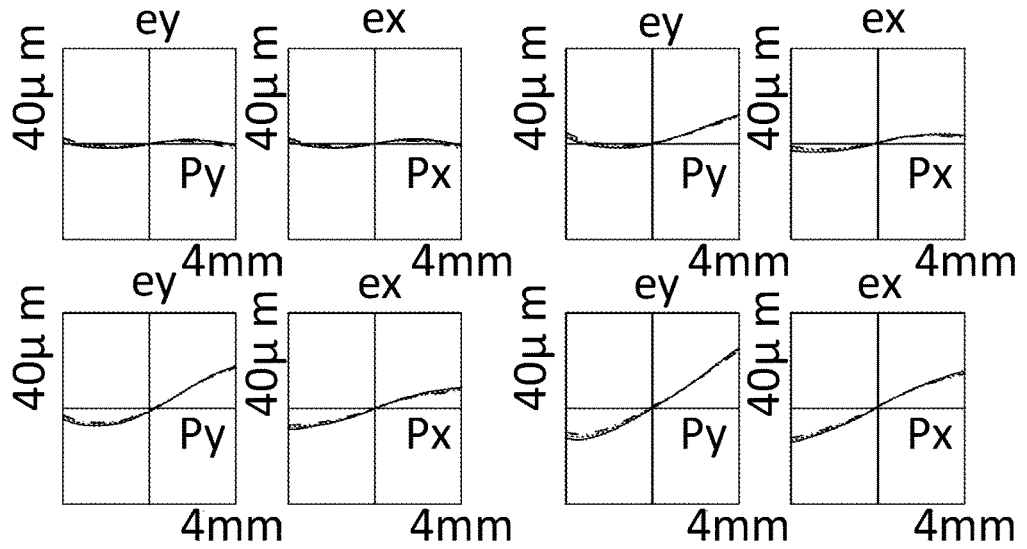
FIG. 18D illustrates a lateral aberration detected with respect to −5 diopter in the optical apparatus according to Example 6.

FIG. 18B, FIG. 18C, and FIG. 18D illustrate lateral aberrations detected with respect to +2, −1, and −5 diopters (ratios A/B=0.204, 0.201, and 0.196), respectively, in the optical apparatus 100 according to Example 6. Here, the upper left set of diagrams illustrates the center of the image, the upper right set of diagrams illustrates the center of the upper and lower ends of the image, the lower left set of diagrams illustrates the center of the left and right ends, and the lower right set of diagrams illustrates the aberration at the diagonal. Py and Px are coordinates (full scale: 4 mm)

on the aperture plane (at the position of the eye box), and ey and ex are the aberration amount of the tangential plane and the aberration amount of the sagittal plane (full scale is shown in each drawing), respectively. The solid line indicates an aberration with respect to a wavelength of 0.515 μm, the dotted line indicates an aberration with respect to a wavelength of 0.528 μm, and the alternate long and short dash line indicates aberration with respect to a wavelength of 0.544 μm.

Figure 18E:
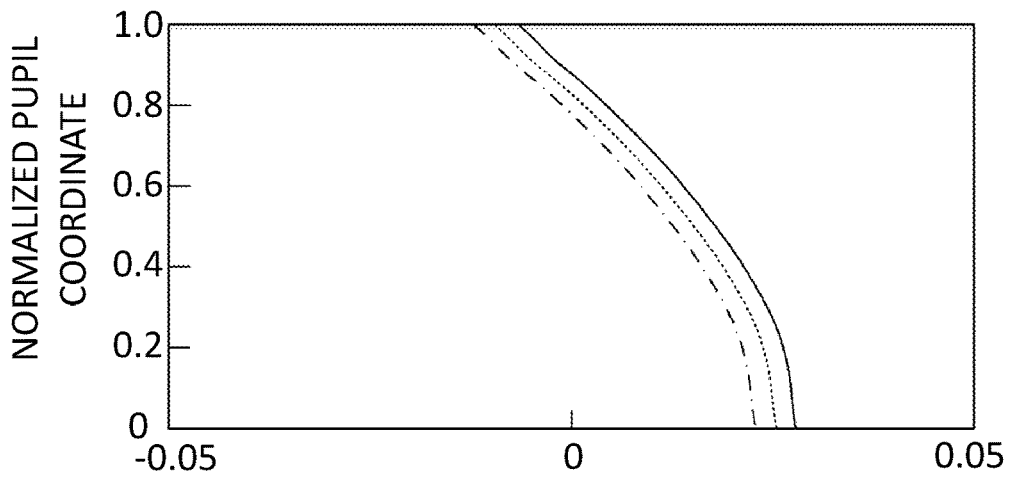
FIG. 18E illustrates a spherical aberration detected with respect to +2 diopter in the optical apparatus according to Example 6.
Figure 18F:
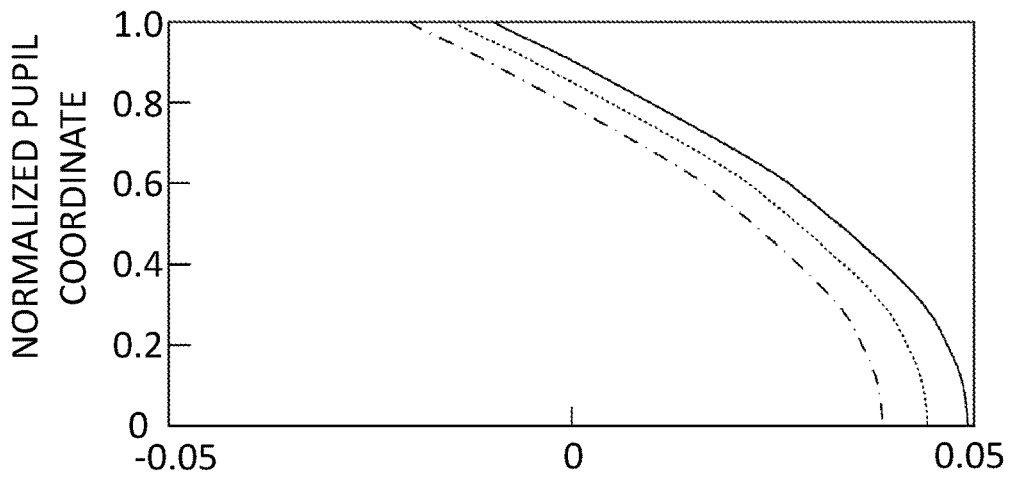
FIG. 18F illustrates a spherical aberration detected with respect to −1 diopter in the optical apparatus according to Example 6.
Figure 18G:
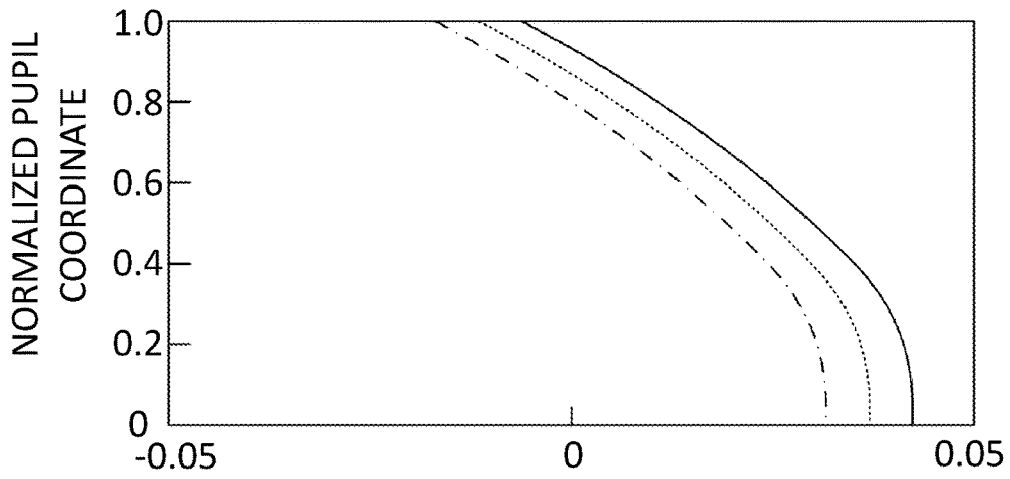
FIG. 18G illustrates a spherical aberration detected with respect to −5 diopter in the optical apparatus according to Example 6.

FIG. 18E, FIG. 18F, and FIG. 18G illustrate spherical aberrations on the optical axis detected with respect to +2, −1, and −5 diopters (ratios A/B=0.204, 0.201, and 0.196), respectively, in the optical apparatus 100 according to Example 6. Here, the vertical axis represents normalized pupil coordinates (full scale: 4 mm) at the position of the eye box, and the horizontal axis represents the aberration amount. In each drawing, the solid line indicates an aberration with respect to a wavelength of 0.515 μm, the dotted line indicates an aberration with respect to a wavelength of 0.528 μm, and the alternate long and short dash line indicates aberration with respect to a wavelength of 0.544 μm.

Figure 18H:
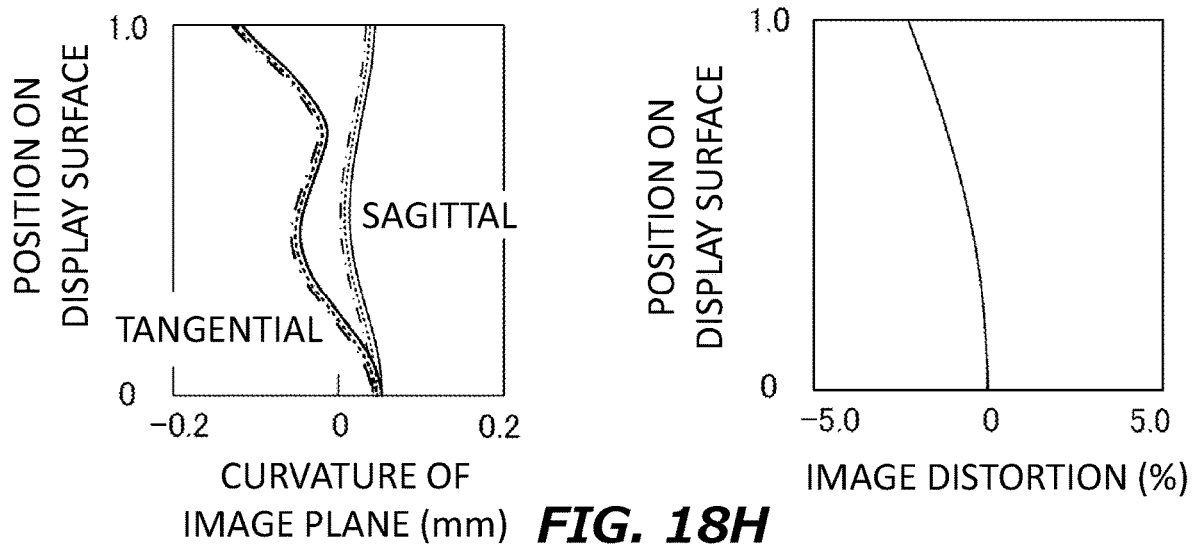
FIG. 18H illustrates a field curvature (left diagram) and an image distortion (right diagram) detected with respect to +2 diopter in the optical apparatus according to Example 6.
Figure 18I:
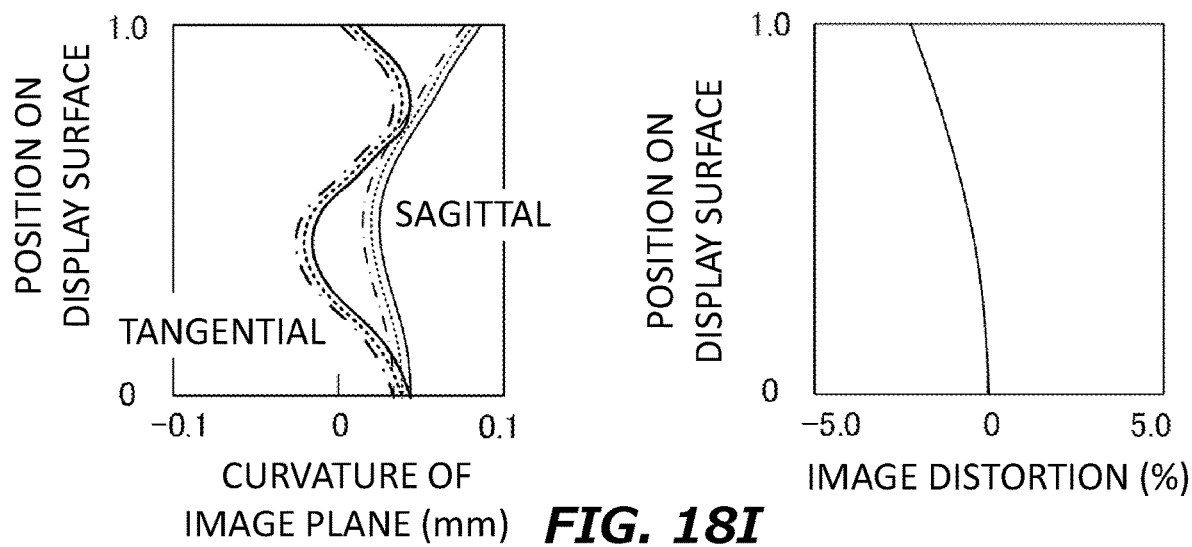
FIG. 18I illustrates a field curvature (left diagram) and an image distortion (right diagram) detected with respect to −1 diopter in the optical apparatus according to Example 6.
Figure 18J:
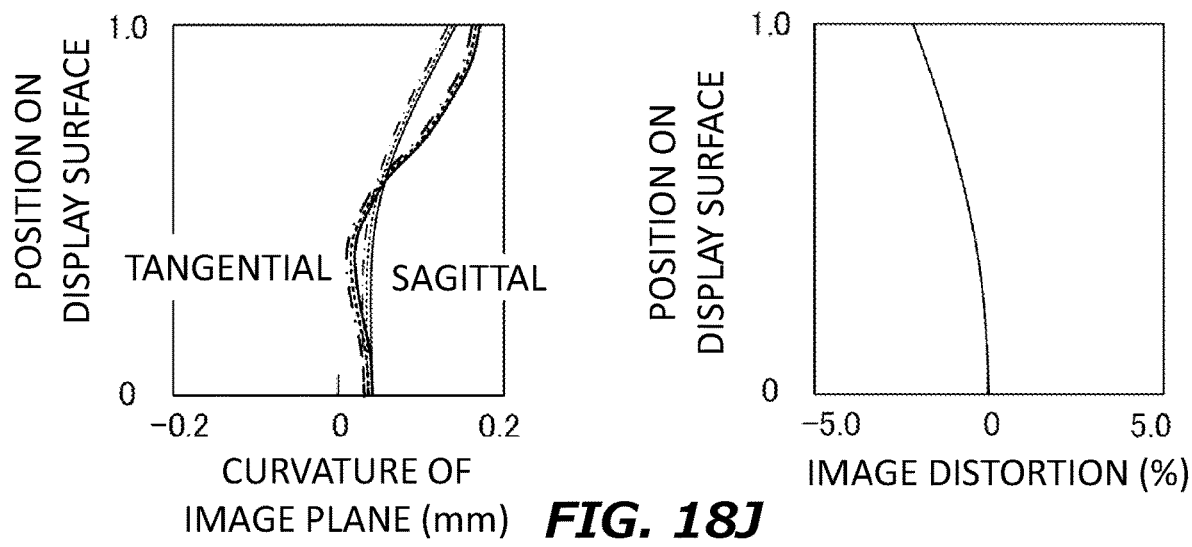
FIG. 18J illustrates a field curvature (left diagram) and an image distortion (right diagram) detected with respect to −5 diopter in the optical apparatus according to Example 6.

FIG. 18H, FIG. 18I, and FIG. 18J illustrate the field curvature (left diagram) and the image distortion (right diagram) detected with respect to +2, −1, and −5 diopters (ratios A/B=0.204, 0.201, and 0.196), respectively, in the optical apparatus 100 according to Example 6. Similarly to the field curvature illustrated in FIG. 9A to FIG. 9C, the field curvature is illustrated on the horizontal axis with respect to the position (the outermost position is 1.0) to the center on the display surface of the vertical axis. The field curvature on the tangential plane and the field curvature on the sagittal plane are shown, respectively. The image distortion is shown on the horizontal axis with respect to the position on the diagonal to the center on the display surface of the vertical axis. In each drawing, the solid line indicates a wavelength of 0.515 μm, the dotted line indicates a wavelength of 0.528 μm, and the alternate long and short dash line indicates the field curvature and the image distortion with respect to a wavelength of 0.544 μm.

In FIG. 18H (+2 diopter, ratio A/B=0.204), the image plane greatly vibrates according to the position from the center of the display 110 on the tangential plane, and is imaged on the downstream side in the periphery with respect to the center. On the sagittal plane, the image plane gently varies according to the position from the center of the display 110, and is imaged on the somewhat downstream side in the periphery with respect to the center. The image distortion shows a negative distortion with respect to the center of the display 110, that is, the image is distorted in a barrel shape.

In FIG. 18I (−1 diopter, ratio A/B=0.201), the image plane greatly vibrates according to the position from the center of the display 110 on the tangential plane, and is imaged on the downstream side in the periphery with respect to the center. On the sagittal plane, the image plane gently varies according to the position from the center of the display 110, and is imaged on the upstream side in the periphery with respect to the center. The image distortion shows a negative distortion with respect to the center of the display 110, that is, the image is distorted in a barrel shape.

In FIG. 18J (−5 diopter, ratio A/B=0.196), the image plane gently varies according to the position from the center of the display 110 on the tangential plane, and is imaged on the upstream side in the periphery with respect to the center. On the sagittal plane, the image plane gently varies according to the position from the center of the display 110, and is imaged on the upstream side in the periphery with respect to the center. The image distortion shows a negative distortion with respect to the center of the display 110, that is, the image is distorted in a barrel shape.

In the optical apparatus 100 according to Example 6, the field curvature has been within a range of ±0.2 mm with respect to +2, −1, and −5 diopters (ratios A/B=0.204, 0.201, and 0.196), and the image distortion has been about −3% at maximum.

FIG. 19A illustrates a detailed design of the optical apparatus 100 according to Example 7. In Example 7, Model 2 of FIG. 12A is adopted, and the optical apparatus 100 is designed according to various parameters given to the lens specification, the aspheric coefficient, the GPL data, and the variable interval data. In the present example, the ratios A/B are given as 0.289, 0.280, and 0.269 with respect to +2, −1, and −5 diopters, respectively.

Figure 19B:
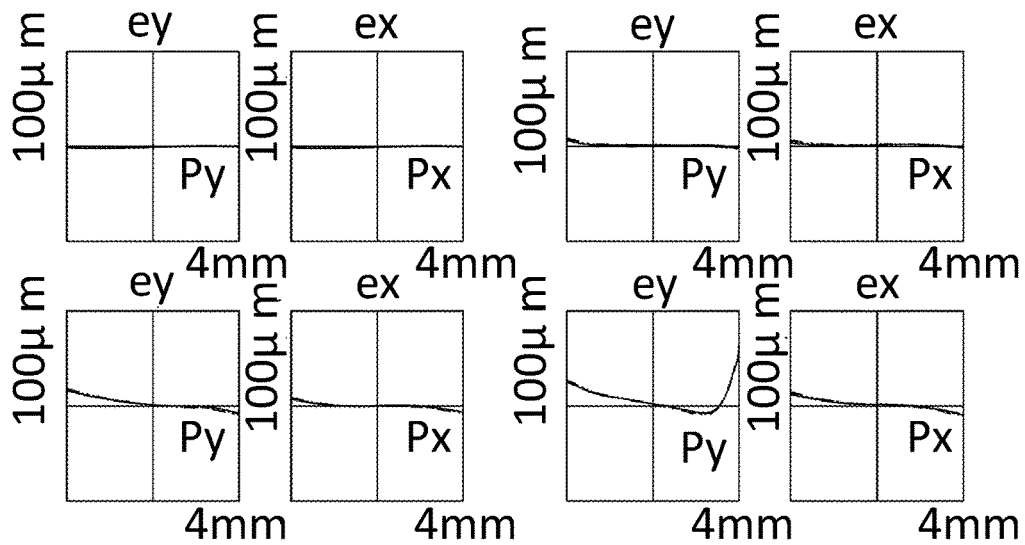
FIG. 19B illustrates a lateral aberration detected with respect to +2 diopter in the optical apparatus according to Example 7.
Figure 19C:
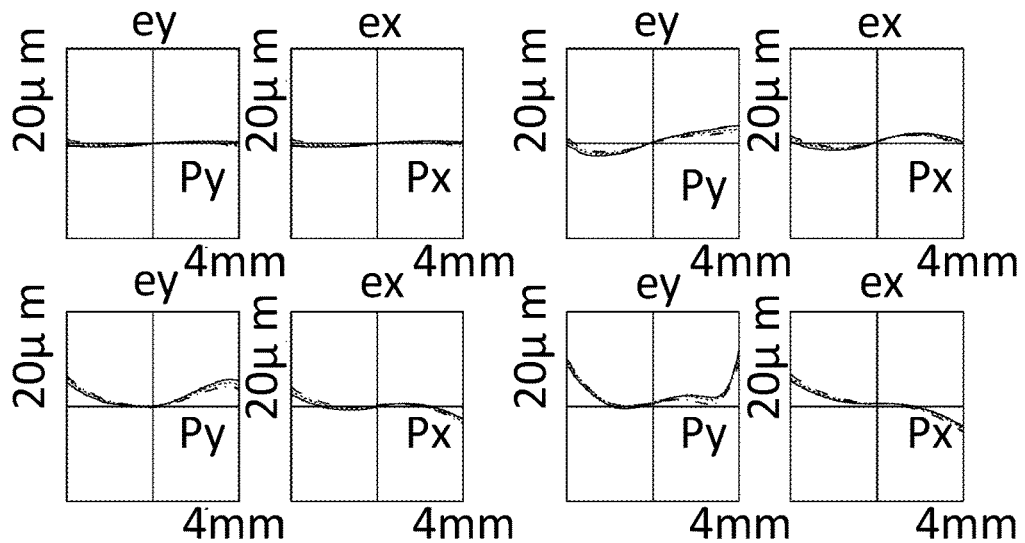
FIG. 19C illustrates a lateral aberration detected with respect to −1 diopter in the optical apparatus according to Example 7.
Figure 19D:
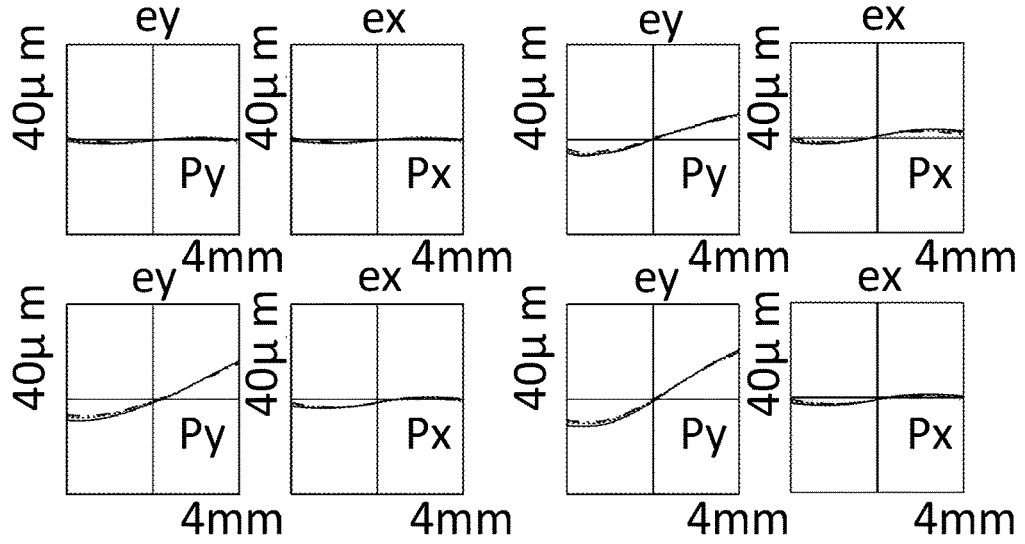
FIG. 19D illustrates a lateral aberration detected with respect to −5 diopter in the optical apparatus according to Example 7.

FIG. 19B, FIG. 19C, and FIG. 19D illustrate lateral aberrations detected with respect to +2, −1, and −5 diopters (ratios A/B=0.289, 0.280, and 0.269), respectively, in the optical apparatus 100 according to Example 7. Here, the upper left set of diagrams illustrates the center of the image, the upper right set of diagrams illustrates the center of the upper and lower ends of the image, the lower left set of diagrams illustrates the center of the left and right ends, and the lower right set of diagrams illustrates the aberration at the diagonal. Py and Px are coordinates (full scale: 4 mm) on the aperture plane (at the position of the eye box), and ey and ex are the aberration amount of the tangential plane and the aberration amount of the sagittal plane (full scale is shown in each drawing), respectively. The solid line indicates an aberration with respect to a wavelength of 0.515 μm, the dotted line indicates an aberration with respect to a wavelength of 0.528 μm, and the alternate long and short dash line indicates aberration with respect to a wavelength of 0.544 μm.

Figure 19E:
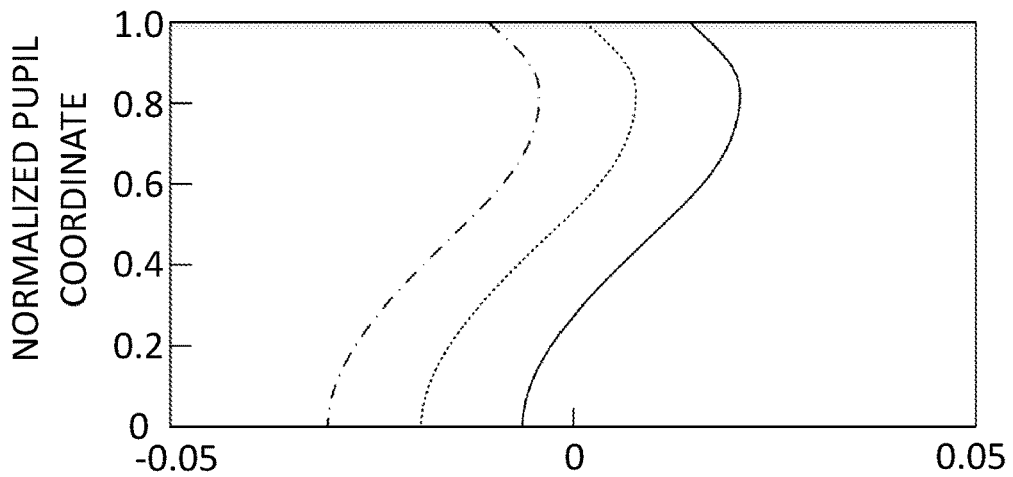
FIG. 19E illustrates a spherical aberration detected with respect to +2 diopter in the optical apparatus according to Example 7.
Figure 19F:
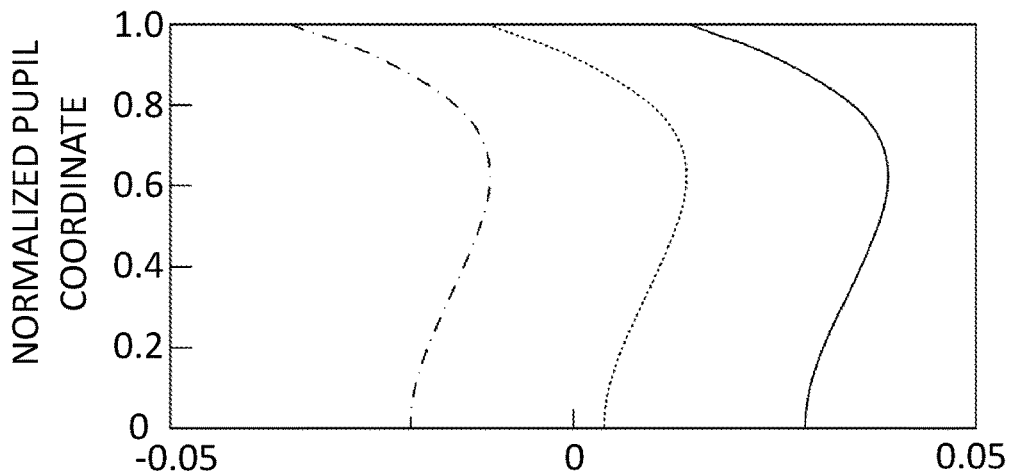
FIG. 19F illustrates a spherical aberration detected with respect to −1 diopter in the optical apparatus according to Example 7.
Figure 19G:
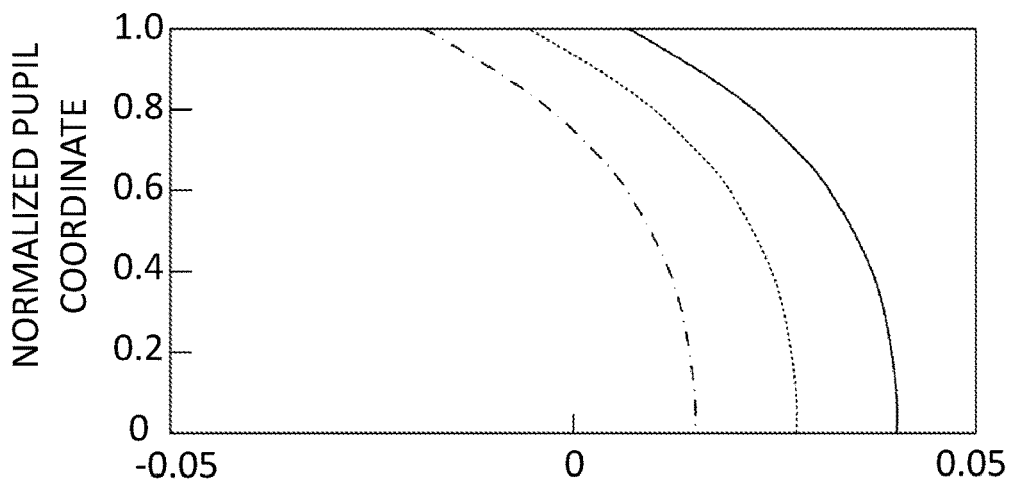
FIG. 19G illustrates a spherical aberration detected with respect to −5 diopter in the optical apparatus according to Example 7.

FIG. 19E, FIG. 19F, and FIG. 19G illustrate spherical aberrations on the optical axis detected with respect to +2, −1, and −5 diopters (ratios A/B=0.289, 0.280, and 0.269), respectively, in the optical apparatus 100 according to Example 7. Here, the vertical axis represents normalized pupil coordinates (full scale: 4 mm) at the position of the eye box, and the horizontal axis represents the aberration amount. In each drawing, the solid line indicates an aberration with respect to a wavelength of 0.515 μm, the dotted line indicates an aberration with respect to a wavelength of 0.528 μm, and the alternate long and short dash line indicates aberration with respect to a wavelength of 0.544 μm.

Figure 19H:
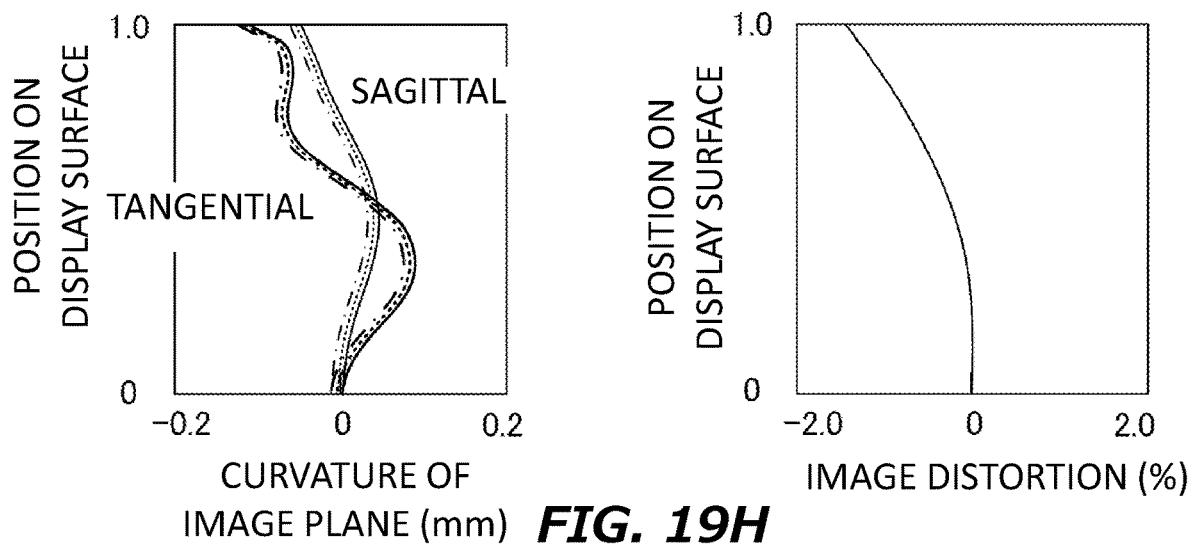
FIG. 19H illustrates a field curvature (left diagram) and an image distortion (right diagram) detected with respect to +2 diopter in the optical apparatus according to Example 7.
Figure 19I:
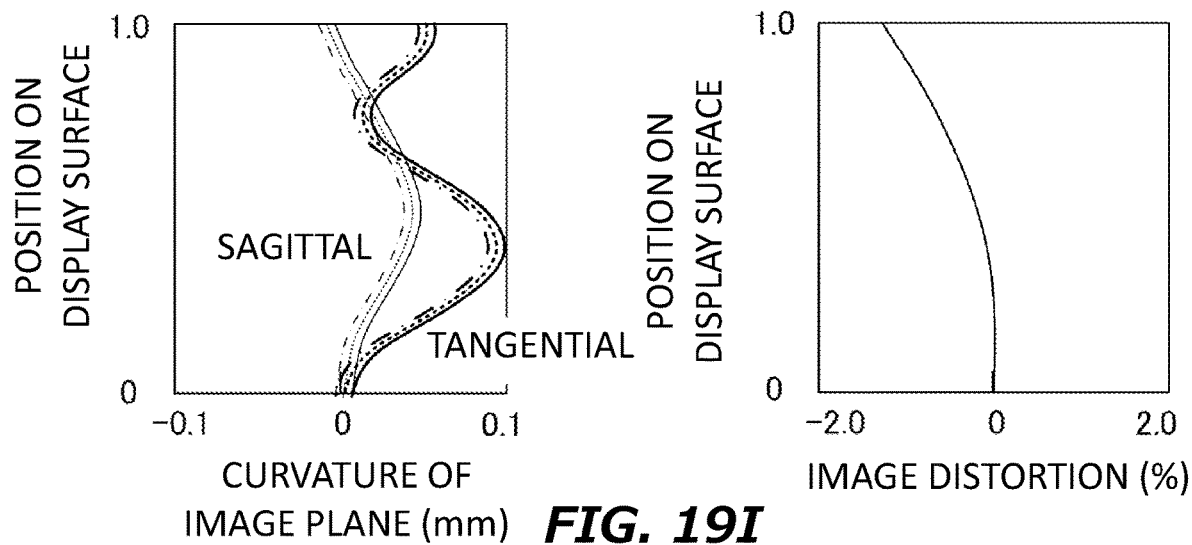
FIG. 19I illustrates a field curvature (left diagram) and an image distortion (right diagram) detected with respect to −1 diopter in the optical apparatus according to Example 7.
Figure 19J:
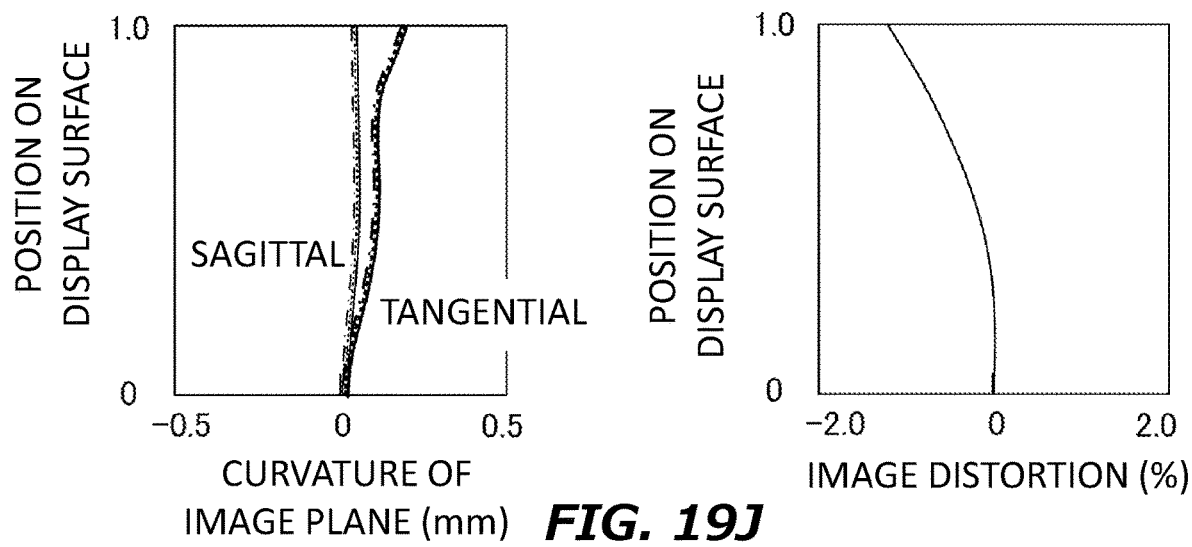
FIG. 19J illustrates a field curvature (left diagram) and an image distortion (right diagram) detected with respect to −5 diopter in the optical apparatus according to Example 7.

FIG. 19H, FIG. 19I, and FIG. 19J illustrate the field curvature (left diagram) and the image distortion (right diagram) detected with respect to +2, −1, and −5 diopters (ratios A/B=0.289, 0.280, and 0.269), respectively, in the optical apparatus 100 according to Example 7. Similarly to the field curvature illustrated in FIG. 9A to FIG. 9C, the field curvature is illustrated on the horizontal axis with respect to the position (the outermost position is 1.0) to the center on the display surface of the vertical axis. The field curvature on the tangential plane and the field curvature on the sagittal plane are shown, respectively. The image distortion is shown on the horizontal axis with respect to the position on the diagonal to the center on the display surface of the vertical axis. In each drawing, the solid line indicates a wavelength of 0.515 μm, the dotted line indicates a wavelength of 0.528 μm, and the alternate long and short dash line indicates the field curvature and the image distortion with respect to a wavelength of 0.544 μm.

In FIG. 19H (+2 diopter, ratio A/B=0.289), the image plane greatly vibrates according to the position from the center of the display 110 on the tangential plane, and is imaged on the downstream side in the periphery with respect to the center. On the sagittal plane, the image plane gently varies according to the position from the center of the display 110, and is imaged on the somewhat downstream side in the periphery with respect to the center. The image distortion shows a negative distortion with respect to the center of the display 110, that is, the image is distorted in a barrel shape.

In FIG. 19I (−1 diopter, ratio A/B=0.280), the image plane greatly vibrates according to the position from the center of the display 110 on the tangential plane, and is imaged on the upstream side in the periphery with respect to the center. On the sagittal plane, the image plane gently varies according to the position from the center of the display 110, and is imaged on the somewhat downstream side in the periphery with respect to the center. The image distortion shows a negative distortion with respect to the center of the display 110, that is, the image is distorted in a barrel shape.

In FIG. 19J (−5 diopter, ratio A/B=0.269), the image plane gently varies according to the position from the center of the display 110 on the tangential plane, and is imaged on the upstream side in the periphery with respect to the center. On the sagittal plane, the image plane hardly varies with respect to the position from the center of the display 110, and is imaged at a constant position. The image distortion shows a negative distortion with respect to the center of the display 110, that is, the image is distorted in a barrel shape.

In the optical apparatus 100 according to Example 7, the field curvature has been within a range of ±0.2 mm with respect to +2, −1, and −5 diopters (ratios A/B=0.289, 0.280, and 0.269), and the image distortion has been about −2% at maximum.

FIG. 20A illustrates a detailed design of the optical apparatus 100 according to Example 8. In Example 8, Model 3 of FIG. 12A is adopted, and the optical apparatus 100 is designed according to various parameters given to the lens specification, the aspheric coefficient, the GPL data, and the variable interval data. In the present example, the ratios A/B are given as 0.173, 0.170, and 0.166 with respect to +2, −1, and −5 diopters, respectively.

Figure 20B:
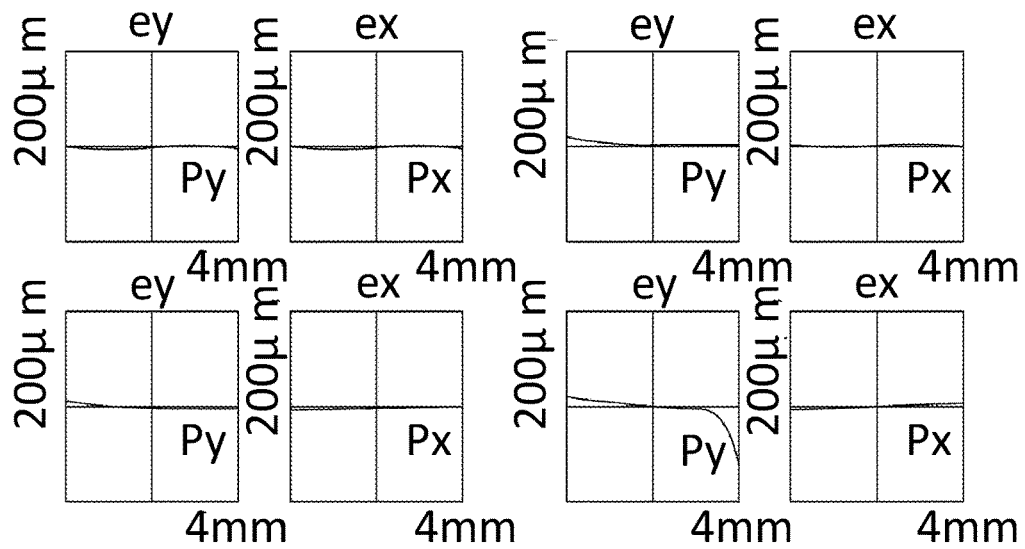
FIG. 20B illustrates a lateral aberration detected with respect to +2 diopter in the optical apparatus according to Example 8.
Figure 20C:
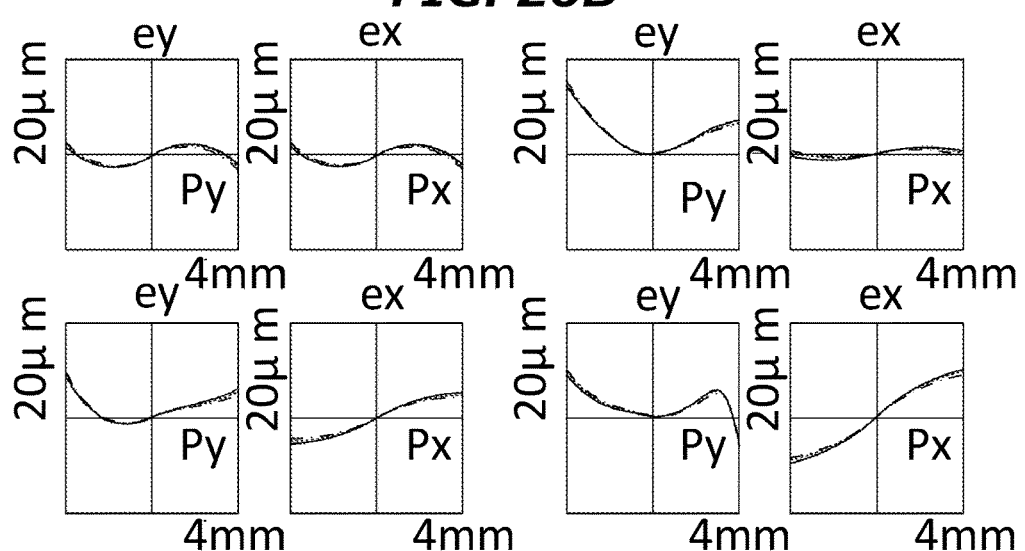
FIG. 20C illustrates a lateral aberration detected with respect to −1 diopter in the optical apparatus according to Example 8.
Figure 20D:
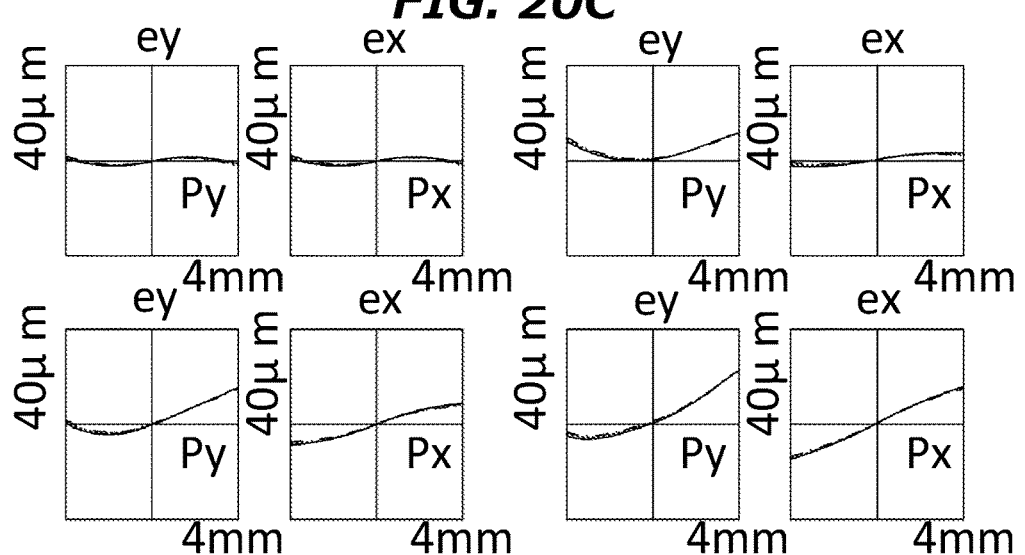
FIG. 20D illustrates a lateral aberration detected with respect to −5 diopter in the optical apparatus according to Example 8.

FIG. 20B, FIG. 20C, and FIG. 20D illustrate lateral aberrations detected with respect to +2, −1, and −5 diopters (ratios A/B=0.173, 0.170, and 0.166), respectively, in the optical apparatus 100 according to Example 8. Here, the upper left set of diagrams illustrates the center of the image, the upper right set of diagrams illustrates the center of the upper and lower ends of the image, the lower left set of diagrams illustrates the center of the left and right ends, and the lower right set of diagrams illustrates the aberration at the diagonal. Py and Px are coordinates (full scale: 4 mm) on the aperture plane (at the position of the eye box), and ey and ex are the aberration amount of the tangential plane and the aberration amount of the sagittal plane (full scale is shown in each drawing), respectively. The solid line indicates an aberration with respect to a wavelength of 0.515 µm, the dotted line indicates an aberration with respect to a wavelength of 0.528 µm, and the alternate long and short dash line indicates aberration with respect to a wavelength of 0.544 µm.

Figure 20E:
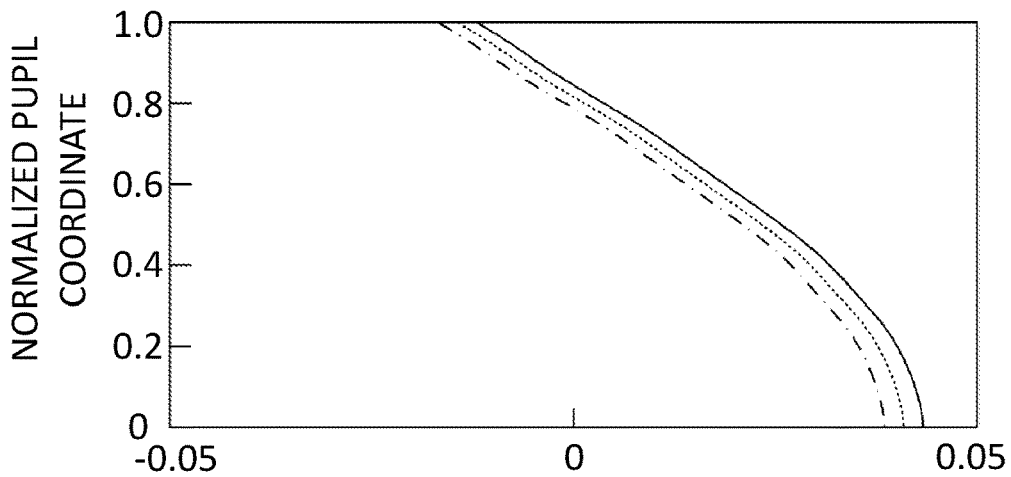
FIG. 20E illustrates a spherical aberration detected with respect to +2 diopter in the optical apparatus according to Example 8.
Figure 20F:
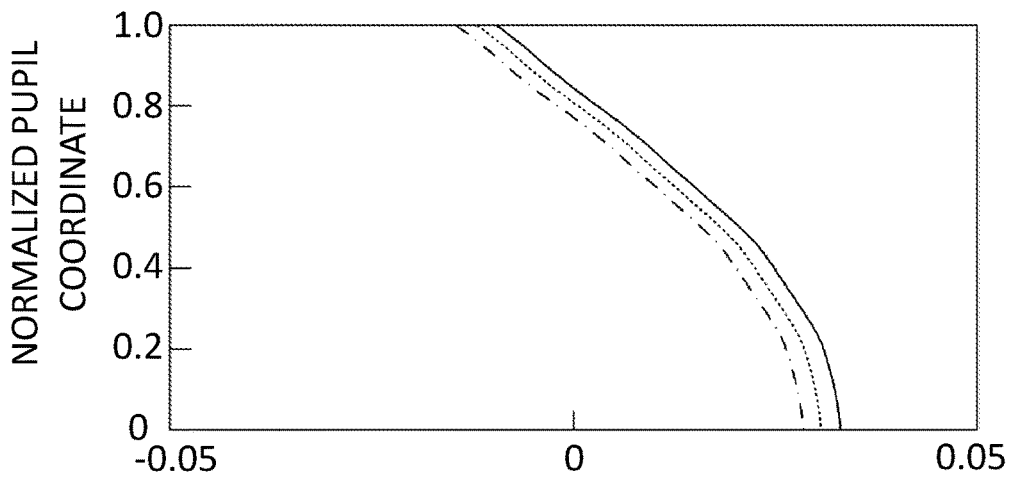
FIG. 20F illustrates a spherical aberration detected with respect to −1 diopter in the optical apparatus according to Example 8.
Figure 20G:
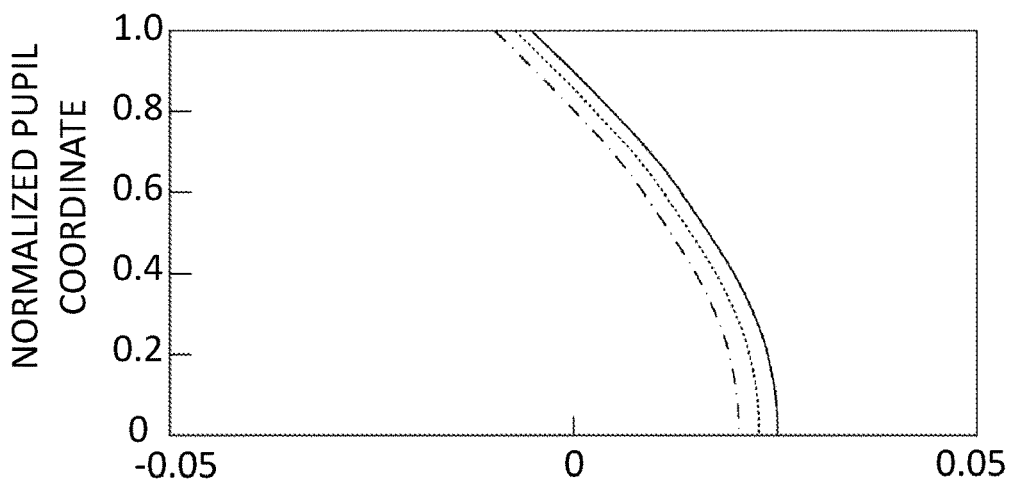
FIG. 20G illustrates a spherical aberration detected with respect to −5 diopter in the optical apparatus according to Example 8.

FIG. 20E, FIG. 20F, and FIG. 20G illustrate spherical aberrations on the optical axis detected with respect to +2, −1, and −5 diopters (ratios A/B=0.173, 0.170, and 0.166), respectively, in the optical apparatus 100 according to Example 8. Here, the vertical axis represents normalized pupil coordinates (full scale: 4 mm) at the position of the eye box, and the horizontal axis represents the aberration amount. In each drawing, the solid line indicates an aberration with respect to a wavelength of 0.515 µm, the dotted line indicates an aberration with respect to a wavelength of 0.528 µm, and the alternate long and short dash line indicates aberration with respect to a wavelength of 0.544 µm.

Figure 20H:
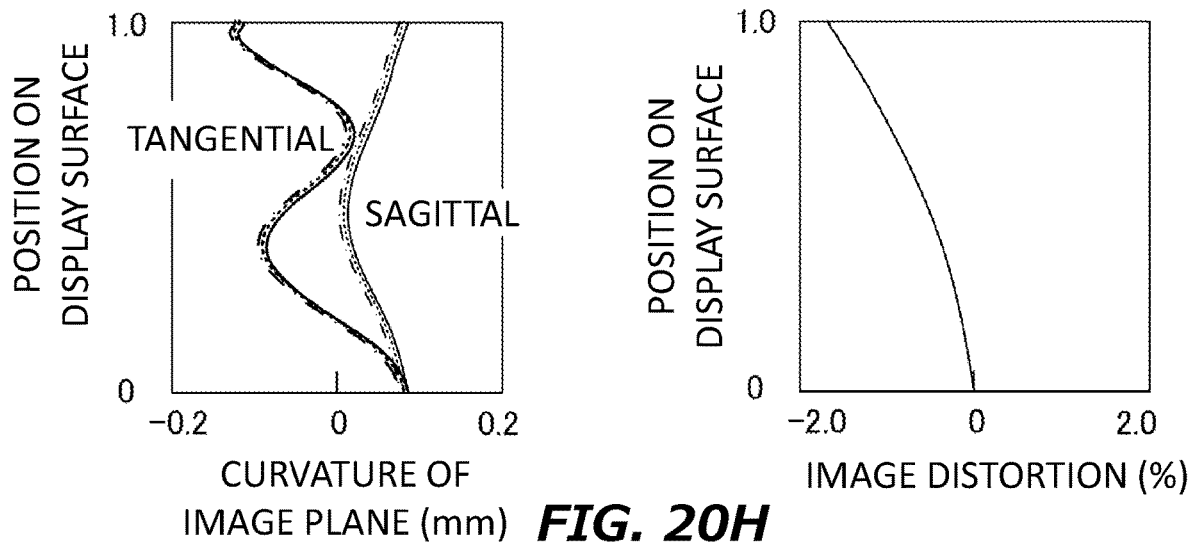
FIG. 20H illustrates a field curvature (left diagram) and an image distortion (right diagram) detected with respect to +2 diopter in the optical apparatus according to Example 8.
Figure 20I:
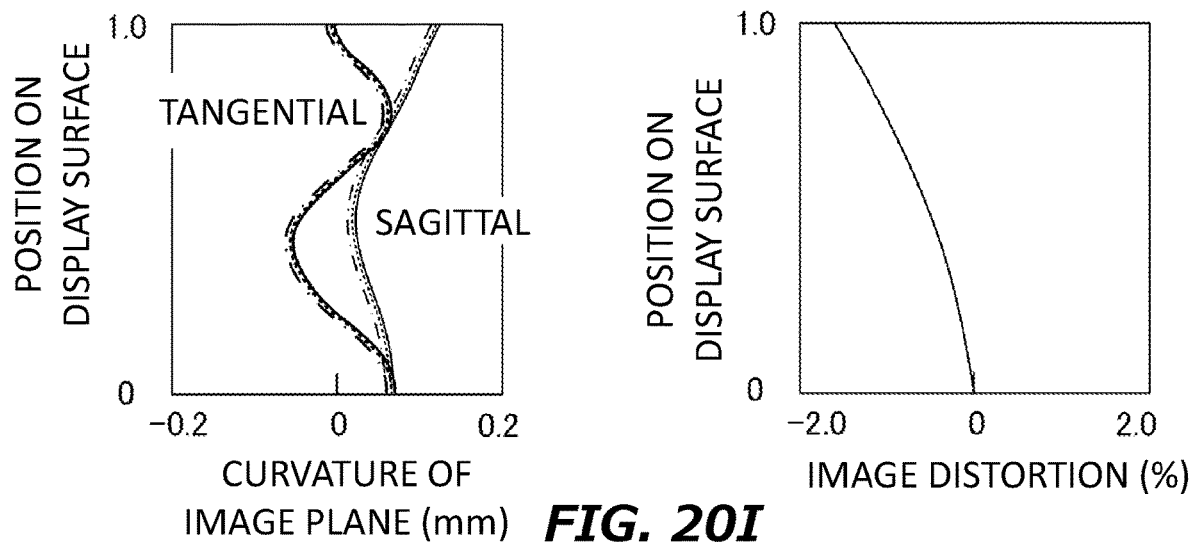
FIG. 20I illustrates a field curvature (left diagram) and an image distortion (right diagram) detected with respect to −1 diopter in the optical apparatus according to Example 8.
Figure 20J:
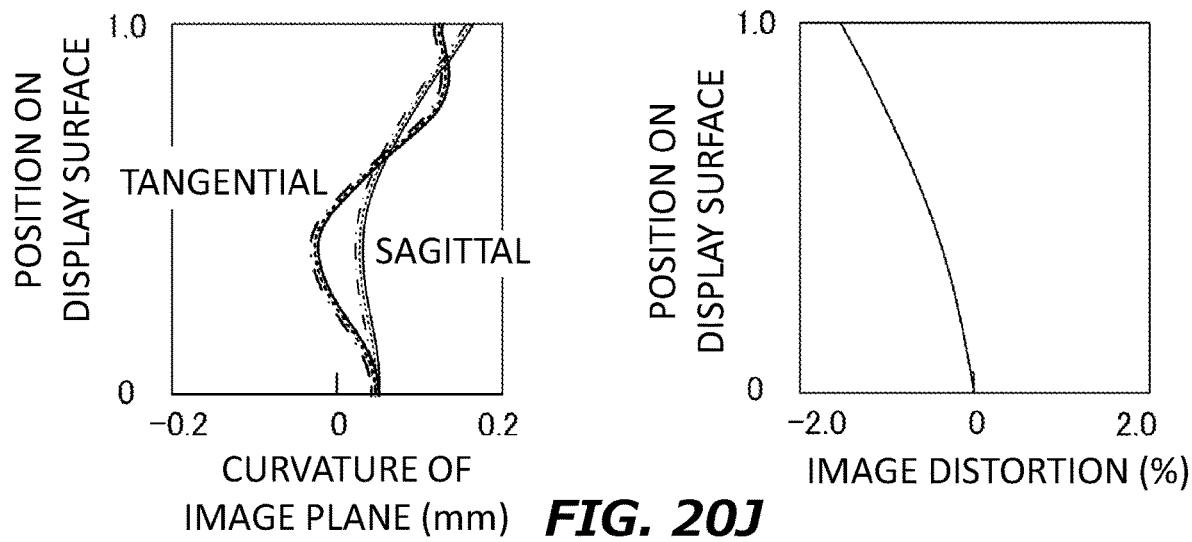
FIG. 20J illustrates a field curvature (left diagram) and an image distortion (right diagram) detected with respect to −5 diopter in the optical apparatus according to Example 8.

FIG. 20H, FIG. 20I, and FIG. 20J illustrate the field curvature (left diagram) and the image distortion (right diagram) detected with respect to +2, −1, and −5 diopters (ratios A/B=0.173, 0.170, and 0.166), respectively, in the optical apparatus 100 according to Example 8. Similarly to the field curvature illustrated in FIG. 9A to FIG. 9C, the field curvature is illustrated on the horizontal axis with respect to the position (the outermost position is 1.0) to the center on the display surface of the vertical axis. The field curvature on the tangential plane and the field curvature on the sagittal plane are shown, respectively. The image distortion is shown on the horizontal axis with respect to the position on the diagonal to the center on the display surface [110] of the vertical axis. In each drawing, the solid line indicates a wavelength of 0.515 µm, the dotted line indicates a wavelength of 0.528 µm, and the alternate long and short dash line indicates the field curvature and the image distortion with respect to a wavelength of 0.544 µm.

In FIG. 20H (+2 diopter, ratio A/B=0.173), the image plane greatly vibrates according to the position from the center of the display 110 on the tangential plane, and is imaged on the downstream side in the periphery with respect to the center. On the sagittal plane, the image plane gently varies according to the position from the center of the display 110, and is imaged on the somewhat upstream side in the periphery with respect to the center. The image distortion shows a negative distortion with respect to the center of the display 110, that is, the image is distorted in a barrel shape.

In FIG. 20I (−1 diopter, ratio A/B=0.170), the image plane greatly vibrates according to the position from the center of the display 110 on the tangential plane, and is imaged on the upstream side in the periphery with respect to the center. On the sagittal plane, the image plane gently varies according to the position from the center of the display 110, and is imaged on the downstream side in the periphery with respect to the center. The image distortion shows a negative distortion with respect to the center of the display 110, that is, the image is distorted in a barrel shape.

In FIG. 20J (−5 diopter, ratio A/B=0.166), the image plane greatly varies according to the position from the center of the display 110 on the tangential plane, and is imaged on the upstream side in the periphery with respect to the center. On the sagittal plane, the image plane gently varies according to the position from the center of the display 110, and is imaged on the upstream side in the periphery with respect to the center. The image distortion shows a negative distortion with respect to the center of the display 110, that is, the image is distorted in a barrel shape.

In the optical apparatus 100 according to Example 8, the field curvature has been within a range of ±0.2 mm with respect to +2, −1, and −5 diopters (ratios A/B=0.173, 0.170, and 0.166), and the image distortion has been about −2% at maximum.

FIG. 21A illustrates a detailed design of the optical apparatus 100 according to Example 9. In Example 9, Model 3 of FIG. 12A is adopted, and the optical apparatus 100 is designed according to various parameters given to the lens specification, the aspheric coefficient, the GPL data, and the variable interval data. In the present example, the ratios A/B are given as 0.215, 0.210, and 0.203 with respect to +2, −1, and −5 diopters, respectively.

Figure 21B:
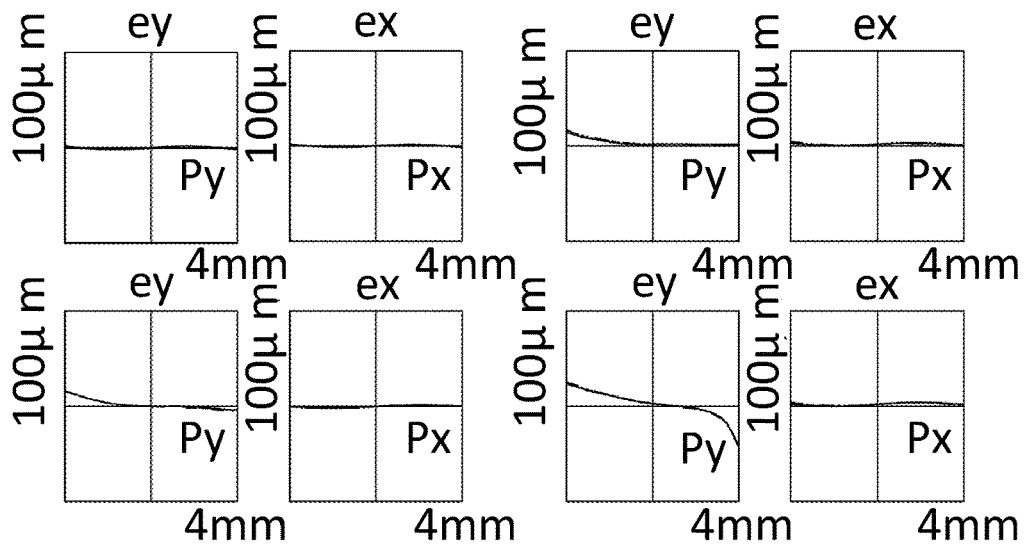
FIG. 21B illustrates a lateral aberration detected with respect to +2 diopter in the optical apparatus according to Example 9.
Figure 21C:
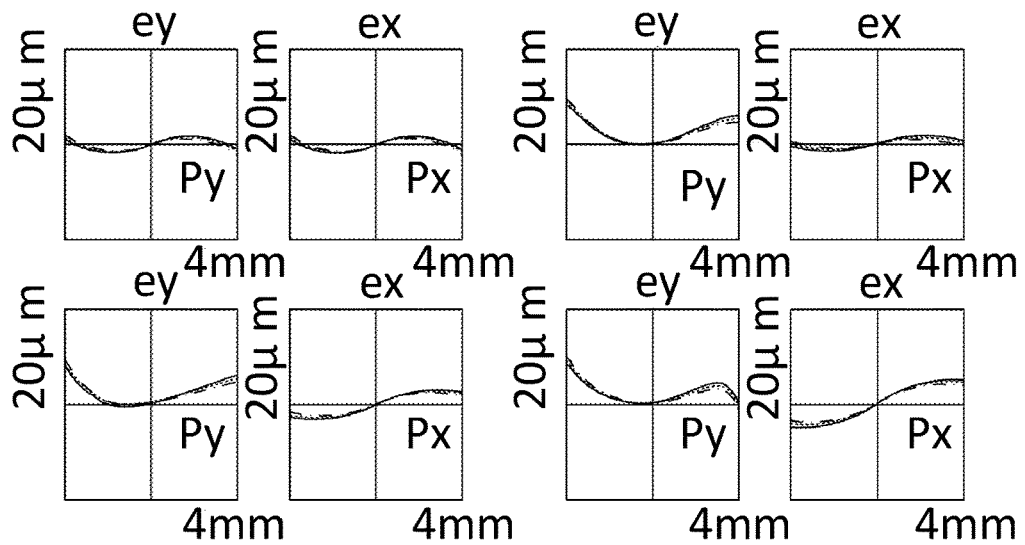
FIG. 21C illustrates a lateral aberration detected with respect to −1 diopter in the optical apparatus according to Example 9.
Figure 21D:
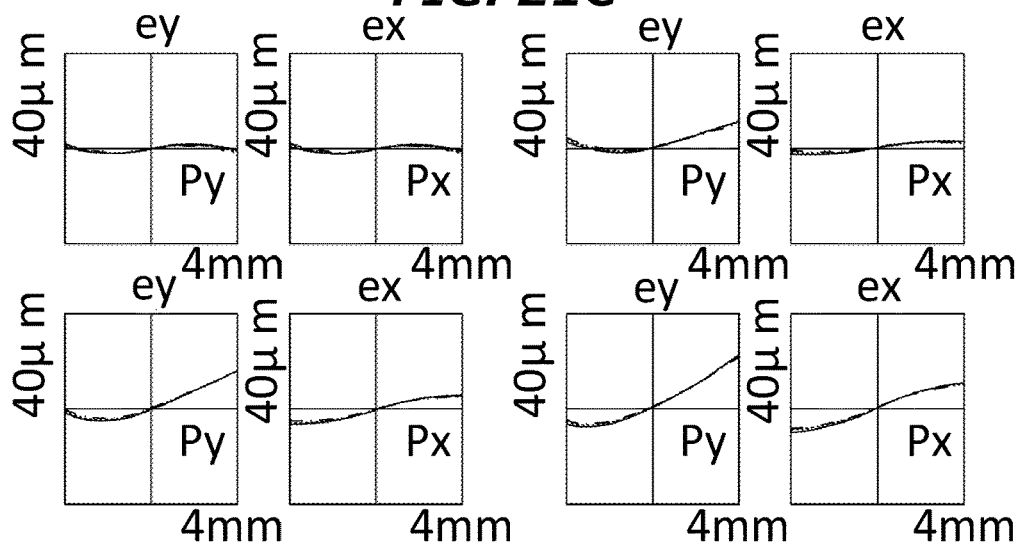
FIG. 21D illustrates a lateral aberration detected with respect to −5 diopter in the optical apparatus according to Example 9.

FIG. 21B, FIG. 21C, and FIG. 21D illustrate lateral aberrations detected with respect to +2, −1, and −5 diopters (ratios A/B=0.215, 0.210, and 0.203), respectively, in the optical apparatus 100 according to Example 9. Here, the upper left set of diagrams illustrates the center of the image, the upper right set of diagrams illustrates the center of the upper and lower ends of the image, the lower left set of diagrams illustrates the center of the left and right ends, and the lower right set of diagrams illustrates the aberration at the diagonal. Py and Px are coordinates (full scale: 4 mm) on the aperture plane (at the position of the eye box), and ey and ex are the aberration amount of the tangential plane and the aberration amount of the sagittal plane (full scale is shown in each drawing), respectively. The solid line indicates an aberration with respect to a wavelength of 0.515 µm, the dotted line indicates an aberration with respect to a wavelength of 0.528 µm, and the alternate long and short dash line indicates aberration with respect to a wavelength of 0.544 µm.

Figure 21E:
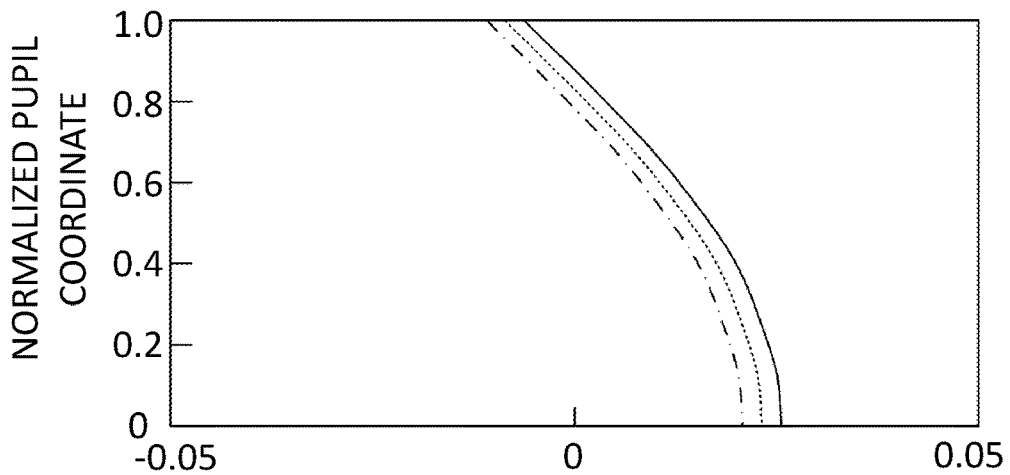
FIG. 21E illustrates a spherical aberration detected with respect to +2 diopter in the optical apparatus according to Example 9.
Figure 21F:
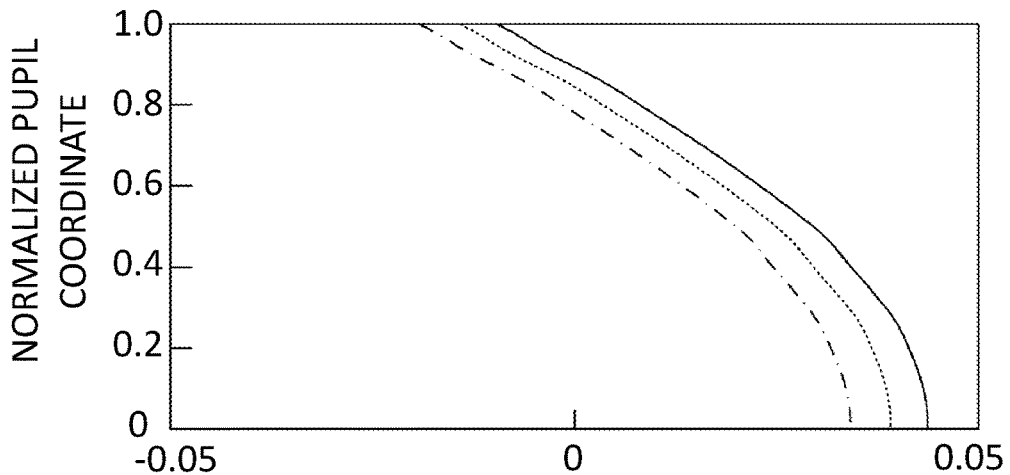
FIG. 21F illustrates a spherical aberration detected with respect to −1 diopter in the optical apparatus according to Example 9.
Figure 21G:
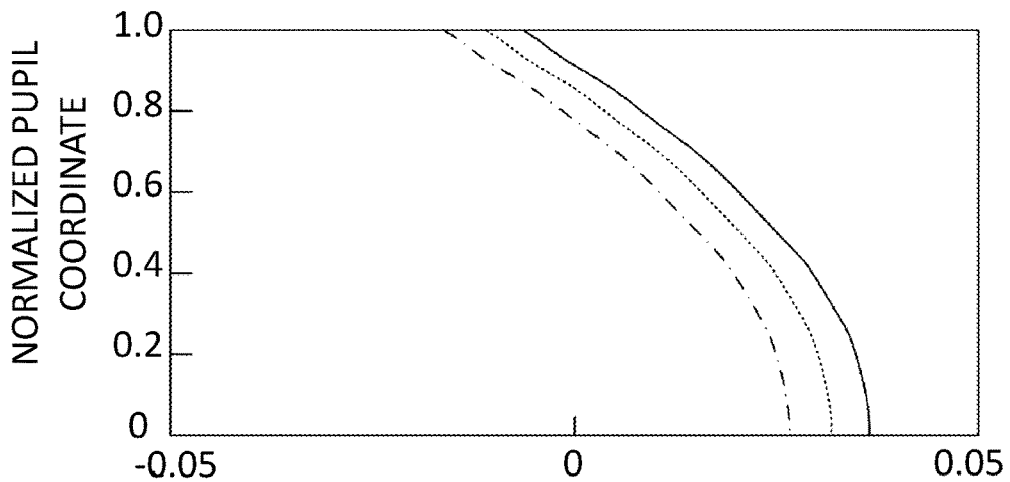
FIG. 21G illustrates a spherical aberration detected with respect to −5 diopter in the optical apparatus according to Example 9.

FIG. 21E, FIG. 21F, and FIG. 21G illustrate spherical aberrations on the optical axis detected with respect to +2, −1, and −5 diopters (ratios A/B=0.215, 0.210, and 0.203), respectively, in the optical apparatus 100 according to Example 9. Here, the vertical axis represents normalized pupil coordinates (full scale: 4 mm) at the position of the eye box, and the horizontal axis represents the aberration amount. In each drawing, the solid line indicates an aberration with respect to a wavelength of 0.515 µm, the dotted line indicates an aberration with respect to a wavelength of 0.528 µm, and the alternate long and short dash line indicates aberration with respect to a wavelength of 0.544 µm.

Figure 21H:
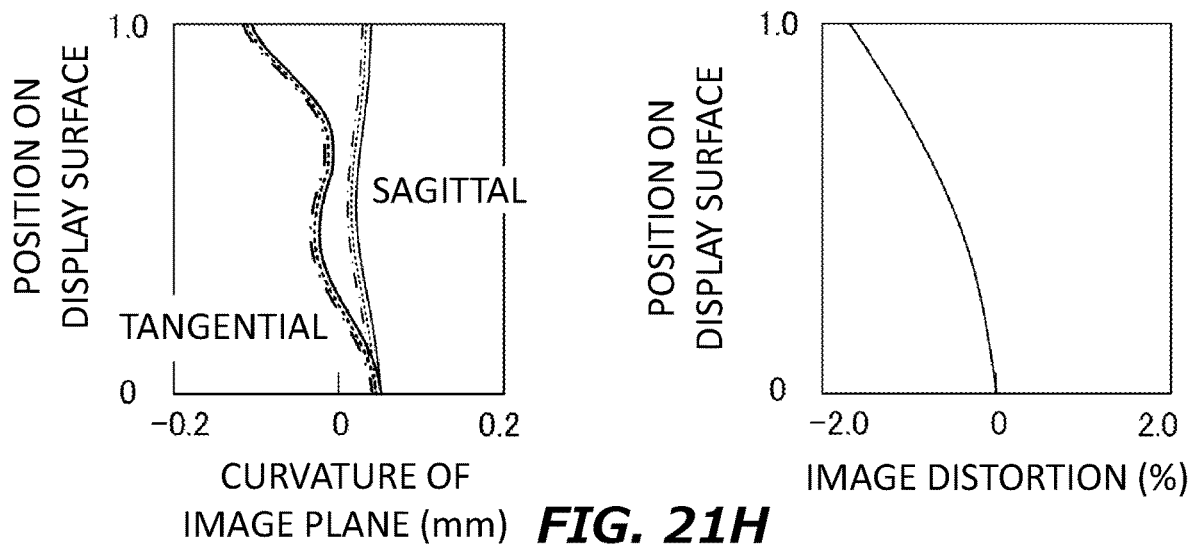
FIG. 21H illustrates a field curvature (left diagram) and an image distortion (right diagram) detected with respect to +2 diopter in the optical apparatus according to Example 9.
Figure 21I:
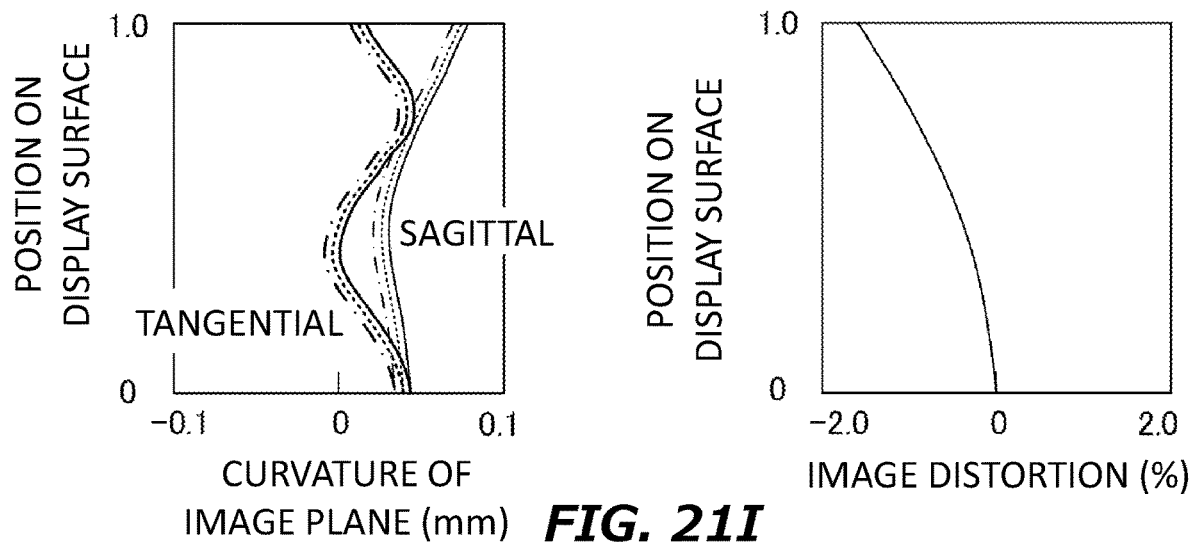
FIG. 21I illustrates a field curvature (left diagram) and an image distortion (right diagram) detected with respect to −1 diopter in the optical apparatus according to Example 9.
Figure 21J:
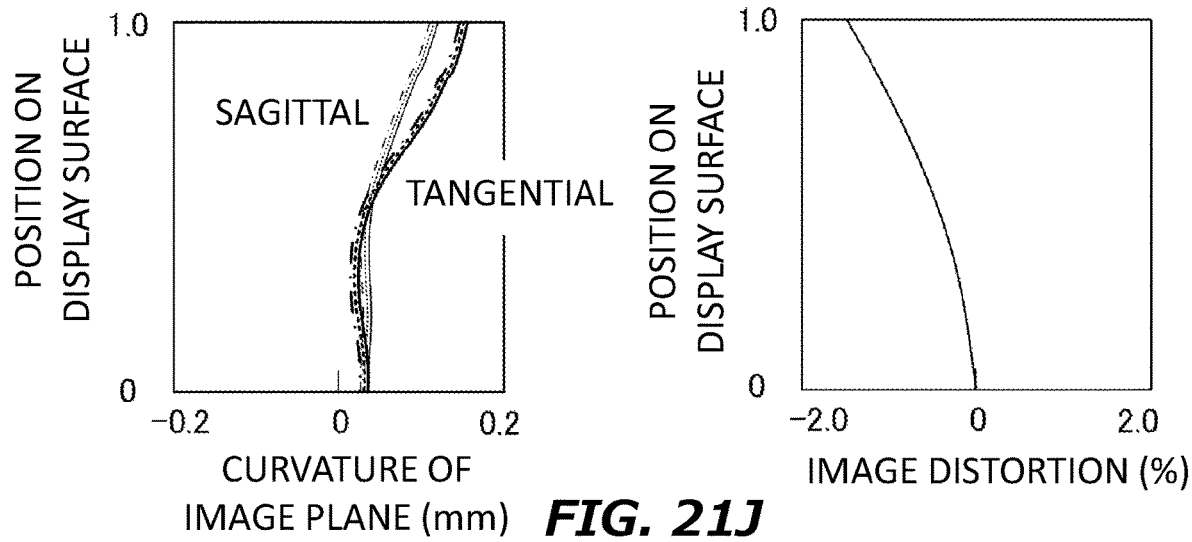
FIG. 21J illustrates a field curvature (left diagram) and an image distortion (right diagram) detected with respect to −5 diopter in the optical apparatus according to Example 9.

FIG. 21H, FIG. 21I, and FIG. 21J illustrate the field curvature (left diagram) and the image distortion (right diagram) detected with respect to +2, −1, and −5 diopters (ratios A/B=0.215, 0.210, and 0.203), respectively, in the optical apparatus 100 according to Example 9. Similarly to the field curvature illustrated in FIG. 9A to FIG. 9C, the field curvature is illustrated on the horizontal axis with respect to the position (the outermost position is 1.0) to the center on the display surface of the vertical axis. The field curvature on the tangential plane and the field curvature on the sagittal plane are shown, respectively. The image distortion is shown on the horizontal axis with respect to the position on the diagonal to the center on the display surface of the vertical axis. In each drawing, the solid line indicates a wavelength of 0.515 µm, the dotted line indicates a wavelength of 0.528 µm, and the alternate long and short dash line indicates the field curvature and the image distortion with respect to a wavelength of 0.544 µm.

In FIG. 21H (+2 diopter, ratio A/B=0.215), the image plane greatly vibrates according to the position from the center of the display 110 on the tangential plane, and is imaged on the downstream side in the periphery with respect to the center. On the sagittal plane, the image plane gently varies according to the position from the center of the display 110, and is imaged on the somewhat downstream side in the periphery with respect to the center. The image distortion shows a negative distortion with respect to the center of the display 110, that is, the image is distorted in a barrel shape.

In FIG. 21I (−1 diopter, ratio A/B=0.210), the image plane greatly vibrates according to the position from the center of the display 110 on the tangential plane, and is imaged on the downstream side in the periphery with respect to the center. On the sagittal plane, the image plane gently varies according to the position from the center of the display 110, and is imaged on the upstream side in the periphery with respect to the center. The image distortion shows a negative distortion with respect to the center of the display 110, that is, the image is distorted in a barrel shape.

In FIG. 21J (−5 diopter, ratio A/B=0.203), the image plane gently varies according to the position from the center of the display 110 on the tangential plane, and is imaged on the upstream side in the periphery with respect to the center. On the sagittal plane, the image plane gently varies according to the position from the center of the display 110, and is imaged on the upstream side in the periphery with respect to the center. Note that the wavelength dependency is hardly observed. The image distortion shows a negative distortion with respect to the center of the display 110, that is, the image is distorted in a barrel shape.

In the optical apparatus 100 according to Example 9, the field curvature has been within a range of ±0.2 mm with respect to +2, −1, and −5 diopters (ratios A/B=0.215, 0.210, and 0.203), and the image distortion has been about −2% at maximum.

FIG. 22A illustrates a detailed design of the optical apparatus 100 according to Example 10. In Example 10, Model 3 of FIG. 12A is adopted, and the optical apparatus 100 is designed according to various parameters given to the lens specification, the aspheric coefficient, the GPL data, and the variable interval data. In the present example, the ratios A/B are given as 0.301, 0.280, and 0.257 with respect to +2, −1, and −5 diopters, respectively.

Figure 22B:
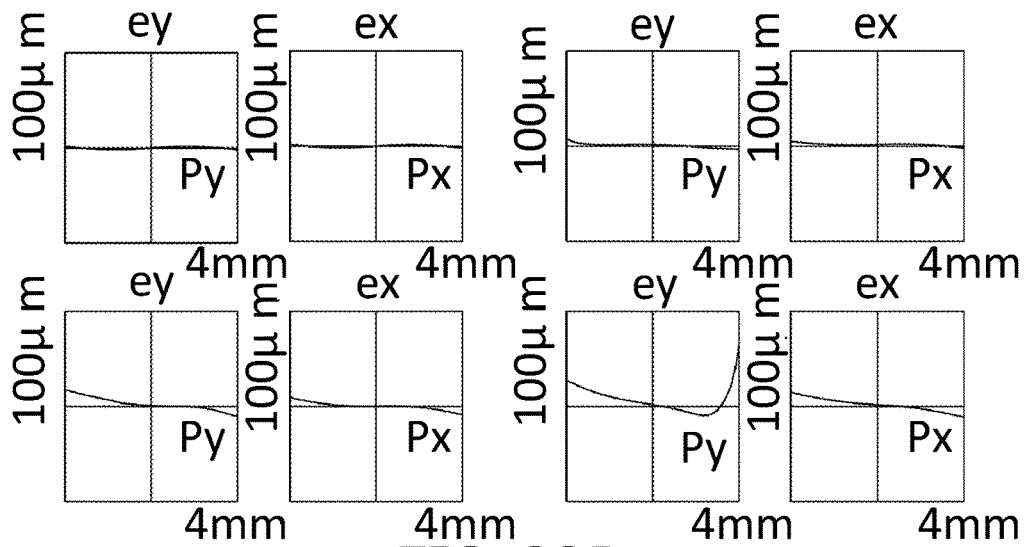
FIG. 22B illustrates the lateral aberrations detected with respect to +2 diopter in the optical apparatus according to Example 10.
Figure 22C:
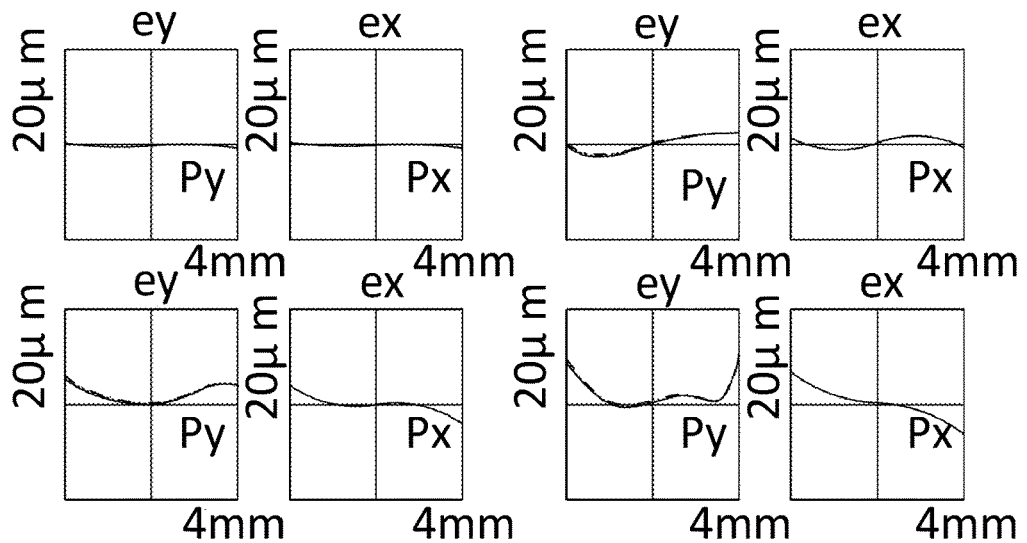
FIG. 22C illustrates a lateral aberration detected with respect to −1 diopter in the optical apparatus according to Example 10.
Figure 22D:
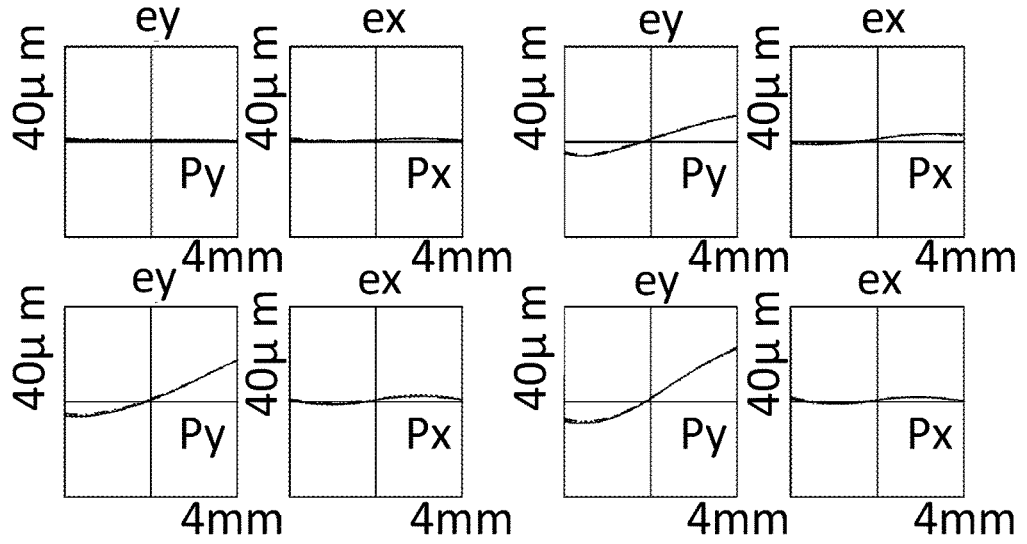
FIG. 22A illustrates a detailed design of an optical apparatus according to Example 10.

FIG. 22B, FIG. 22C, and FIG. 22D illustrate lateral aberrations detected with respect to +2, −1, and −5 diopters (ratios A/B=0.301, 0.280, and 0.257), respectively, in the optical apparatus 100 according to Example 10. Here, the upper left set of diagrams illustrates the center of the image, the upper right set of diagrams illustrates the center of the upper and lower ends of the image, the lower left set of diagrams illustrates the center of the left and right ends, and the lower right set of diagrams illustrates the aberration at the diagonal. Py and Px are coordinates (full scale: 4 mm) on the aperture plane (at the position of the eye box), and ey and ex are the aberration amount of the tangential plane and the aberration amount of the sagittal plane (full scale is shown in each drawing), respectively. The solid line indicates an aberration with respect to a wavelength of 0.515 µm, the dotted line indicates an aberration with respect to a wavelength of 0.528 µm, and the alternate long and short dash line indicates aberration with respect to a wavelength of 0.544 µm.

FIG. 22E, FIG. 22F, and FIG. 22G illustrate spherical aberrations on the optical axis detected with respect to +2, −1, and −5 diopters (ratios A/B=0.301, 0.280, and 0.257), respectively, in the optical apparatus 100 according to Example 10. Here, the vertical axis represents normalized pupil coordinates (full scale: 4 mm) at the position of the eye box, and the horizontal axis represents the aberration amount. In each drawing, the solid line indicates an aberration with respect to a wavelength of 0.515 µm, the dotted line indicates an aberration with respect to a wavelength of 0.528 µm, and the alternate long and short dash line indicates aberration with respect to a wavelength of 0.544 µm.

Figure 22H:
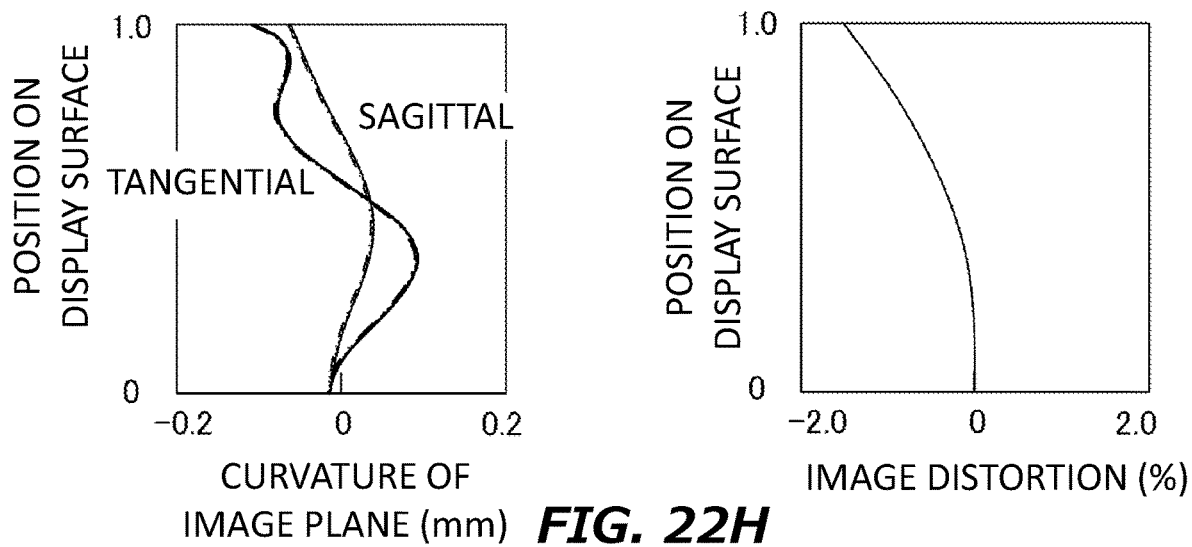
Figure 22I:
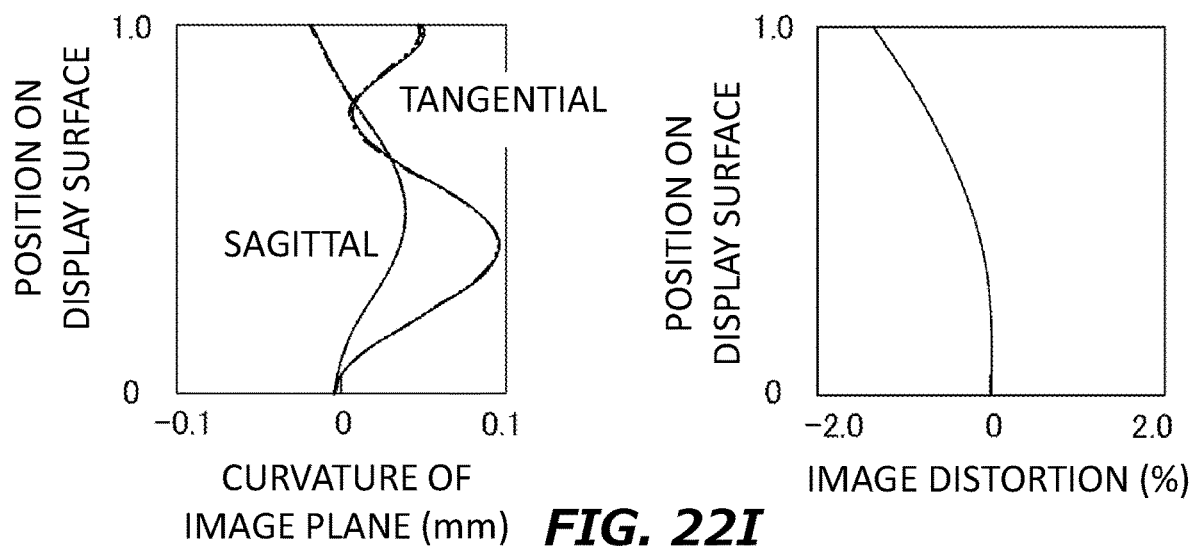
Figure 22J:
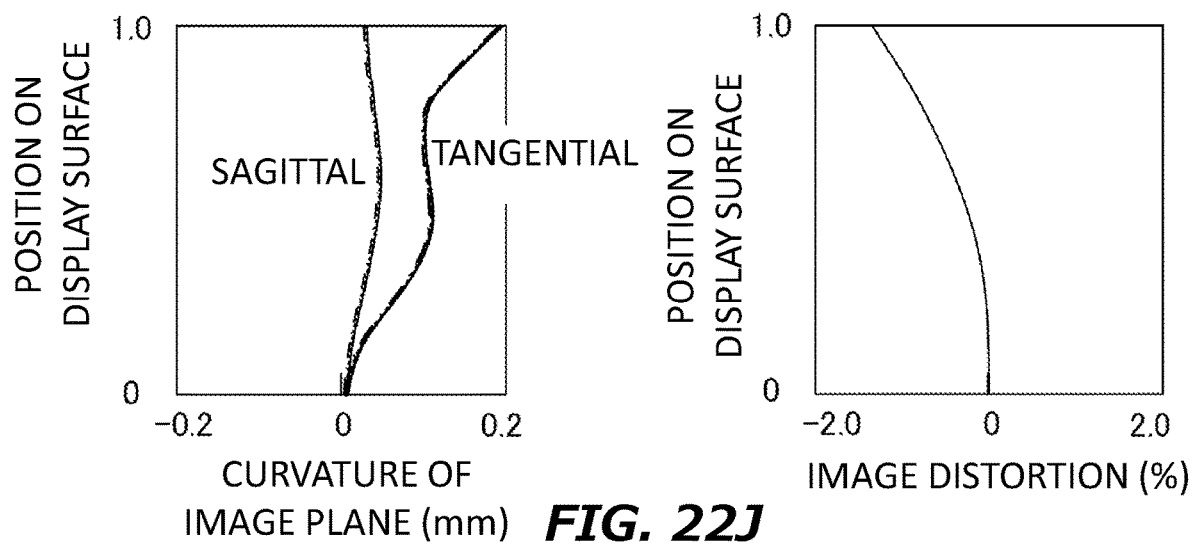

FIG. 22H, FIG. 22I, and FIG. 22J illustrate the field curvature (left diagram) and the image distortion (right diagram) detected with respect to +2, −1, and −5 diopters (ratios A/B=0.301, 0.280, and 0.257), respectively, in the optical apparatus 100 according to Example 10. Similarly to the field curvature illustrated in FIG. 9A to FIG. 9C, the field curvature is illustrated on the horizontal axis with respect to the position (the outermost position is 1.0) to the center on the display surface [110] of the vertical axis. The field curvature on the tangential plane and the field curvature on the sagittal plane are shown, respectively. The image distortion is shown on the horizontal axis with respect to the position on the diagonal to the center on the display surface [110] of the vertical axis. In each drawing, the solid line indicates a wavelength of 0.515 µm, the dotted line indicates a wavelength of 0.528 µm, and the alternate long and short dash line indicates the field curvature and the image distortion with respect to a wavelength of 0.544 µm.

In FIG. 22H (+2 diopter, ratio A/B=0.301), the image plane greatly vibrates according to the position from the center of the display 110 on the tangential plane, and is imaged on the downstream side in the periphery with respect to the center. On the sagittal plane, the image plane gently varies according to the position from the center of the display 110, and is imaged on the downstream side in the periphery with respect to the center. Note that the wavelength dependency is hardly observed. The image distortion shows a negative distortion with respect to the center of the display 110, that is, the image is distorted in a barrel shape.

In FIG. 22I (−1 diopter, ratio A/B=0.280), the image plane greatly vibrates according to the position from the center of the display 110 on the tangential plane, and is imaged on the upstream side in the periphery with respect to the center. On the sagittal plane, the image plane gently varies according to the position from the center of the display 110, and is imaged on the somewhat downstream side in the periphery with respect to the center. Note that the wavelength dependency is hardly observed. The image distortion shows a negative distortion with respect to the center of the display 110, that is, the image is distorted in a barrel shape.

In FIG. 22J (−5 diopter, ratio A/B=0.257), the image plane gently varies according to the position from the center of the display 110 on the tangential plane, and is imaged on the upstream side in the periphery with respect to the center. On the sagittal plane, the image plane hardly varies, and is imaged at an almost constant position. Note that the wavelength dependency is hardly observed. The image distortion shows a negative distortion with respect to the center of the display 110, that is, the image is distorted in a barrel shape.

In the optical apparatus 100 according to Example 10, the field curvature has been within a range of ±0.2 mm with respect to +2, −1, and −5 diopters (ratios A/B=0.301, 0.280, and 0.257), and the image distortion has been about −2% at maximum.

From the results of the field curvature and the image distortion in Examples 1 to 10, by setting the ratio A/B of the total focal length A of the optical system 300 to the focal length B of the lens 310 within the range of 0.166 to 0.317, or by setting the ratio A/B to the +2 diopter within the range of 0.173 to 0.317, the ratio A/B to the −1 diopter within the range of 0.170 to 0.299, and the ratio A/B to the −5 diopter within the range of 0.166 to 0.279, it is possible to obtain good imaging characteristics regardless of the detailed design of the lens 310 and regardless of the detailed design of the diffractive optical element 200 such as the presence or absence of chromatic aberration correction by the GPH element (GPL element) and the CSF element.

Note that, regarding Examples 1 to 4 for the optical apparatus 100 designed by adopting Model 1 in FIG. 12A, when the result of Example 2 is compared with the result of Example 1, the lateral aberration, the spherical aberration, the field curvature, and the image distortion are relatively good, and when the result of Example 3 is compared with the result of Example 4, the lateral aberration, the spherical aberration, the field curvature, and the image distortion are relatively good. Therefore, it can be seen that there is a range in which good imaging characteristics can be obtained at the ratio A/B of the total focal length A of the optical system 300 to the focal length B of the lens 310, and relatively good imaging characteristics can be obtained with respect to the outside of the range within the above range.

Note that, the optical apparatus 100 according to the present embodiment has maintained the relative positional relationship among the display 110, the diffractive optical element 200, and the lens 310 (the half mirror surface 311) by the mobile device 410, and has relatively moved the display 110, the diffractive optical element 200, and the lens 310 with respect to the filter 320 (the reflective polarizing plate 321). However, a configuration in which the display 110, the diffractive optical element 200, the lens 310, and the filter 320 are further moved may be adopted as long as the separation distance between at least the filter 320 (the reflective polarizing plate 321) and the lens 310 (the half mirror surface 311) can be changed. For example, the lens 310 may be moved with respect to the filter 320 and the display 110 may be moved with respect to the lens 310. Not limited to this, the relative position of the filter 320 and the lens 310 may be maintained, and the display 110 may be moved with respect to these.

The optical apparatus 100 according to the present embodiment includes the display 110 that displays an image, the optical system 300 that includes the filter 320 (the reflective polarizing plate 321) and the lens 310 (the half mirror surface 311) respectively arranged on the downstream side and the upstream side on the optical axis L of the display 110 and magnifies an image by at least the lens 310 (the half mirror surface 311), and the mobile device 410 that moves at least one of the filter 320, the lens 310, and the display 110 along the optical axis L. As a result, the optical path is folded back twice between the filter 320 and the lens 310 of the optical system 300, and the image is magnified by the lens 310 (the half mirror surface 311), so that the position of the magnified virtual image can be adjusted according to the diopter of the user.

The optical system 300 and the mobile device 410 in the optical apparatus 100 according to the present embodiment are examples of a diopter optical system and a diopter adjustment mechanism that adjust the position of the magnified virtual image according to the eyesight of the user, and the optical apparatus 100 has high optical performance in the diopter adjustment range with a small size, a light size, and a small thickness by including the optical system and the mobile device.

Note that the optical apparatus 100 according to the present embodiment moves the lens 310 (the half mirror surface 311) relatively to the filter 320 (the reflective polarizing plate 321), but a lens having a variable surface shape or variable lens power may be adopted instead of the movable lens 310.

FIG. 23 schematically illustrates a configuration of an optical apparatus 101 according to a modification. The optical apparatus 100 includes a display 110, a diffractive optical element 200, an optical system 300, a control device 390, and a housing 400.

The display 110 and the diffractive optical element 200 are configured in the similar manner to those according to the embodiment described above.

The optical system 300 is a triple-pass type optical system which is thinned by folding back the optical path twice by two reflection surfaces, and includes the filter 320 and a lens 330 arranged on the downstream side and the upstream side on the optical axis L, respectively. The optical system 300 diffuses the image light 50 to magnify the image by changing the variable surface shape or the lens power of the lens 330.

The filter 320 is configured similarly to that according to the embodiment described above.

As the lens 330, for example, a liquid lens that realizes a variable surface shape by changing a boundary surface shape between liquids having different refractive indexes by adjusting an applied voltage can be adopted. In such a case, a half mirror surface 331, which is an example of the second transmissive/reflective surface, is provided on the end surface on the upstream side of the lens 330. Here, the variable surface shape is formed in an aspherical surface shape in which the curved surface angle increases or decreases according to the distance from the center. For example, as illustrated in FIG. 2A, the surface position Z is shifted with increasing distance from the center to the outside, but the change amount Δθ of the curved surface angle may be formed in a surface shape that tends to decrease with increasing distance from the center to the outside.

As the lens 330, a liquid crystal lens that realizes variable lens power by controlling the orientation of the liquid crystal by adjusting the applied voltage and effectively changing the refractive index can be adopted. In such a case, a half mirror surface 331, which is an example of the second transmissive/reflective surface, is provided on the end surface on the upstream side of the lens 330. Here, the variable lens power is generated so as to correspond to an aspherical surface whose curved surface angle increases or decreases according to the distance from the center. For example, as illustrated in FIG. 2A, the surface position Z is shifted with increasing distance from the center to the outside, but the change amount Δθ of the curved surface angle may be generated so as to correspond to a surface shape that tends to decrease with increasing distance from the center to the outside.

The control device 390 is a device that controls each component of the optical apparatus 101. The control device 390 adjusts the applied voltage of the lens 330 to control the variable surface shape or the variable lens power.

The housing 400 accommodates the display 110, the diffractive optical element 200, and the optical system 300.

The principle in which the optical apparatus 101 guides the image light 50 of the display 110 to the eye 30 of the user will be described.

The display 110 generates an unpolarized image light 50.

The image light 50 output from the display 110 is incident on the diffractive optical element 200. The image light 50 is modulated into right-turning circularly polarized light and the chromatic aberration is compensated. The light is output from the diffractive optical element 200 to the downstream side. Details are similar to those of the embodiment described above.

The image light 50 output from the diffractive optical element 200 enters the optical system 300. In the optical system 300, the image light 50 is first incident on the lens 330. As a result, the image light 50 having half the intensity is transmitted through the half mirror surface 331 without depending on the polarization state, is magnified by the lens action and is output to the downstream side, and the image light 50 having the remaining half the intensity is reflected on the half mirror surface 331.

Next, the image light 50 is incident on the filter 320. The image light 50 is modulated into a left-turning circularly polarized light, reflected, and output from the filter 320 to the upstream side. Details are similar to those of the embodiment described above.

The image light 50 is incident on the lens 330 from the downstream side. As a result, the image light 50 is magnified by the lens action, the image light 50 having half the intensity is reflected on the half mirror surface 331, further magnified by the lens action, and output to the downstream side, and the image light 50 having the remaining half the intensity is transmitted through the half mirror surface 331.

The image light 50 is incident on the filter 320 again. The image light 50 is modulated into a linearly polarized light in the horizontal direction, transmitted through the filter 320, and is output to the downstream side. Details are similar to those of the embodiment described above.

After passing through the lens 330 once in the optical system 300, the image light 50 is reflected on the filter 320 and reciprocates through the lens 330, further subjected to a lens action by the lens 330 to be magnified, output to the downstream side, and guided to the eye 30 of the user.

Note that the optical apparatus 100 according to the present embodiment magnifies the image light 50 of the display 110 and guides the image light to one eye 30 of the user to adjust the position of the magnified virtual image. That is, the optical apparatus 100 includes the diffractive optical element 200 and the optical system 300 only for one eye 30 of the left eye and the right eye. The binocular optical apparatus may be configured by providing the optical apparatus 100 having such a configuration, that is, the diffractive optical element 200 and the optical system 300 for each of the both eyes 30.

Note that the optical apparatus 100 according to the present embodiment has been configured to employ an immersive virtual reality (VR) technology to magnify the image light 50 of the display 110 and guide the image light to the user's eye 30, but may be configured to employ an augmented reality (AR) technology to superimpose the image light 50 of the display 110 and the external light and guide the superimposed light to the user's eye 30.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

As is clear from the above description, according to (one) embodiment of the present invention, an optical apparatus can be realized.

What is claimed is:

1. An optical apparatus that generates a magnified virtual image of an image, the optical apparatus comprising:
   a display configured to output an image light for forming an image;
   an optical system configured to magnify the image, the optical system including: a first transmissive/reflective surface and a second transmissive/reflective surface that are arranged on an eye point side and a display side, respectively, on an optical axis of the display; and
a lens element in which the second transmissive/reflective surface is provided on one surface on the display side, wherein the first transmissive/reflective surface transmits or reflects at least a part of the image light, and the second transmissive/reflective surface is an aspherical curved surface in which a change amount of a curved surface angle continuously increases or decreases according to a distance from a center, and transmits or reflects at least a part of the image light; and
a mobile device configured to relatively move at least the second transmissive/reflective surface along the optical axis with respect to the first transmissive/reflective surface.

2. The optical apparatus according to claim 1, wherein the mobile device is further configured to move the display while maintaining a relative positional relationship with the second transmissive/reflective surface.

3. The optical apparatus according to claim 1, wherein the first transmissive/reflective surface is configured to reflect at least a part of the image light transmitted through the second transmissive/reflective surface, and transmit at least a part of the image light reflected on the second transmissive/reflective surface.

4. The optical apparatus according to claim 3, wherein the first transmissive/reflective surface is a polarizing element that reflects one of linearly polarized lights orthogonal to each other and transmits the other.

5. The optical apparatus according to claim 4, wherein the first transmissive/reflective surface is a flat surface.

6. The optical apparatus according to claim 1, wherein the second transmissive/reflective surface transmits at least a part of the image light sent from the display, and reflects a part of the image light reflected on the first transmissive/reflective surface and returned.

7. The optical apparatus according to claim 5, wherein the second transmissive/reflective surface is a half mirror surface.

8. The optical apparatus according to claim 7, wherein the change amount of the curved surface angle of the second transmissive/reflective surface continuously decreases from 1.1 degrees to 0.4 degrees from the center to an outer edge.

9. The optical apparatus according to claim 8, wherein a ratio of a focal length of the optical system to a focal length of the lens element ranges from 0.166 to 0.317.

10. The optical apparatus according to claim 9, wherein the ratio ranges from 0.173 to 0.317 with respect to +2 diopter, from 0.170 to 0.299 with respect to −1 diopter, and from 0.166 to 0.279 with respect to −5 diopter.

11. The optical apparatus according to claim 1, further comprising:
a diffractive optical element disposed between the display and the second transmissive/reflective surface.

12. The optical apparatus according to claim 11, wherein the diffractive optical element includes a GPH element that compensates for wavelength dispersibility of the optical system.

13. The optical apparatus according to claim 12, wherein the diffractive optical element includes an unnecessary light removal element that removes an unnecessary light on the eye point side of the GPH element.

14. The optical apparatus according to claim 13, wherein the unnecessary light removing element includes a $\lambda/4$ plate and a linearly polarizing plate.

15. The optical apparatus according to claim 1, further comprising:
a control device configured to change a distortion correction value of the image according to a state of the optical system.

16. The optical apparatus according to claim 1, further comprising:
a housing configured to accommodate the display and the optical system, wherein
the first transmissive/reflective surface is held by the housing, and the second transmissive/reflective surface moves along the optical axis in the housing.

17. The optical apparatus according to claim 2, wherein the first transmissive/reflective surface is configured to reflect at least a part of the image light transmitted through the second transmissive/reflective surface, and transmit at least a part of the image light reflected on the second transmissive/reflective surface.

18. The optical apparatus according to claim 2, wherein the second transmissive/reflective surface transmits at least a part of the image light sent from the display, and reflects a part of the image light reflected on the first transmissive/reflective surface and returned.

19. The optical apparatus according to claim 2, further comprising:
a diffractive optical element disposed between the display and the second transmissive/reflective surface.

20. The optical apparatus according to claim 2, further comprising:
a control device configured to change a distortion correction value of the image according to a state of the optical system.

* * * * *